United States Patent
Zhao et al.

(10) Patent No.: US 11,297,330 B2
(45) Date of Patent: Apr. 5, 2022

(54) METHOD AND APPARATUS FOR PROCESSING VIDEO SIGNAL BASED ON INTER PREDICTION

(71) Applicant: LG ELECTRONICS INC., Seoul (KR)

(72) Inventors: Jane Zhao, Seoul (KR); Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/578,974

(22) Filed: Sep. 23, 2019

(65) Prior Publication Data

US 2020/0137398 A1    Apr. 30, 2020

Related U.S. Application Data

(60) Provisional application No. 62/737,077, filed on Sep. 26, 2018, provisional application No. 62/735,027, filed on Sep. 22, 2018.

(51) Int. Cl.
  *H04N 19/176*    (2014.01)
  *H04N 19/52*    (2014.01)
  (Continued)

(52) U.S. Cl.
  CPC ......... *H04N 19/159* (2014.11); *H04N 19/105* (2014.11); *H04N 19/137* (2014.11); *H04N 19/176* (2014.11)

(58) Field of Classification Search
  CPC .. H04N 19/159; H04N 19/105; H04N 19/137; H04N 19/176
  (Continued)

(56) References Cited

U.S. PATENT DOCUMENTS 10,362,330 B1 *  7/2019  Li .................... H04N 19/44
11,115,653 B2 *  9/2021  Lin ................. H04N 19/176
(Continued)

FOREIGN PATENT DOCUMENTS

KR    10-2014-0064944 A    5/2014
KR    10-2017-0115969 A    10/2017
(Continued)

OTHER PUBLICATIONS

Li Zhang et al., "CE4-related: History-based Motion Vector Prediction", Joint Video Experts Team (JVET) of ITU-T SG 16 WP 3 and ISO/IEC JTC 1/SC 29/WG 11, Jul. 10-18, 2018, JVET-K0104-v5, XP030200019.

*Primary Examiner* — Albert Kir
(74) *Attorney, Agent, or Firm* — Dentons US LLP

(57) ABSTRACT

A method of processing a video signal based on inter prediction includes constructing a first merge candidate list of a current block using a spatial merge candidate and temporal merge candidate of the current block, constructing a second merge candidate list by adding a history-based merge candidate indicating motion information of a block coded prior to the current block to the first merge candidate list, obtaining a merge index indicating a merge candidate applied to the current block within the second merge candidate list, and generating a prediction block of the current block using motion information of a merge candidate indicated by the merge index. The history-based merge candidate may be added to the first merge candidate list if the history-based merge candidate has motion information not overlapping motion information of a pre-defined merge candidate among merge candidates included in the first merge candidate list.

7 Claims, 50 Drawing Sheets

(51) Int. Cl.
  *H04N 19/105* (2014.01)
  *H04N 19/159* (2014.01)
  *H04N 19/137* (2014.01)

(58) Field of Classification Search
  USPC .................................................. 375/240.02
  See application file for complete search history.

(56) References Cited

U.S. PATENT DOCUMENTS

| | | | |
|---|---|---|---|
| 2013/0336406 A1 | 12/2013 | Zhang et al. | |
| 2014/0362924 A1 | 12/2014 | Zhao et al. | |
| 2015/0163506 A1 | 6/2015 | Chon et al. | |
| 2016/0191921 A1 | 6/2016 | Zhao et al. | |
| 2017/0310988 A1* | 10/2017 | Lin | H04N 19/513 |
| 2018/0376148 A1* | 12/2018 | Zhang | H04N 19/176 |
| 2020/0036998 A1* | 1/2020 | Xu | H04N 19/139 |
| 2020/0045336 A1* | 2/2020 | Xiu | H04N 19/563 |
| 2020/0059658 A1* | 2/2020 | Chien | H04N 19/176 |
| 2020/0221077 A1* | 7/2020 | Park | H04N 19/513 |
| 2020/0260095 A1* | 8/2020 | Li | H04N 19/44 |
| 2020/0366923 A1* | 11/2020 | Zhang | H04N 19/96 |
| 2020/0413071 A1* | 12/2020 | Huang | H04N 19/593 |
| 2021/0006787 A1* | 1/2021 | Zhang | H04N 19/119 |
| 2021/0185338 A1* | 6/2021 | Xiu | H04N 19/176 |

FOREIGN PATENT DOCUMENTS

| | | |
|---|---|---|
| KR | 10-2018-0018388 A | 1/2018 |
| KR | 101835240 B1 | 3/2018 |
| RU | 2571538 C2 | 12/2015 |
| WO | 2015084567 A1 | 6/2015 |
| WO | 2017034089 A1 | 3/2017 |
| WO | 2017176092 A1 | 10/2017 |
| WO | 2017197126 A1 | 11/2017 |
| WO | 2018030773 A1 | 2/2018 |
| WO | 20180169989 A1 | 9/2018 |

* cited by examiner

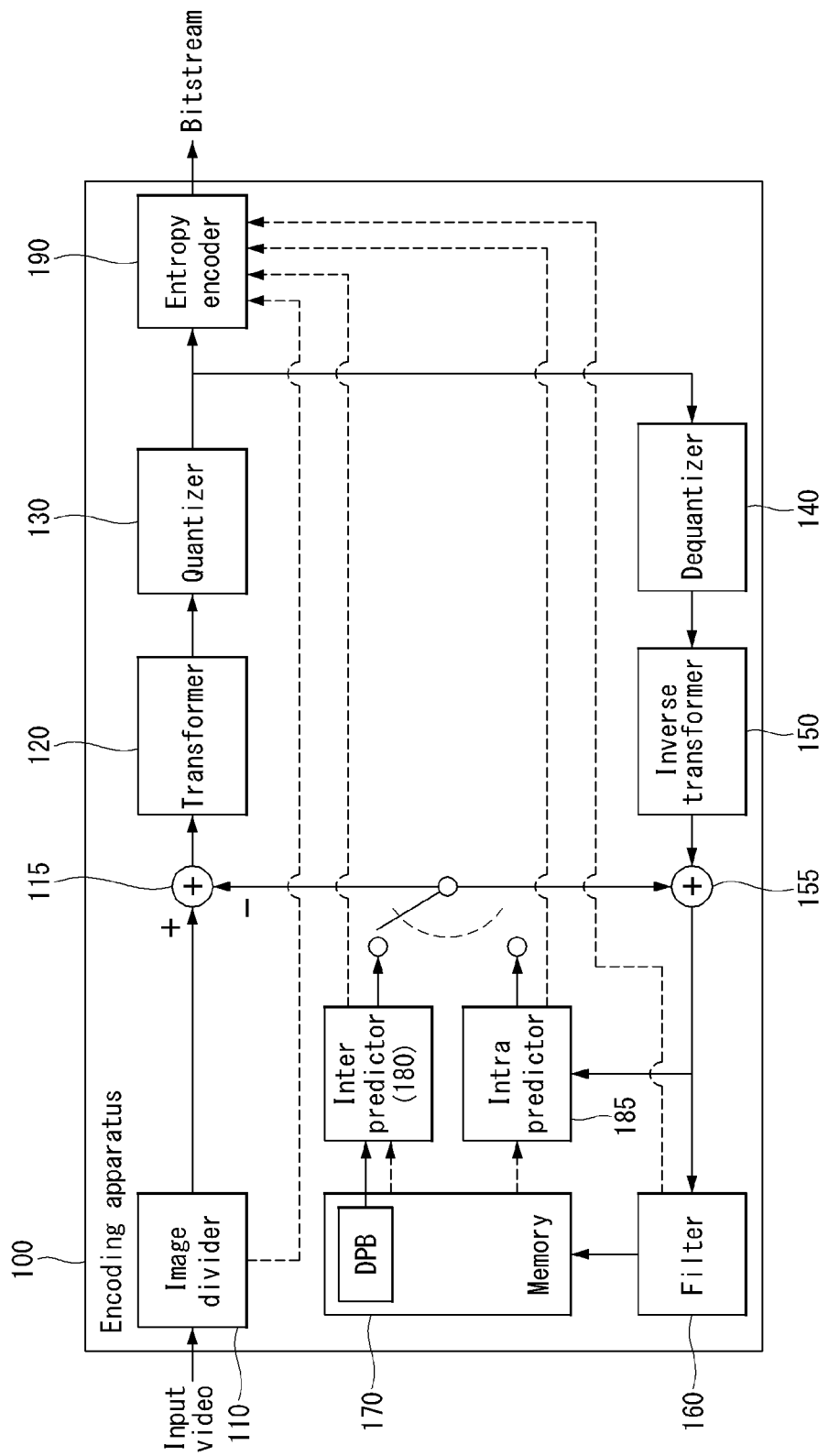
[Fig. 1]

[Fig. 2]
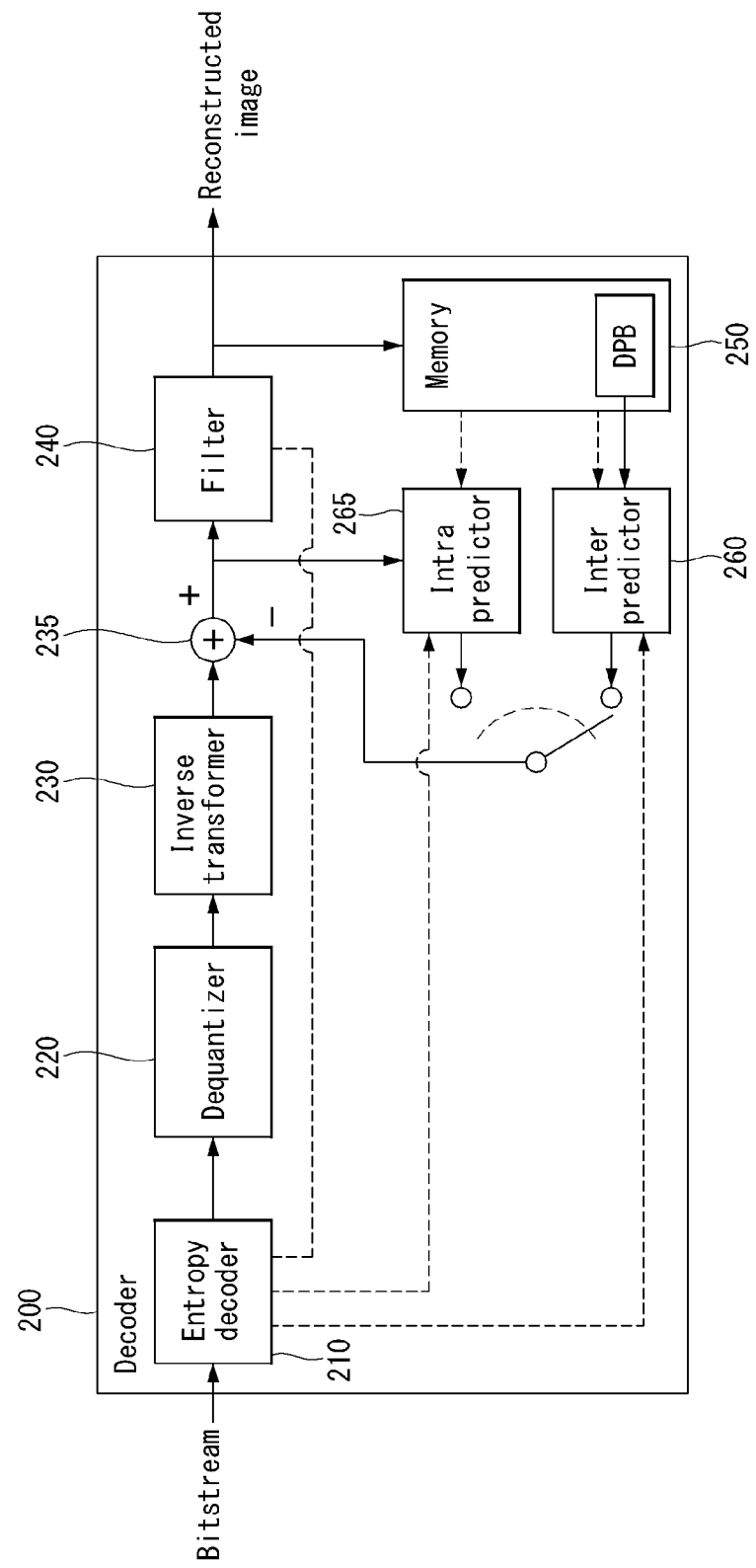

[Fig. 3]
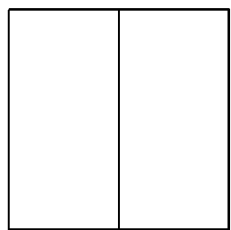
SPLIT_BT_VER
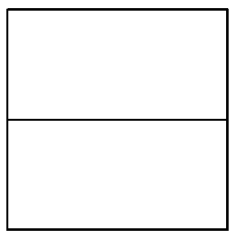
SPLIT_BT_HOR
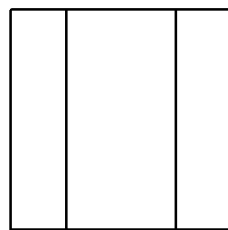
SPLIT_TT_VER
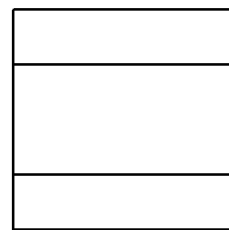
SPLIT_TT_HOR

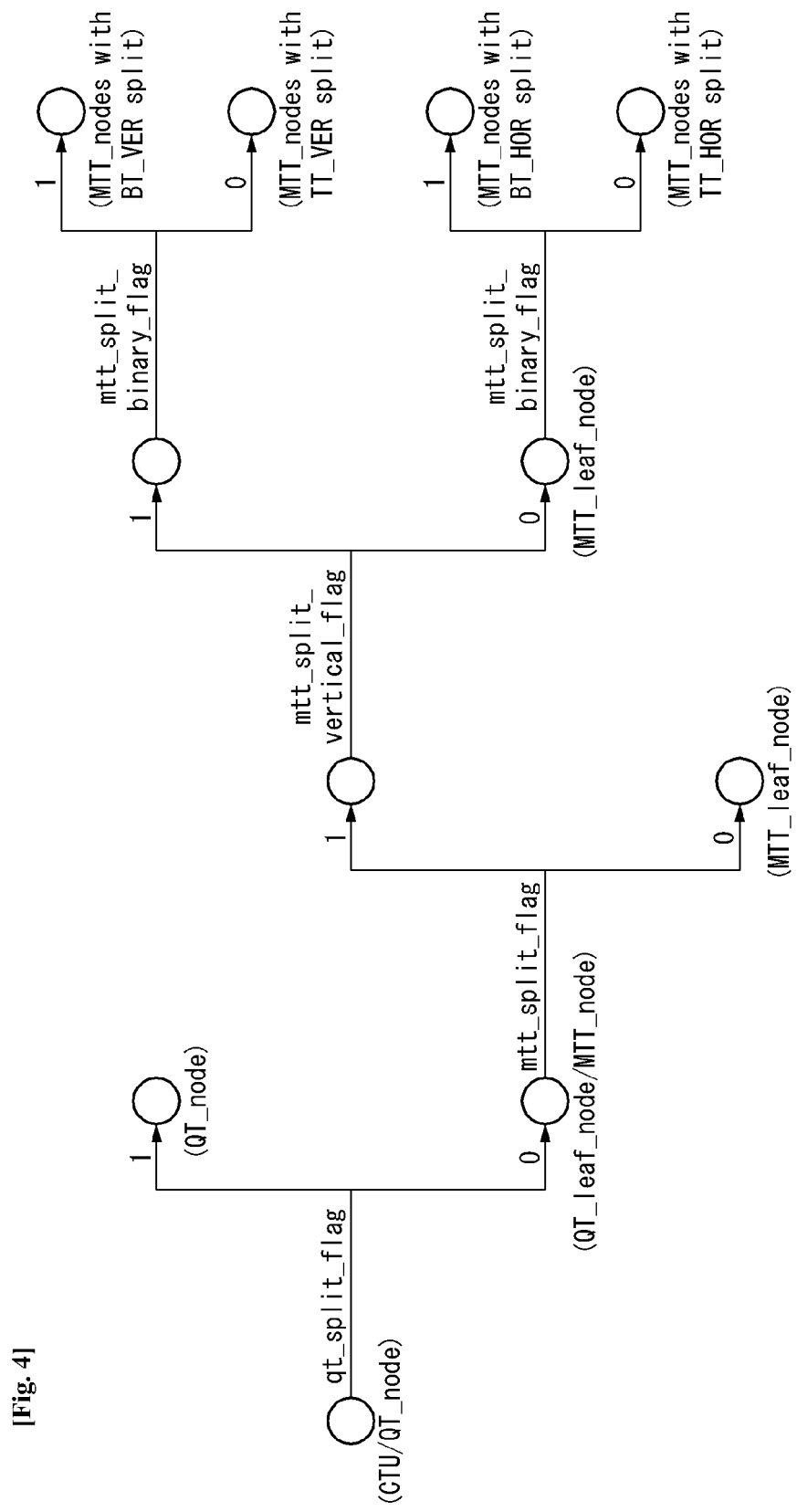
[Fig. 4]

[Fig. 5]
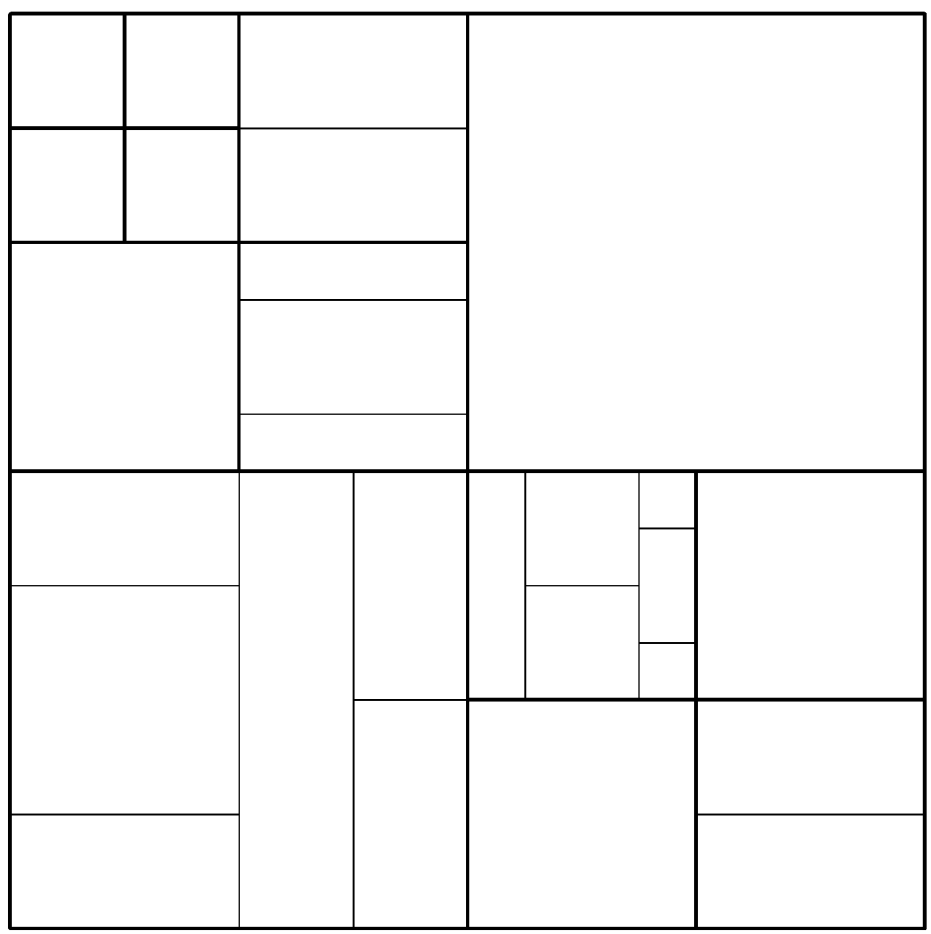

[Fig. 6]
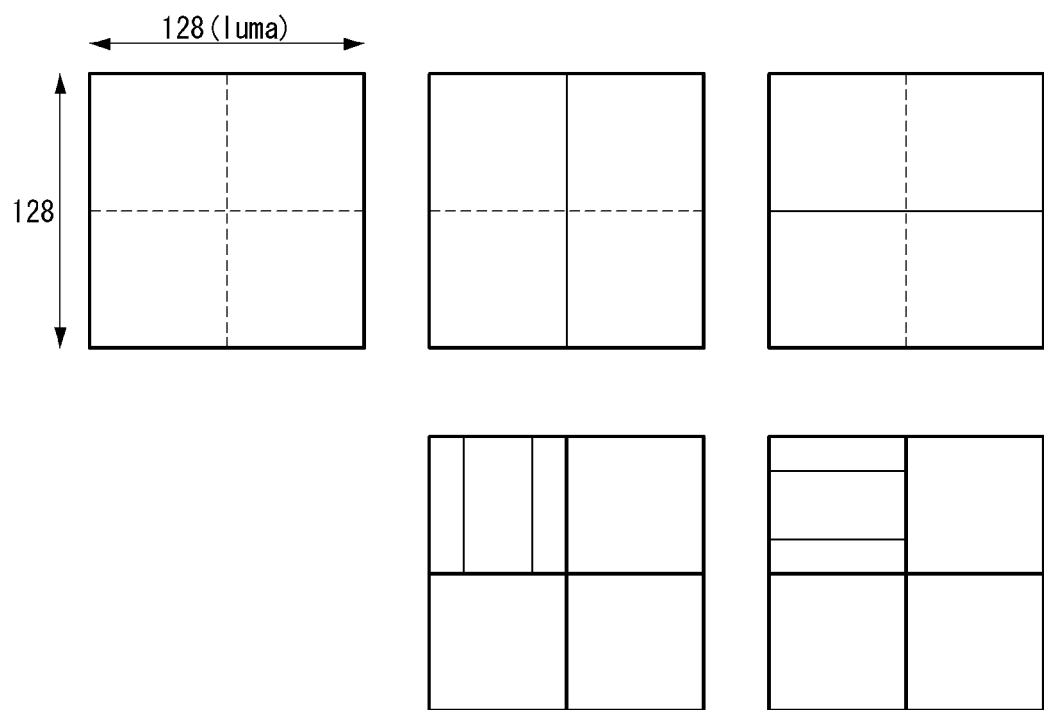

[Fig. 7]
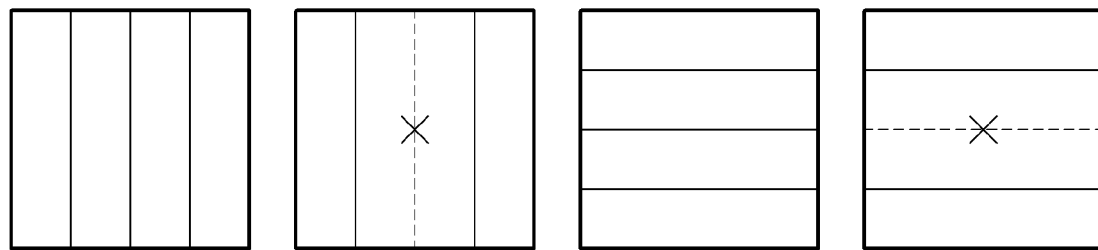

[Fig. 8]
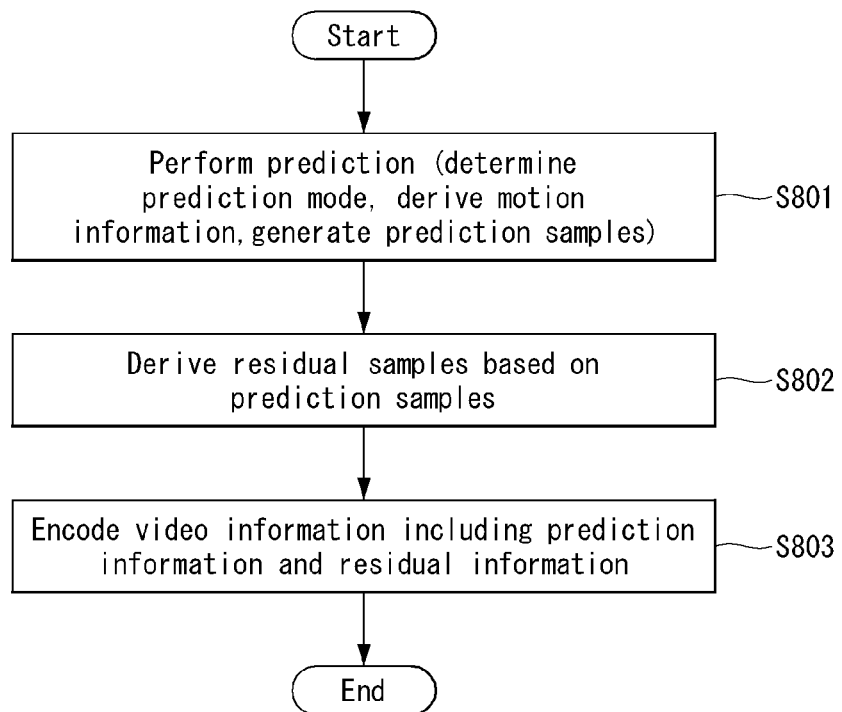

[Fig. 9]
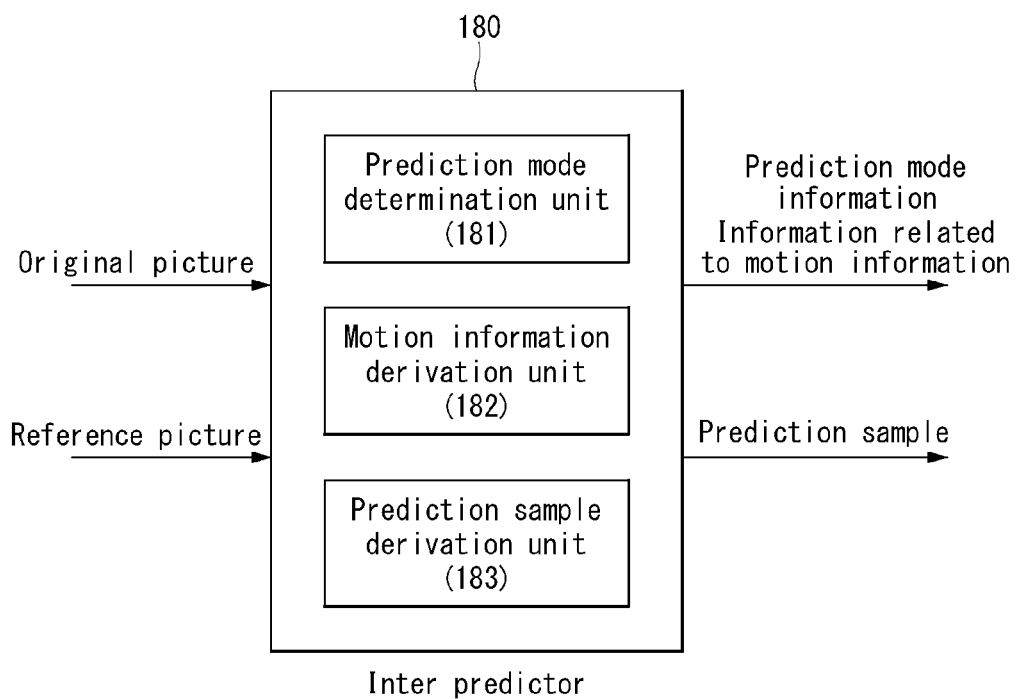

[Fig. 10]
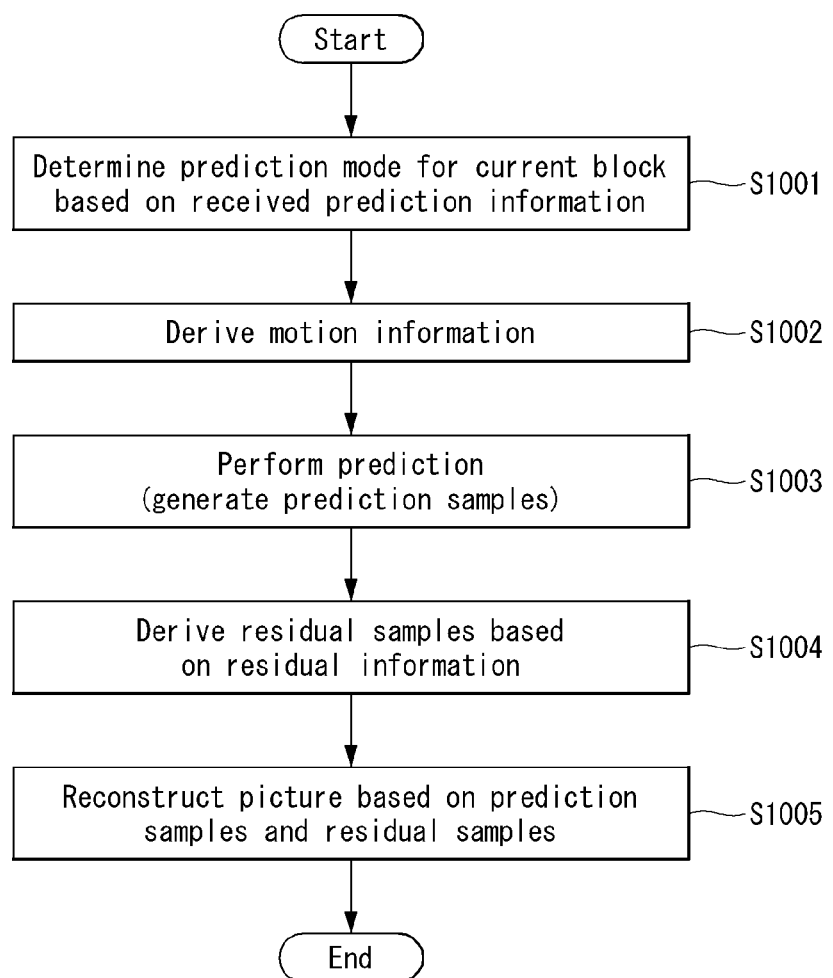

[Fig. 11]
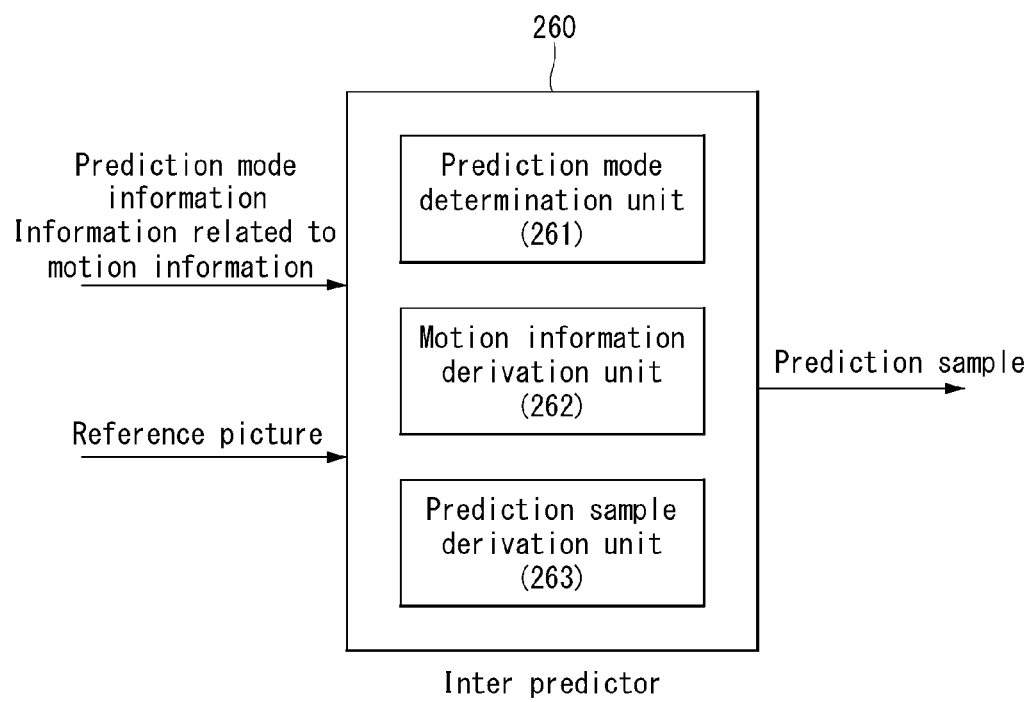

【Fig. 12】
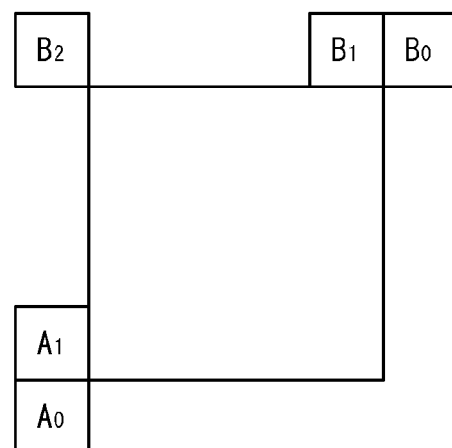

[Fig. 13]
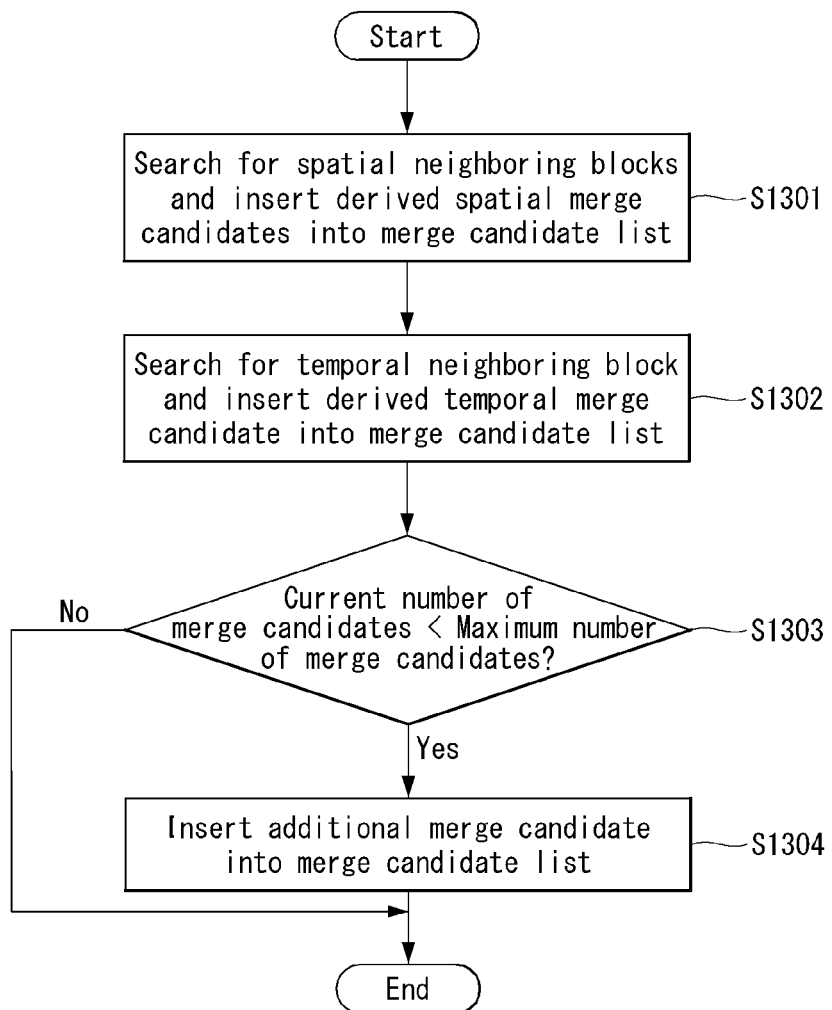

[Fig. 14]
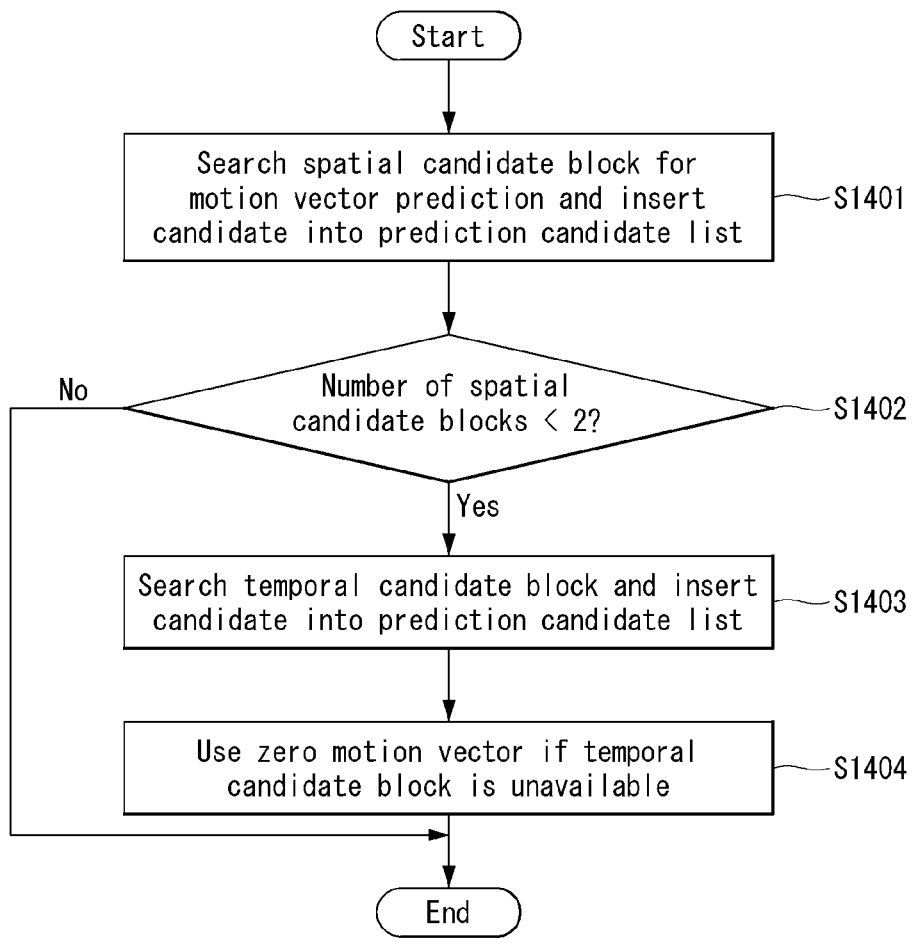

[Fig. 15]
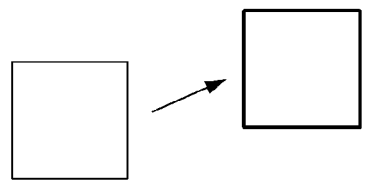
Translate
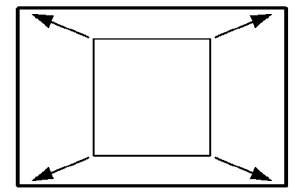
Scale
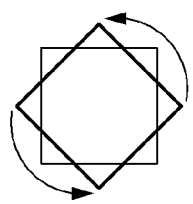
Rotate
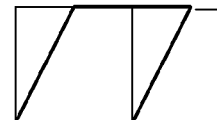
Shear

[Fig. 16]
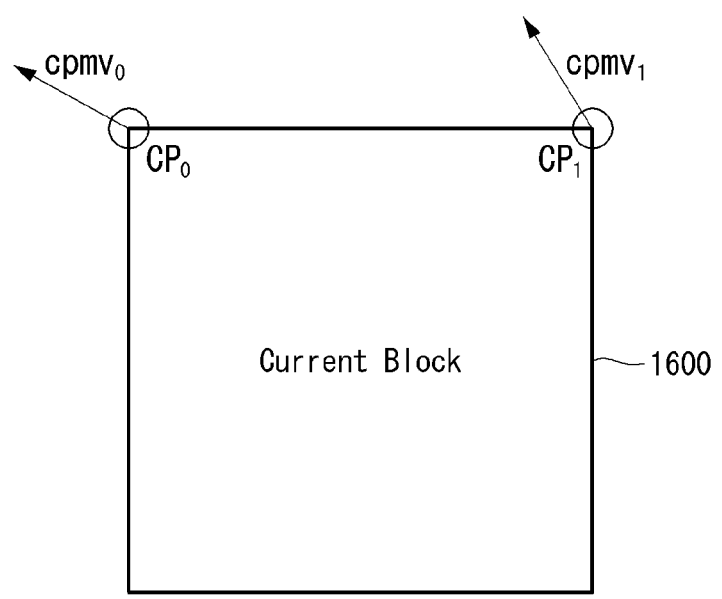

【Fig. 17】
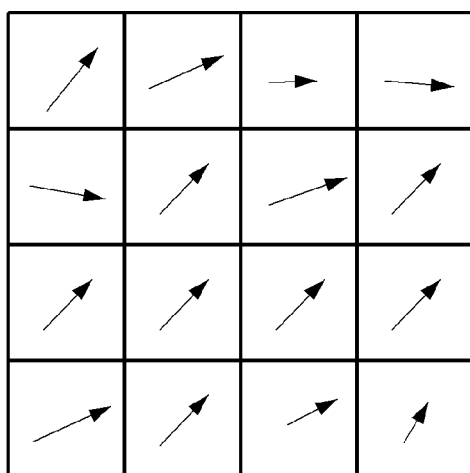

[Fig. 18]
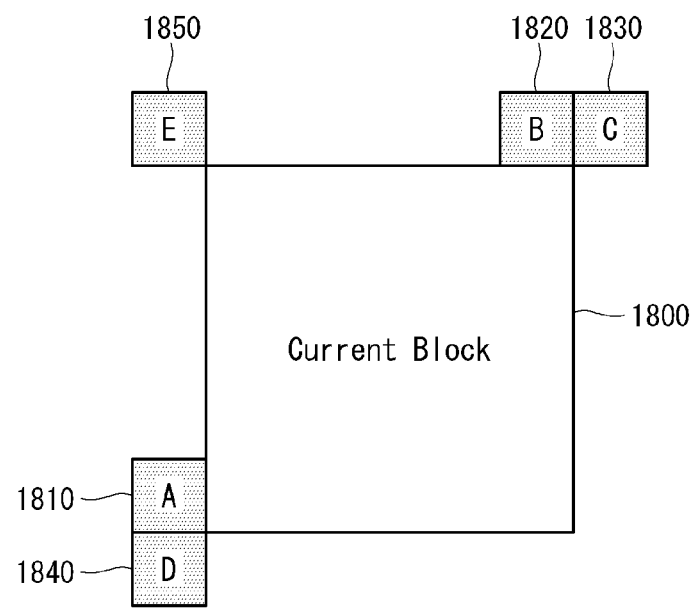

[Fig. 19]
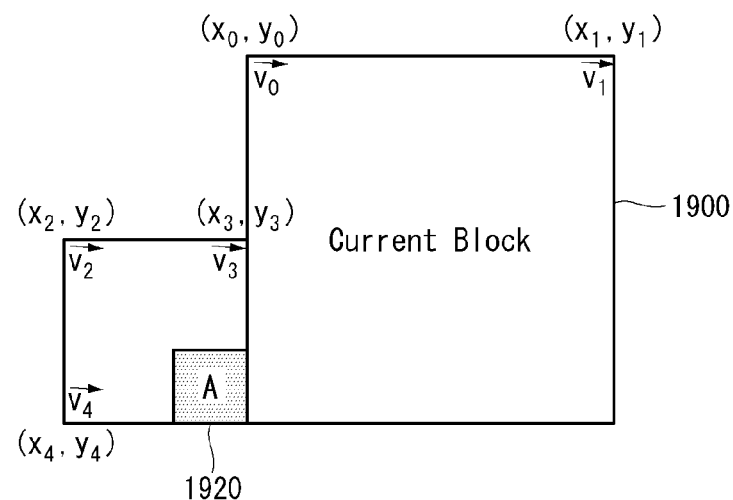

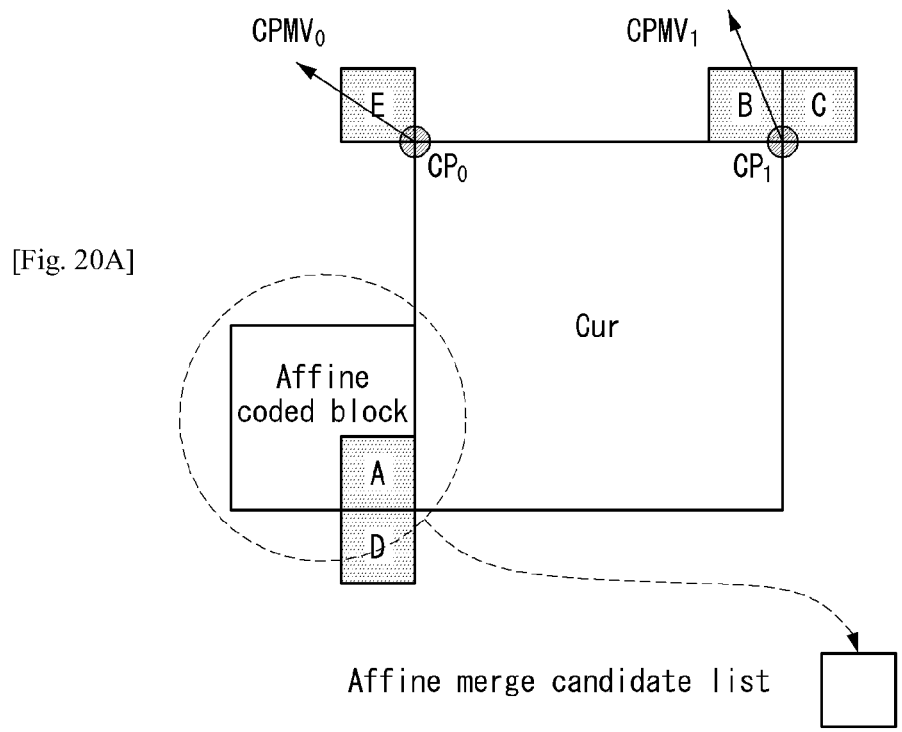
[Fig. 20A]
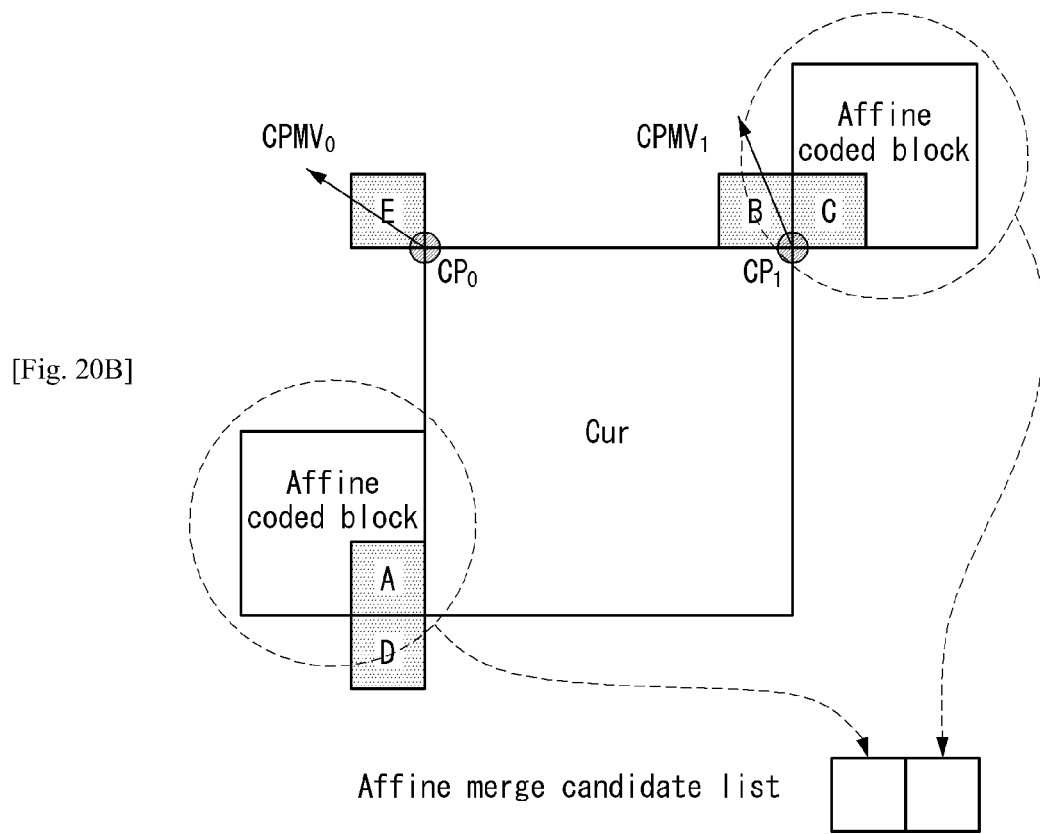
[Fig. 20B]

[Fig. 21]
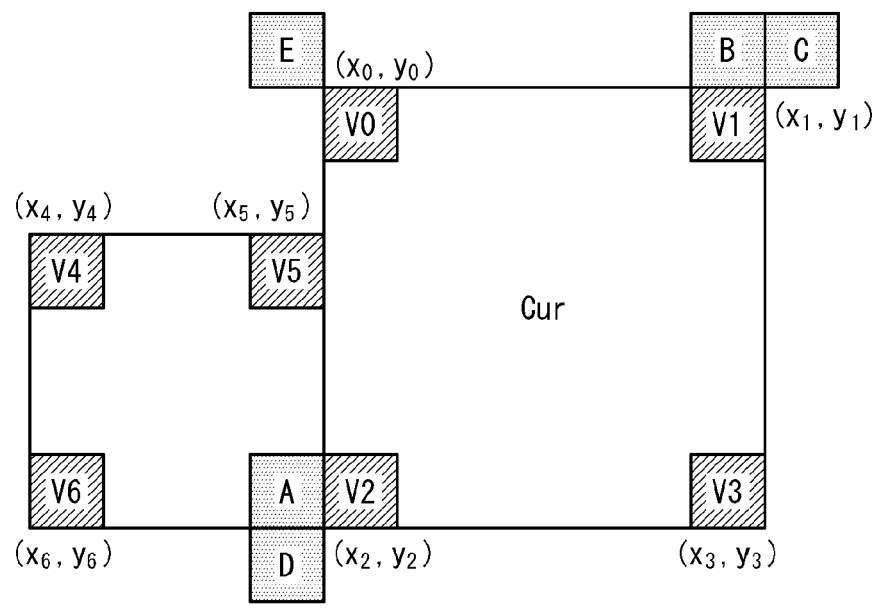

[Fig. 22]
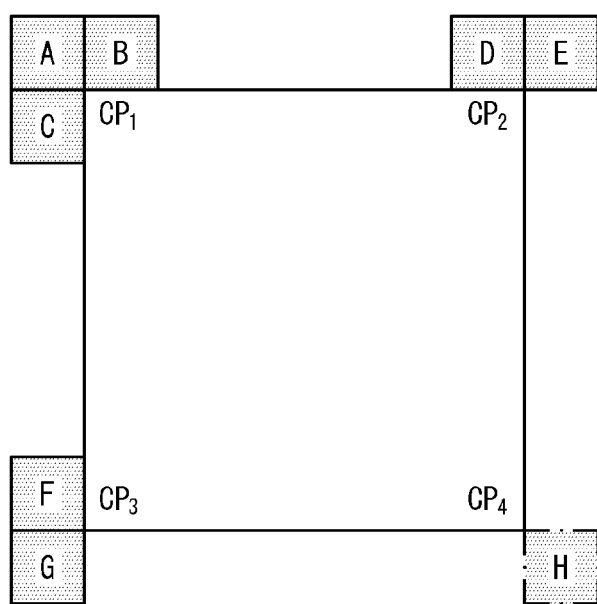

[Fig. 23]
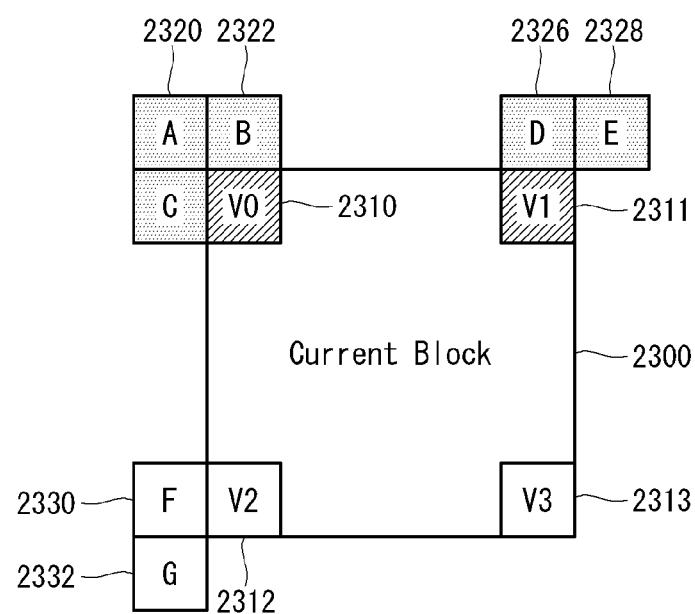

[Fig. 24]
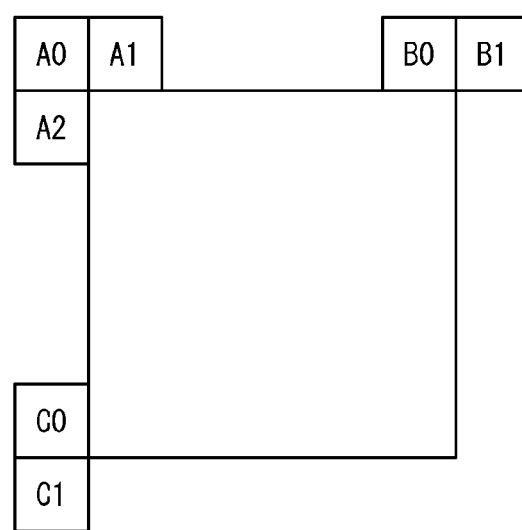

[Fig. 25]
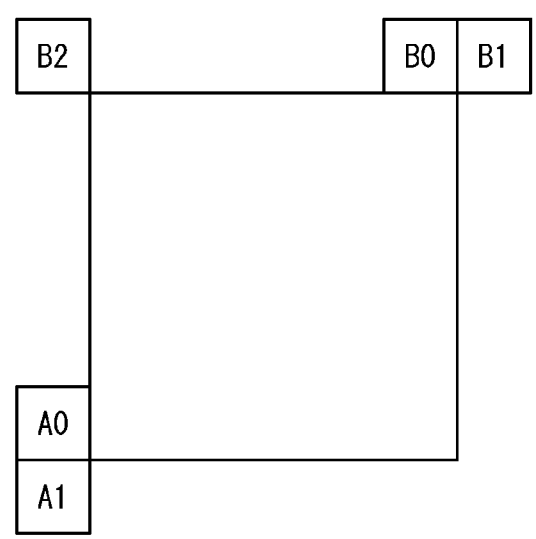

[Fig. 26]
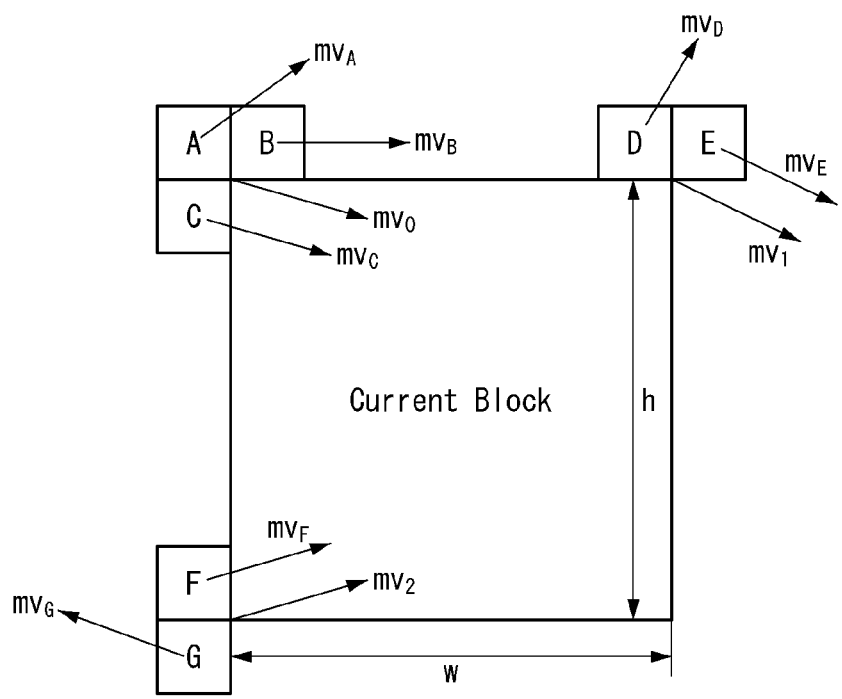

[Fig. 27]
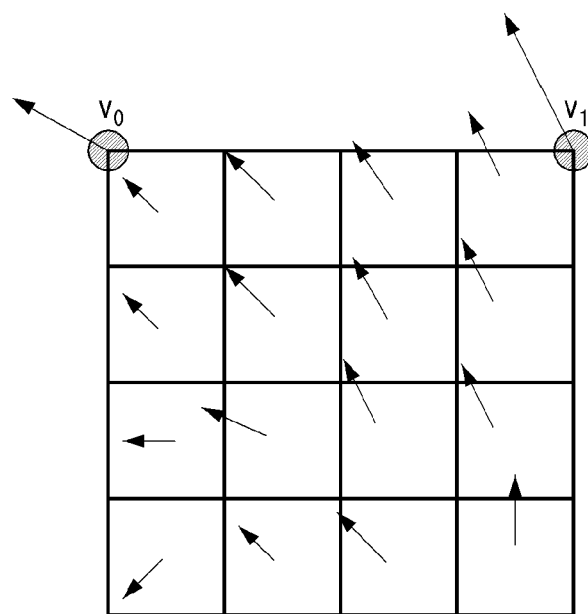

[Fig. 28]
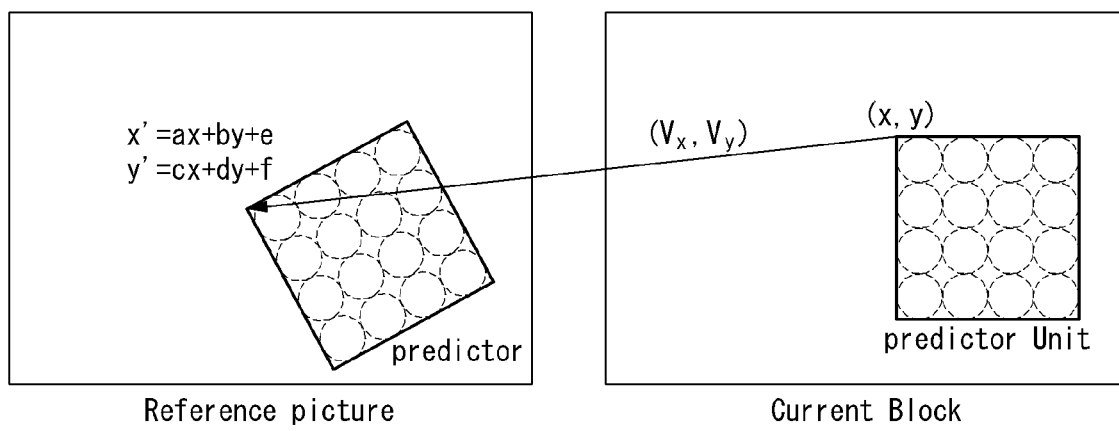

[Fig. 29]
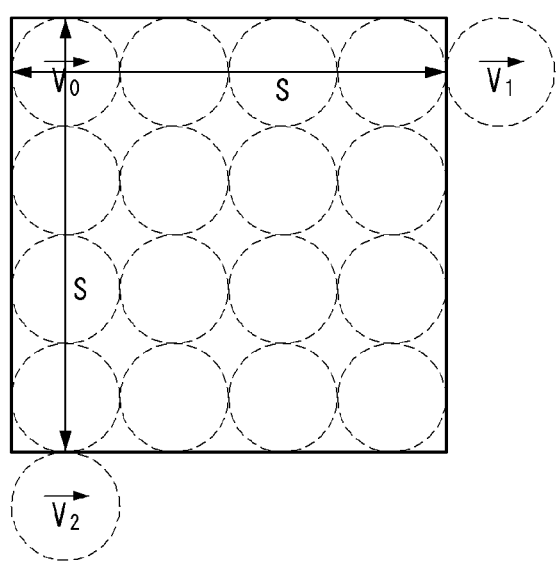

[Fig. 30]
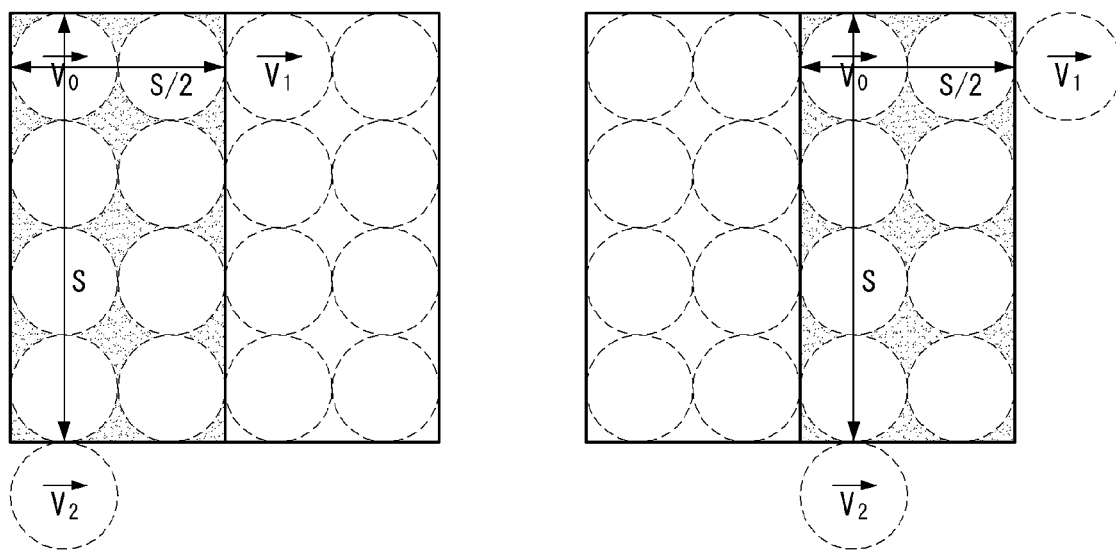

[Fig. 31]
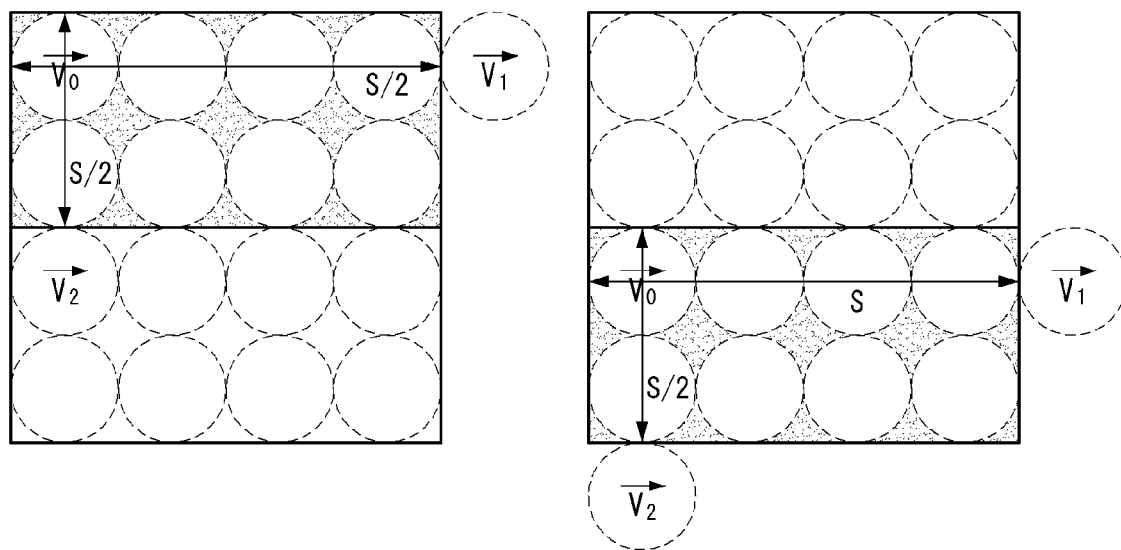

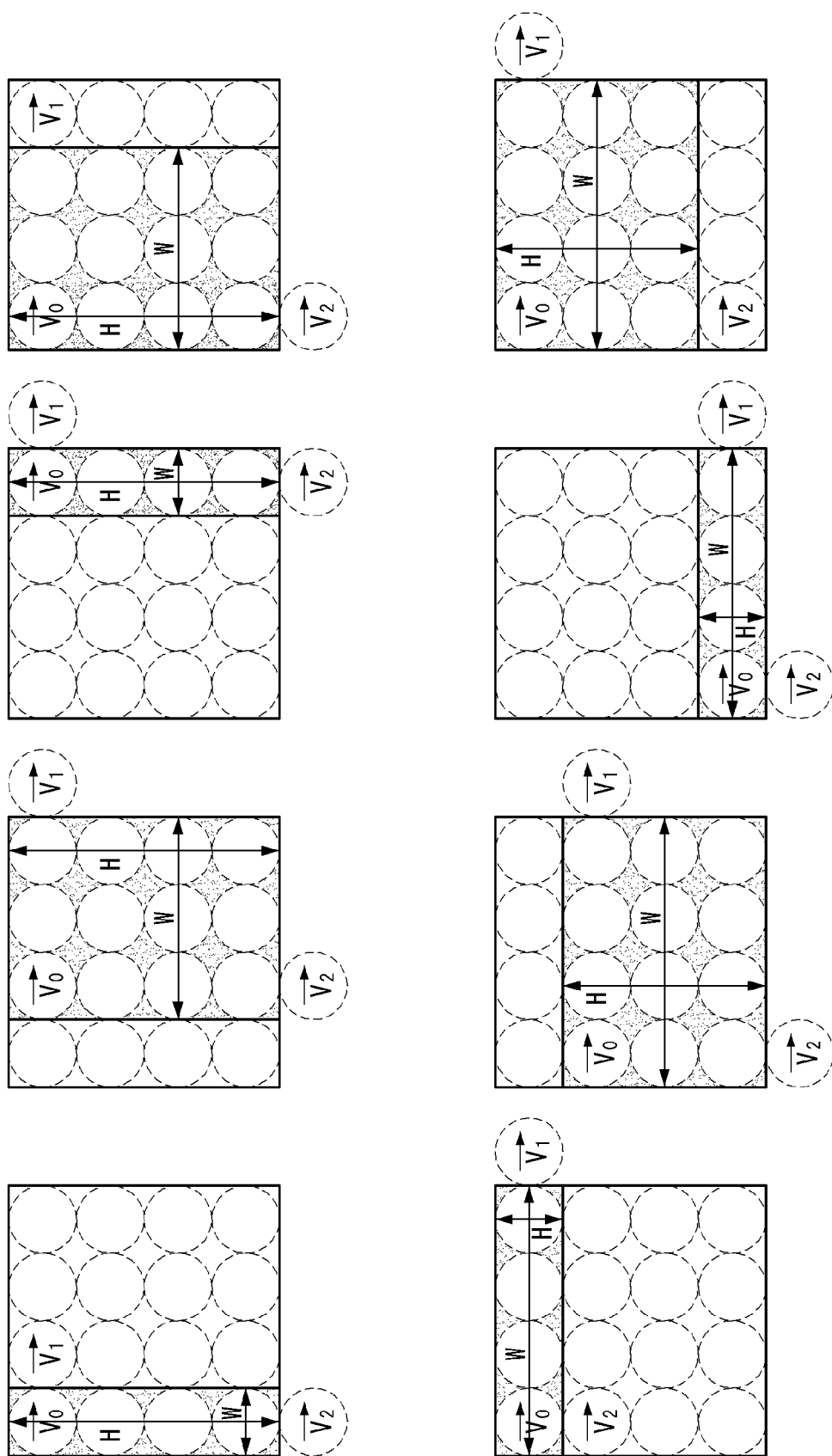
[Fig. 32]

[Fig. 33]
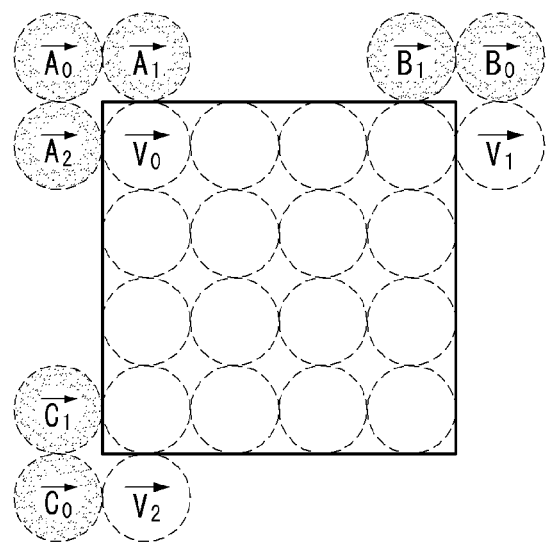

[Fig. 34]
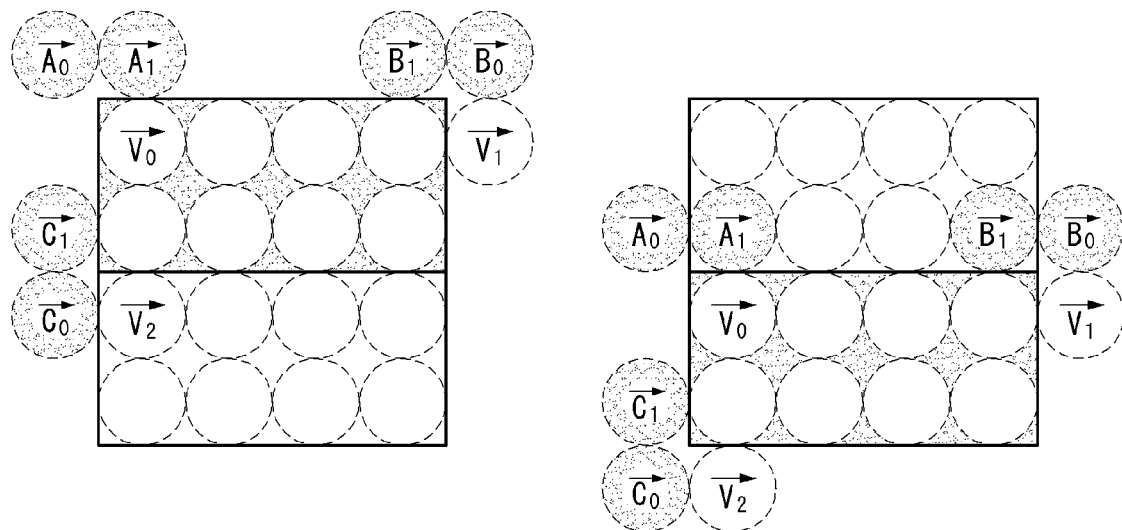

[Fig. 35]
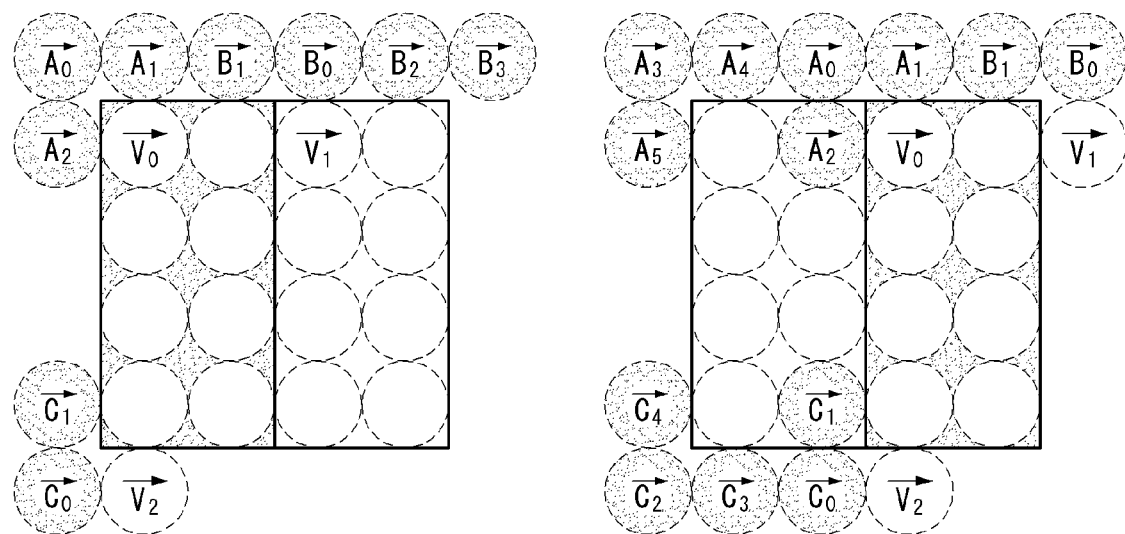

[Fig. 36]
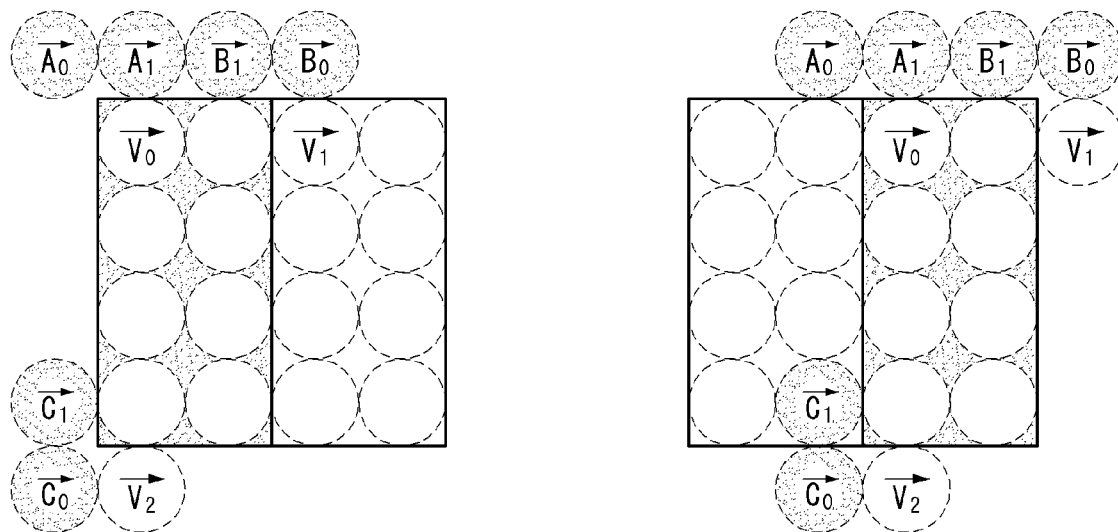

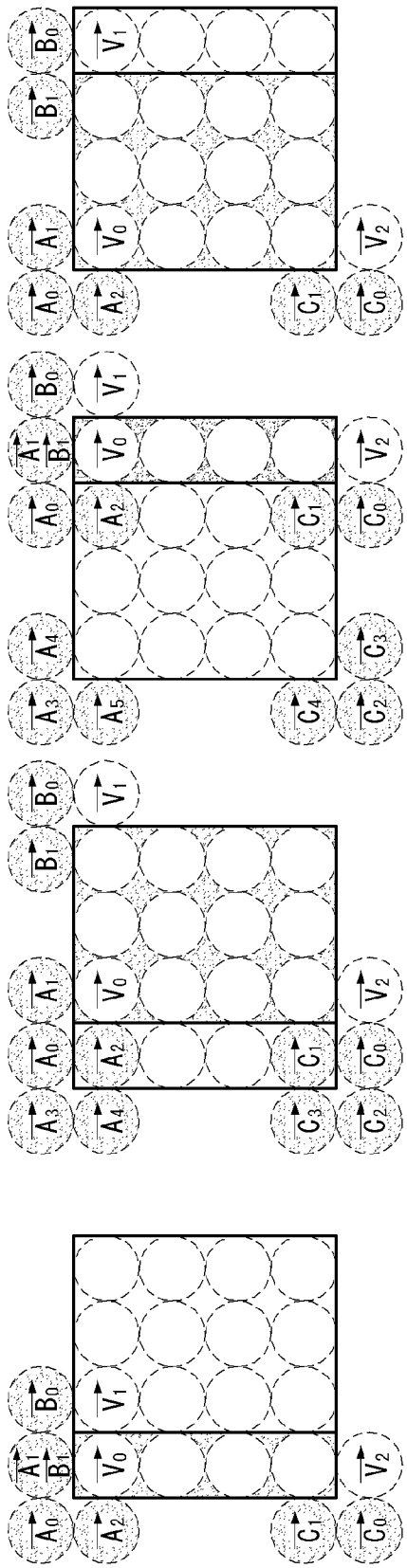
[Fig. 37A]
[Fig. 37B]
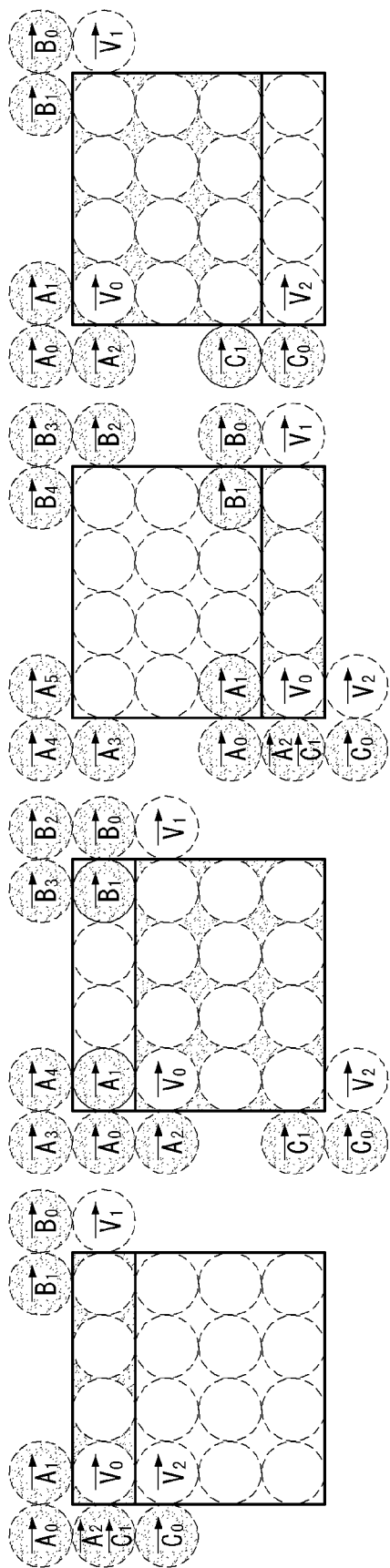
[Fig. 37C]
[Fig. 37D]

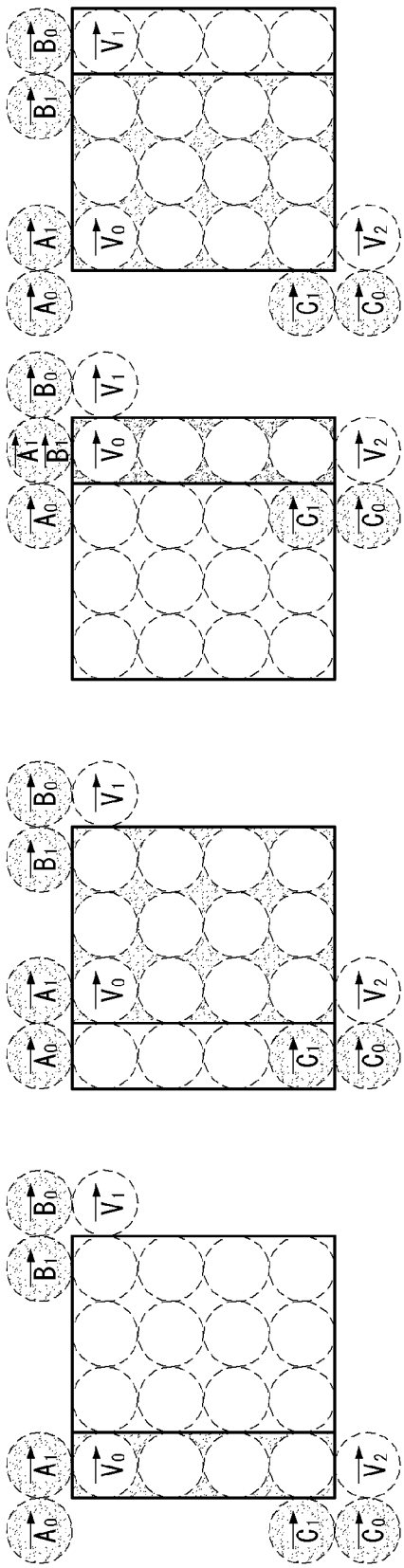
[Fig. 38A]
[Fig. 38B]
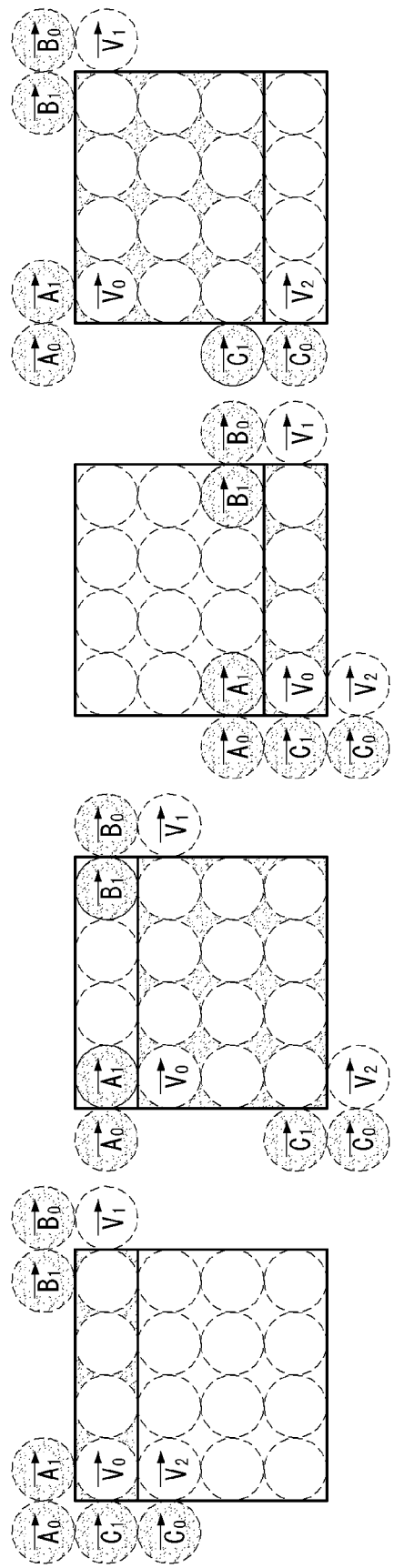
[Fig. 38C]
[Fig. 38D]

[Fig. 39]
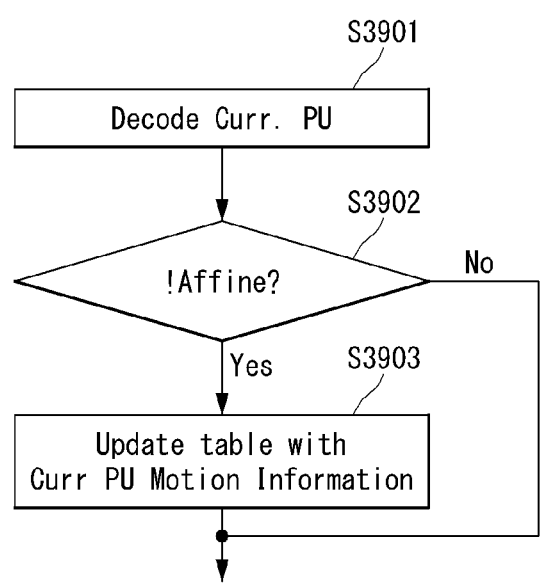

[Fig. 40]
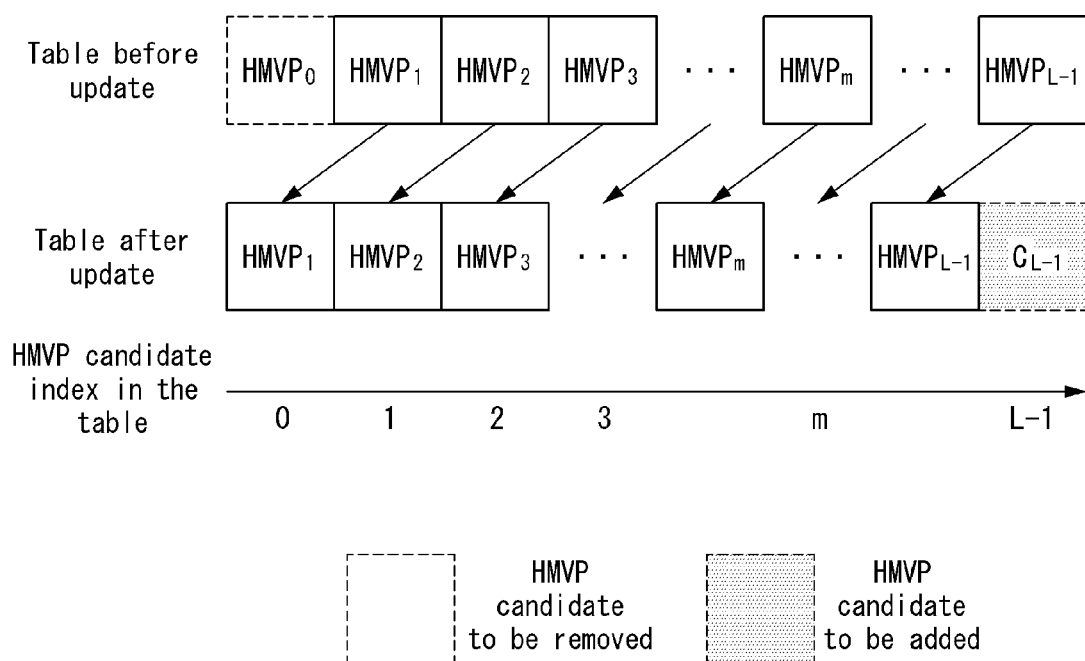

[Fig. 41]
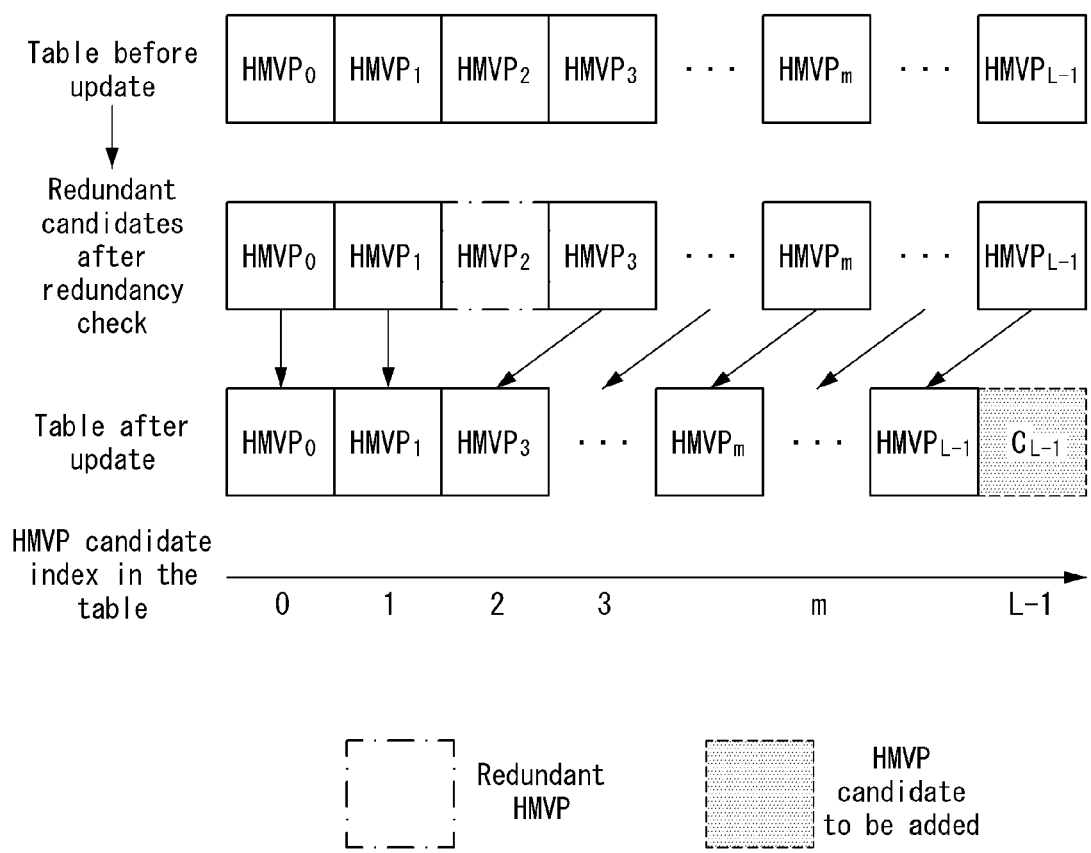

【Fig. 42】
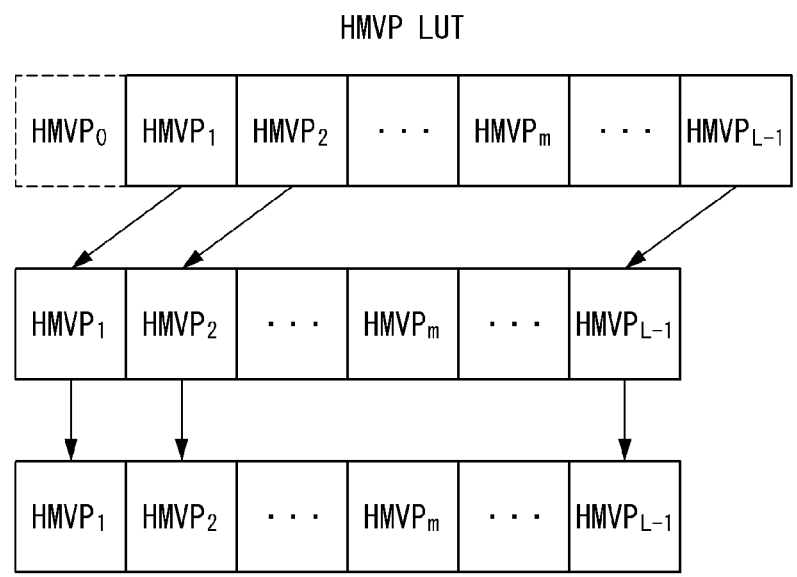
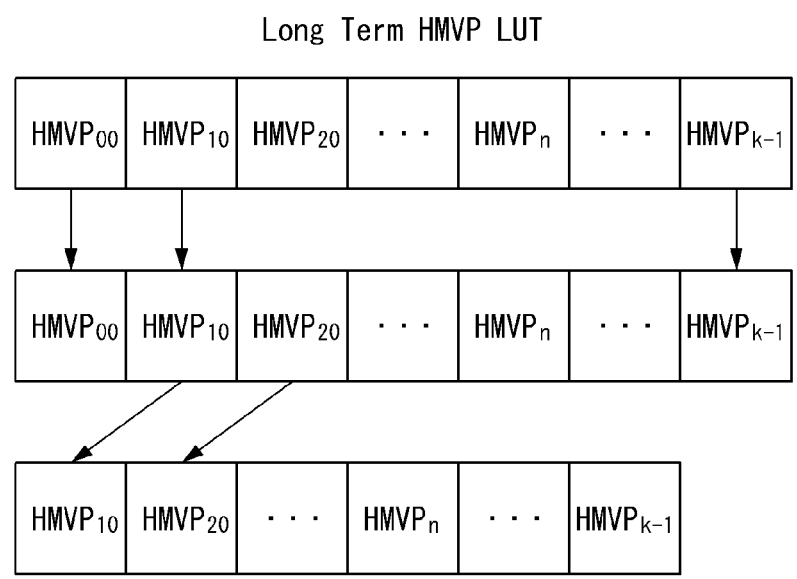

[Fig. 43]
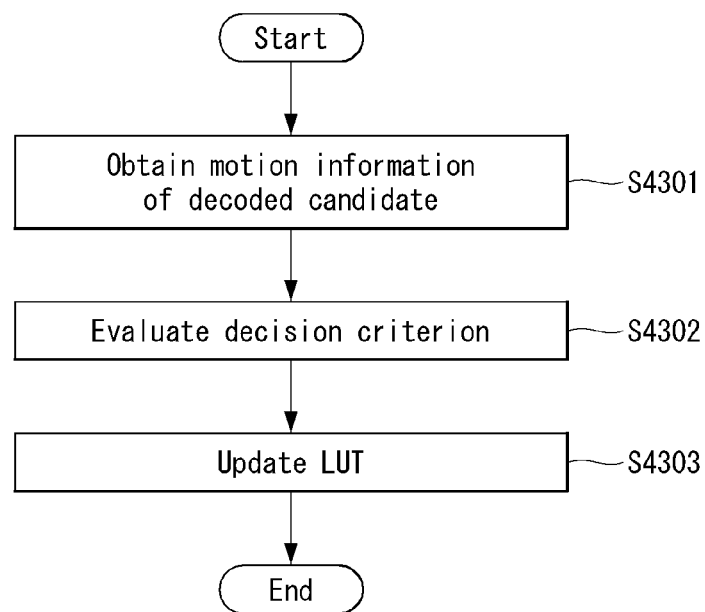

[Fig. 44]
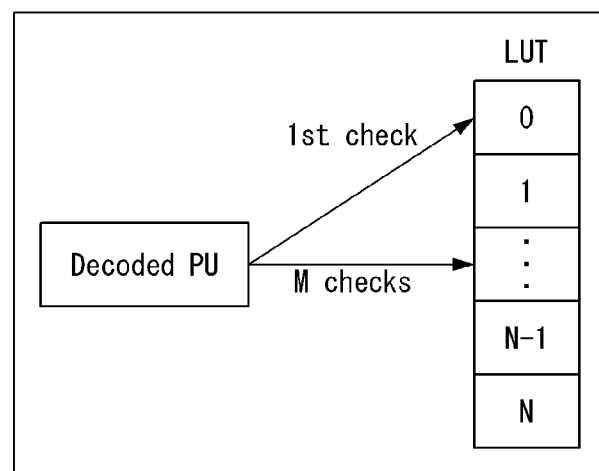

[Fig. 45]
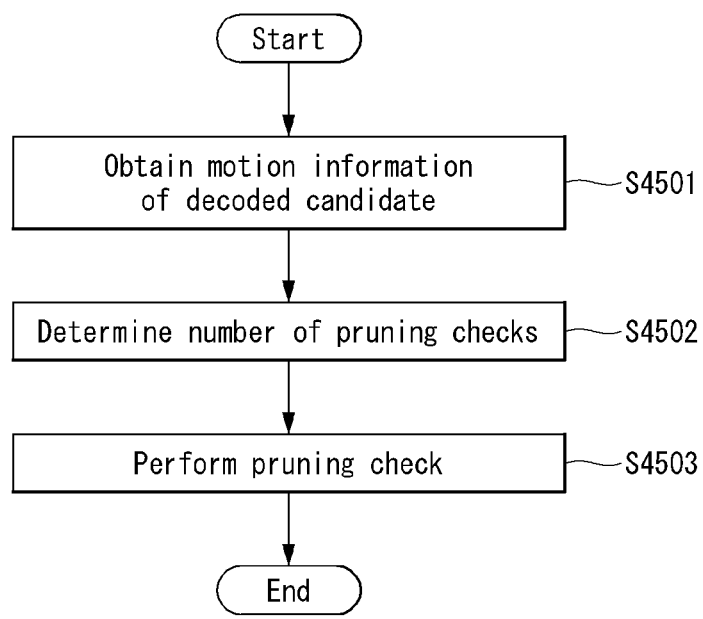

[Fig. 46]
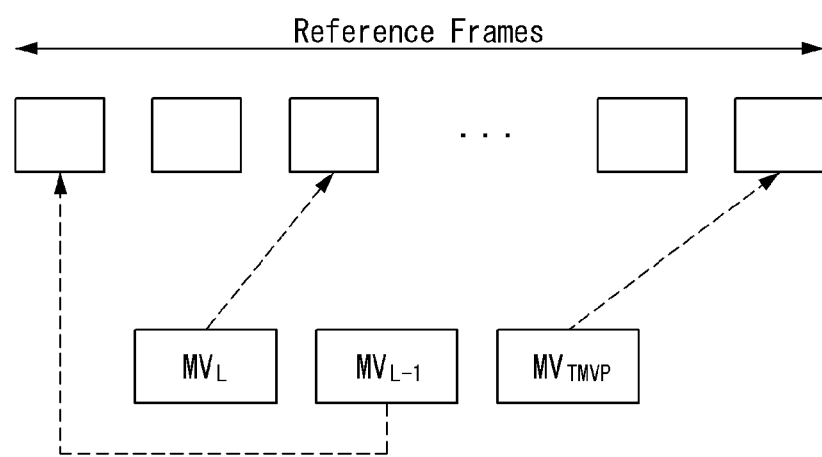

[Fig. 47]
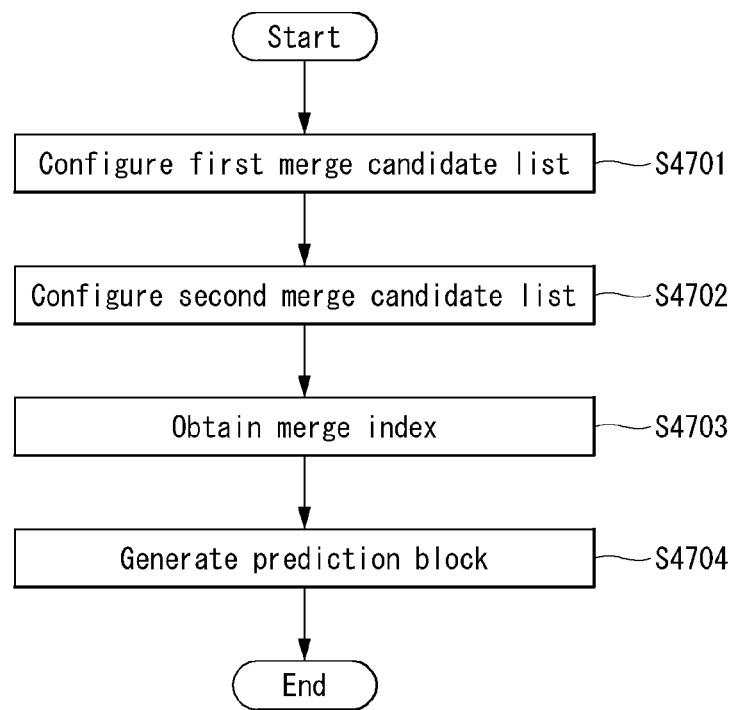

[Fig. 48]
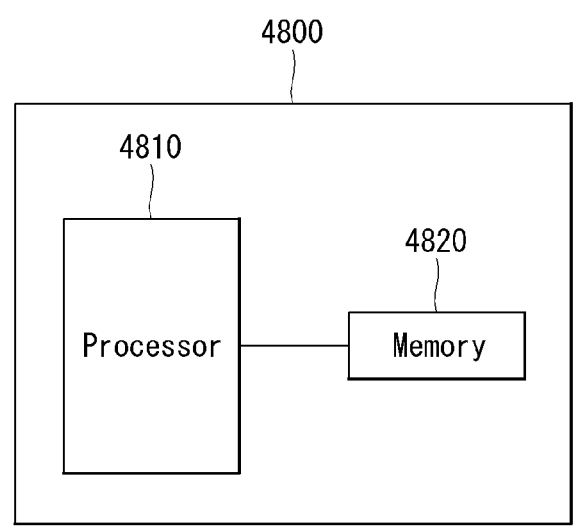

[Fig. 49]
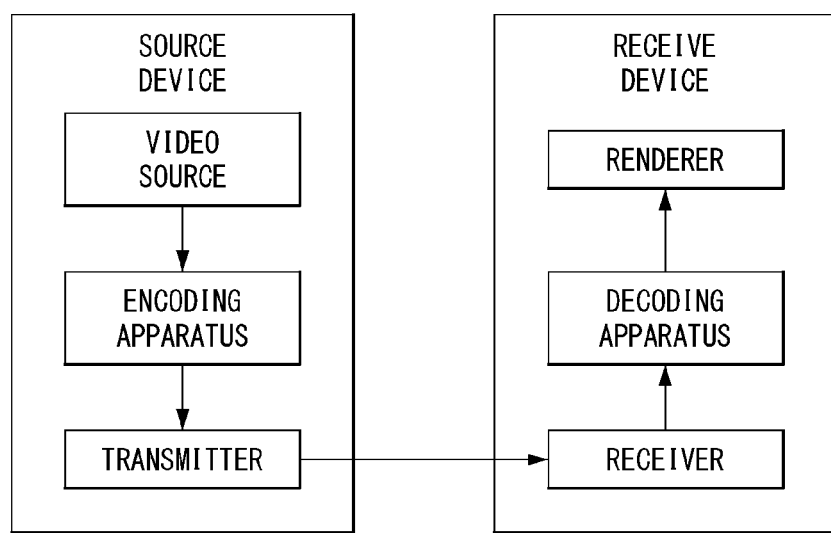

【Fig. 50】
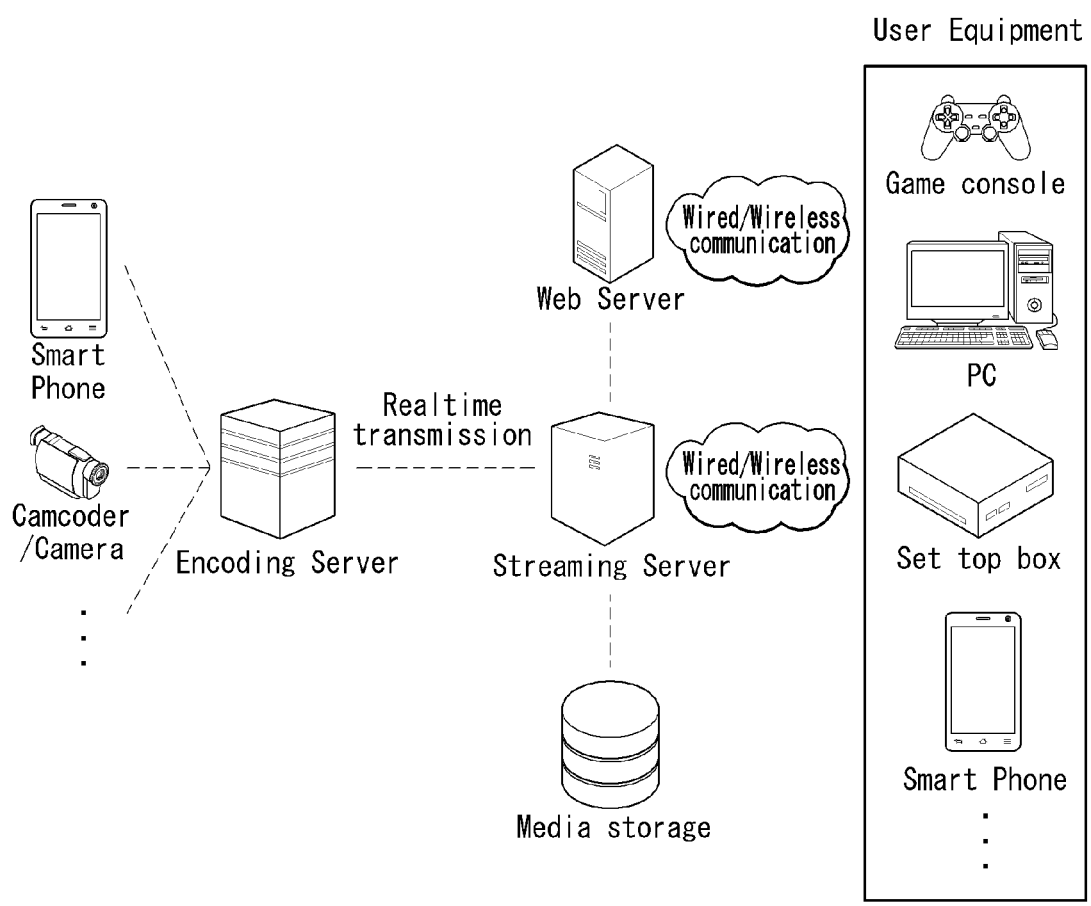

METHOD AND APPARATUS FOR PROCESSING VIDEO SIGNAL BASED ON INTER PREDICTION

CROSS REFERENCE TO RELATED APPLICATIONS

This application claims the benefit of U.S. Provisional Application No. 62/735,027, filed on Sep. 22, 2018 and U.S. Provisional Application No. 62/737,077, filed on Sep. 26, 2018, all of which are hereby incorporated by reference in their entirety for all purposes as if fully set forth herein.

TECHNICAL FIELD

An embodiment of the disclosure relates to a method and apparatus for processing a video signal using inter prediction and, more particularly, to a method and apparatus for performing inter prediction using a history-based motion vector prediction.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An embodiment of the disclosure proposes constraints on redundancy check for adding an HMVP candidate to a merge list (or AMVP list).

Technical objects to be achieved in an embodiment of the disclosure are not limited to the aforementioned technical objects, and other technical objects not described above may be evidently understood by a person having ordinary skill in the art to which the disclosure pertains from the following description.

Technical Solution

In an aspect of an embodiment of the disclosure, a method of processing a video signal based on inter prediction includes constructing a first merge candidate list of a current block using a spatial merge candidate and temporal merge candidate of the current block, constructing a second merge candidate list by adding a history-based merge candidate indicating motion information of a block coded prior to the current block to the first merge candidate list, obtaining a merge index indicating a merge candidate applied to the current block within the second merge candidate list, and generating a prediction block of the current block using motion information of a merge candidate indicated by the merge index. The history-based merge candidate may be added to the first merge candidate list if the history-based merge candidate has motion information not overlapping motion information of a pre-defined merge candidate among merge candidates included in the first merge candidate list.

Preferably, the history-based merge candidate may be added to the first merge candidate list if the history-based merge candidate has motion information not overlapping motion information of a pre-defined specific number of merge candidates among the merge candidates included in the first merge candidate list.

Preferably, the history-based merge candidate may be added to the first merge candidate list if the history-based merge candidate has motion information not overlapping motion information of a specific spatial merge candidate included in the first merge candidate list.

Preferably, the history-based merge candidate is derived from a pre-defined number of candidates within a history-based buffer storing the history-based merge candidates.

Preferably, constructing the second merge candidate list may further include adding a history-based spatial temporal merge candidate. The history-based spatial temporal candidate may be derived using the two history-based merge candidates and the temporal merge candidate.

Preferably, a motion vector of the history-based spatial temporal merge candidate may be derived as an average value of motion vectors of the two history-based merge candidates and an average value of motion vectors of the temporal merge candidates.

In an aspect of an embodiment, an apparatus for processing a video signal based on inter prediction includes a memory storing a video signal and a processor coupled to the memory. The processor may be configured to construct a first merge candidate list of a current block using a spatial merge candidate and temporal merge candidate of the current block, construct a second merge candidate list by adding a history-based merge candidate indicating motion information of a block coded prior to the current block to the first merge candidate list, obtain a merge index indicating a merge candidate applied to the current block within the second merge candidate list, and generate a prediction block of the current block using motion information of a merge candidate indicated by the merge index. The history-based merge candidate may be added to the first merge candidate list if the history-based merge candidate has motion information not overlapping motion information of a pre-defined merge candidate among merge candidates included in the first merge candidate list.

Advantageous Effects

According to an embodiment of the disclosure, complexity according to redundancy check can be improved and efficiency can be enhanced by limiting redundancy check for addition to a merge list (or AMVP list).

Effects which may be obtained in the disclosure are not limited to the aforementioned effects, and other technical effects not described above may be evidently understood by a person having ordinary skill in the art to which the disclosure pertains from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates an example of functional elements of an encoder as an example of an apparatus for processing a video signal according to an embodiment of the disclosure.

FIG. 2 is an embodiment to which the disclosure is applied, and is a schematic block diagram of a decoding apparatus in which the decoding of a video/image signal is performed.

FIG. 3 is an embodiment to which the disclosure may be applied, and is a diagram illustrating an example of a multi-type tree structure.

FIG. 4 is an embodiment to which the disclosure may be applied, and is a diagram illustrating the signaling mechanism of partition division information of a quadtree structure with a nested multi-type tree.

FIG. 5 is an embodiment to which the disclosure may be applied, and is a diagram illustrating a method of splitting a CTU into multiple CUs based on a quadtree and nested multi-type tree structure.

FIG. 6 is an embodiment to which the disclosure may be applied, and is a diagram illustrating a method of constraining binary-tree split.

FIG. 7 is an embodiment to which the disclosure may be applied, and is a diagram illustrating redundant split patterns which may occur in a binary tree split and a ternary-tree split.

FIGS. 8 and 9 are diagrams illustrating an inter prediction-based video/image encoding method according to an embodiment of the disclosure and an inter predictor within an encoding apparatus according to an embodiment of the disclosure.

FIGS. 10 and 11 are diagrams illustrating an inter prediction-based video/image decoding method according to an embodiment of the disclosure and an inter predictor within a decoding apparatus according to an embodiment of the disclosure.

FIG. 12 is an embodiment to which the disclosure is applied, and is a diagram for describing neighboring blocks used in a merge mode or skip mode.

FIG. 13 is a flowchart illustrating a method of constructing a merge candidate list according to an embodiment to which the disclosure is applied.

FIG. 14 is a flowchart illustrating a method of constructing a merge candidate list according to an embodiment to which the disclosure is applied.

FIG. 15 illustrates an example of motion models according to an embodiment of the disclosure.

FIG. 16 illustrates an example of a control point motion vector for an affine motion prediction according to an embodiment of the disclosure.

FIG. 17 illustrates an example of a motion vector for each sub-block of a block to which an affine motion prediction according to an embodiment of the disclosure has been applied.

FIG. 18 illustrates an example of neighboring blocks used for an affine motion prediction in an affine merge mode according to an embodiment of the disclosure.

FIG. 19 illustrates an example of a block on which an affine motion prediction is performed using neighboring blocks to which an affine motion prediction according to an embodiment of the disclosure has been applied.

FIG. 20 is a diagram for describing a method of generating a merge candidate list using a neighbor affine coding block according to an embodiment of the disclosure.

FIGS. 21 and 22 are diagrams for describing a method of constructing an affine merge candidate list using a neighboring block coded by an affine prediction according to an embodiment of the disclosure.

FIG. 23 illustrates an example of neighboring blocks used for an affine motion prediction in an affine inter mode according to an embodiment of the disclosure.

FIG. 24 illustrates an example of neighboring blocks used for an affine motion prediction in an affine inter mode according to an embodiment of the disclosure.

FIGS. 25 and 26 are diagrams illustrating a method of deriving a motion vector candidate using motion information of a neighboring block in an affine inter mode according to an embodiment of the disclosure.

FIG. 27 illustrates an example of an affine motion vector field of a sub-block unit according to an embodiment of the disclosure.

FIG. 28 illustrates a method of generating a prediction block and a motion vector in inter prediction to which an affine motion model has been applied according to an embodiment of the disclosure.

FIG. 29 is a diagram illustrating a method of performing a motion compensation based on a motion vector of a control point according to an embodiment of the disclosure.

FIG. 30 is a diagram illustrating a method of performing a motion compensation based on a motion vector of a control point in a non-square block according to an embodiment of the disclosure.

FIG. 31 is a diagram illustrating a method of performing a motion compensation based on a motion vector of a control point in a non-square block according to an embodiment of the disclosure.

FIGS. 32 to 38 are diagrams illustrating a method of performing a motion compensation based on a motion vector of a control point in a non-square block according to an embodiment of the disclosure.

FIG. 39 is a flowchart for describing a method of storing an HMVP according to an embodiment of the disclosure.

FIG. 40 is a diagram for describing an HMVP table operating in an unconstrained FIFO manner according to an embodiment of the disclosure.

FIG. 41 is a diagram for describing an HMVP table operating in a constraint FIFO manner according to an embodiment of the disclosure.

FIG. 42 is a diagram illustrating an HMVP LUT and a long-term HMVP LUT according to an embodiment of the disclosure.

FIG. 43 is a diagram illustrating an example of a method of updating an HMVP LUT according to an embodiment of the disclosure.

FIG. 44 is a diagram illustrating method of limiting the number of HMVP candidates, that is, a target of pruning check, according to an embodiment of the disclosure.

FIG. 45 is a diagram illustrating an example of a method of performing pruning check according to an embodiment of the disclosure.

FIG. 46 is a diagram for describing a method of deriving an H-STMVP candidate using motion vectors that refer to different reference pictures according to an embodiment of the disclosure.

FIG. 47 is a flowchart illustrating a method of processing a video signal based on inter prediction according to an embodiment to which the disclosure is applied.

FIG. 48 illustrates an example of a block diagram of an apparatus for processing an image signal according to an embodiment of the disclosure.

FIG. 49 illustrates a video coding system to which the disclosure is applied.

FIG. 50 is an embodiment to which the disclosure is applied, and illustrates the structure of a content streaming system.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in this specification, a "processing unit" means a unit in which an encoding/decoding processing process, such as prediction, a transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are generally called a sample. Further-more, to use a sample may mean to use a pixel value, a picture element value or the like.

FIG. 1 illustrates an example of functional elements of an encoder as an example of an apparatus for processing a video signal according to an embodiment of the disclosure.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be configured with a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoder 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion information prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, specifically, the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store a modified reconstructed picture in order to use the modified reconstructed picture as a reference picture in the inter predictor 180. The memory 170 may store motion information of a block from which motion information within a current picture has been derived (or encoded) and/or motion information of blocks within an already reconstructed picture. The stored motion information may be transmitted to the inter predictor 180 in order to be used as motion information of a spatial neighboring block or motion information of a temporal neighboring block. The memory 170 may store reconstructed samples of reconstructed blocks within a current picture and may transmit them to the intra predictor 185.

FIG. 2 is an embodiment to which the disclosure is applied, and is a schematic block diagram of a decoding apparatus in which the decoding of a video/image signal is performed.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 170 may include a decoded picture buffer (DPB), and may be configured with a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 obtains a residual signal (residual block or residual sample array) by inverse-transforming transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, specifically, the DPB of the memory 250. The various filtering methods may include deblocking filtering, a sample adaptive offset, an adaptive loop filter, and a bilateral filter, for example.

A reconstructed picture stored (modified) in the DPB of the memory 250 may be used as a reference picture in the inter predictor 260. The memory 250 may store motion information of a block from which motion information within a current picture has been derived (or decoded) and/or motion information of blocks within an already reconstructed picture. The stored motion information may be transmitted to the inter predictor 260 in order to be used as motion information of a spatial neighboring block or motion information of a temporal neighboring block. The memory 170 may store the reconstructed samples of reconstructed blocks within a current picture, and may transmit them to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

A video/image coding method according to this document may be performed based on various detailed technologies. Each of the detailed technologies is schematically described as follows. It is evident to those skilled in that art that the following technologies may be associated with related procedures, such as a prediction, residual processing ((inverse) transform, (de)quantization), syntax element coding, filtering, and partitioning/division in a video/image encoding/decoding procedure that has been described and/or will be described later.

A block partitioning procedure according to this document may be performed in the image divider 110 of the encoding apparatus. Partitioning-related information may be (encoded) processed in the entropy encoder 190 and transmitted to the decoding apparatus in a bitstream form. The entropy decoder 210 of the decoding apparatus may derive the block partitioning structure of a current picture based on the partitioning-related information obtained from the bitstream, and may perform a series of procedures (e.g., prediction, residual processing, block reconstruction and in-loop filtering) based on the block partitioning structure.

Partitioning of Picture into CTUs

Pictures may be partitioned into a sequence of coding tree units (CTUs). A CTU may correspond to a coding tree block (CTB). Alternatively, a CTU may include a coding tree block of luma samples and two coding tree blocks of corresponding chroma samples. In other words, with respect to a picture including three sample arrays, a CTU may include an N×N block of luma samples and two correspondence blocks of chroma samples.

A maximum allowed size of a CTU for coding and prediction may be different from a maximum allowed size of a CTU for a transform. For example, a maximum allowed size of a luma block within a CTU may be 128×128.

Partitioning of CTUs Using a Tree Structure

A CTU may be partitioned based on a quadtree (QT) structure. A quadtree structure may be called a quaternary tree structure. This is for incorporating various local characteristics. Meanwhile, in this document, a CTU may be partitioned based on multi-type tree structure division including a binary-tree (BT) and a ternary-tree (TT) in addition to a quadtree. Hereinafter, a QTBT structure may include a quadtree and binary-tree-based splitting structure. A QTBTTT may include a quadtree, binary-tree and ternary-tree-based splitting structure. Alternatively, a QTBT structure may include a quadtree, binary-tree and ternary-tree-based splitting structure. In a coding tree structure, a CU may have a square shape or a rectangular shape. A CTU may be partitioned as a quadtree structure. Thereafter, the leaf nodes of a quadtree structure may be additionally partitioned by a multi-type tree structure.

FIG. 3 is an embodiment to which the disclosure may be applied, and is a diagram illustrating an example of a multi-type tree structure.

In an embodiment of the disclosure, a multi-type tree structure may include 4 split types, such as that illustrated in FIG. 3. The 4 split types may include vertical binary splitting SPLIT_BT_VER, horizontal binary splitting SPLIT_BT_HOR, vertical ternary splitting SPLIT_TT_VER, and horizontal ternary splitting SPLIT_TT_HOR. The leaf nodes of the multi-type tree structure may be called CUs. Such CUs may be used for a prediction and transform procedure. In this document, in general, a CU, a PU, or a TU may have the same block size. In this case, if a maximum supported transform length is smaller than the width or height of a colour component of a CU, the CU and TU may have different block sizes.

FIG. 4 is an embodiment to which the disclosure may be applied, and is a diagram illustrating the signaling mechanism of partition division information of a quadtree structure with a nested multi-type tree.

In this case, a CTU is treated as the root of a quadtree, and is first partitioned as a quadtree structure. Each quadtree leaf node may be further partitioned into a multi-type tree structure. In the multi-type tree structure, a first flag (e.g., mtt_split_cu_flag) is signaled to indicate whether a corresponding node is additionally partitioned. If the corresponding node is additionally partitioned, a second flag (e.g., mtt_split_cu_verticla_flag) may be signaled to indicate a splitting direction. Thereafter, a third flag (e.g., mtt_split_cu_binary_flag) may be signaled to indicate whether a split type is binary splitting or ternary splitting. For example, a multi-type tree split mode (MttSplitMode) of a CU may be derived like Table 1 based on the mtt_split_cu_vertical_flag and the mtt_split_cu_binary_flag.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is an embodiment to which the disclosure may be applied, and is a diagram illustrating a method of splitting a CTU into multiple CUs based on a quadtree and nested multi-type tree structure.

In this case, bold block edges indicate quadtree partitioning, and the remaining edges indicate multi-type tree partitioning. A quadtree partition with the multi-type tree may provide a content-adapted coding tree structure. A CU may correspond to a coding block (CB). Alternatively, a CU may include a coding block of luma samples and two coding blocks of corresponding chroma samples. The size of a CU may be greater as much as a CTU or may be small as much as 4×4 in a luma sample unit. For example, in the case of a 4:2:0 color format (or chroma format), a maximum chroma CB size may be 64×64, and a minimum chroma CB size may be 2×2.

In this document, for example, a maximum allowed luma TB size may be 64×64, and a maximum allowed chroma TB size may be 32×32. If the width or height of a CB split based on a tree structure is larger than a maximum transform width or height, the corresponding CB may be split until a TB size constraint in a horizontal and vertical direction is satisfied automatically (or implicitly).

Meanwhile, for a quadtree coding tree scheme with a multi-type tree, the following parameters may be defined and identified as SPS syntax elements.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size For example, in the case of a quadtree coding tree structure with a multi-type tree, a CTU size may be set to 128×128 luma samples and 64×64 blocks of two corresponding chroma samples (in a 4:2:0 chroma format). In this case, MinOTSize may be set to 16×16, MaxBtSize may be set to 128×128, MaxTtSzie may be set to 64×64, and MinBtSize and MinTtSize (for both width and height) may be set to 4×4, and MaxMttDepth may be set to 4. Quadtree partitioning may be applied to a CTU to generate quadtree leaf nodes. A quadtree leaf node may be called a leaf QT node. Quadtree leaf nodes may have a 16×16 size (i.e., MinOTSize) to a 128×128 size (i.e., CTU size). If a leaf QT node is 128×128, it may not be additionally split into a binary-tree/ternary-tree. The reason for this is that although the leaf QT node is spit, it exceeds MaxBtsize and MaxTtszie (i.e., 64×64). In other cases, the leaf QT node may be additionally split into a multi-type tree. Accordingly, the leaf QT node is a root node for a multi-type tree, and the leaf QT node may have a multi-type tree depth (mttDepth) value of 0. If a multi-type tree depth reaches MaxMttdepth (e.g., 4), additional splitting may be no longer considered. If the width of a multi-type tree node is equal to MinBtSize and is smaller than or equal to 2×MinTtSize, additional horizontal splitting may be no longer considered. If the height of a multi-type tree node is equal to MinBtSize and is smaller than or equal to 2×MinTtSize, additional vertical division may be no longer considered.

FIG. 6 is an embodiment to which the disclosure may be applied, and is a diagram illustrating a method of constraining binary-tree split.

Referring to FIG. 6, in order to allow a 64×64 luma block and 32×32 chroma pipeline design in a hardware decoder, TT splitting may be restricted in a specific case. For example, if the width or height of a luma coding block is larger than a preset specific value (e.g., 32, 64), TT splitting may be restricted as illustrated FIG. 6.

In this document, a coding tree scheme may support that a luma and chroma block has a separate block tree structure. With respect to P and B slices, luma and chroma CTBs within one CTU may be restricted to have the same coding tree structure. However, with respect to I slices, luma and chroma blocks may have separate block tree structures. If a separate block tree mode is applied, a luma CTB may be split into CUs based on a specific coding tree structure. A chroma CTB may be split into chroma CUs based on a different coding tree structure. This may mean that a CU within an I slice may be configured with a coding block of a luma component or coding blocks of two chroma components and a CU within a P or B slice may be configured with blocks of three color components.

In the "Partitioning of the CTUs using a tree structure", a quadtree coding tree structure with a multi-type tree has been described, but a structure in which a CU is split is not limited thereto. For example, a BT structure and a TT structure may be interpreted as a concept included in a multiple partitioning tree (MPT) structure, and a CU may be interpreted as being split through a QT structure and an MPT structure. In one example in which a CU is split through a QT structure and an MPT structure, a partitioning structure may be determined by signaling a syntax element (e.g., MPT_split_type), including information indicating that the leaf node of a QT structure is split into how many blocks, and a syntax element (e.g., MPT_split_mode) including information indicating that the leaf node of a QT structure is split in which one of vertical and horizontal directions.

In another example, a CU may be split using a method different from that of a QT structure, a BT structure or a TT structure. That is, unlike in the case where a CU of a deeper depth is split as the ¼ size of a CU of a shallower depth based on a QT structure, or a CU of a deeper depth is split as the ½ size of a CU of a shallower depth based on a BT structure, or a CU of a deeper depth is split as the ¼ or ½ size of a CU of a shallower depth based on a TT structure, a CU of a deeper depth may be split as the ⅕, ⅓, ⅜, ⅗, ⅔ or ⅝ size of a CU of a shallower depth. A method of splitting a CU is not limited thereto.

If a portion of a tree node block exceeds a bottom or right picture boundary, the corresponding tree node block may be restricted so that all the samples of all coded CUs are located within the picture boundaries. In this case, for example, the following division rule may be applied.

If a portion of a tree node block exceeds both the bottom and the right picture boundaries,
  If the block is a QT node and the size of the block is larger than the minimum QT size, the block is forced to be split with QT split mode.
  Otherwise, the block is forced to be split with SPLIT_BT_HOR mode
Otherwise if a portion of a tree node block exceeds the bottom picture boundaries,
  If the block is a QT node, and the size of the block is larger than the minimum QT size, and the size of the block is larger than the maximum BT size, the block is forced to be split with QT split mode.
  Otherwise, if the block is a QT node, and the size of the block is larger than the minimum QT size and the size of the block is smaller than or equal to the maximum BT size, the block is forced to be split with QT split mode or SPLIT_BT_HOR mode.
  Otherwise (the block is a BTT node or the size of the block is smaller than or equal to the minimum QT size), the block is forced to be split with SPLIT_BT_HOR mode.
Otherwise if a portion of a tree node block exceeds the right picture boundaries,
  If the block is a QT node, and the size of the block is larger than the minimum QT size, and the size of the block is larger than the maximum BT size, the block is forced to be split with QT split mode.
  Otherwise, if the block is a QT node, and the size of the block is larger than the minimum QT size and the size of the block is smaller than or equal to the maximum BT size, the block is forced to be split with QT split mode or SPLIT_BT_VER mode.
  Otherwise (the block is a BTT node or the size of the block is smaller than or equal to the minimum QT size), the block is forced to be split with SPLIT_BT_VER mode.

Meanwhile, a quadtree coding block structure with a multi-type tree may provide a very flexible block partitioning structure. Due to split types supported by the multi-type tree, the same coding block structure result may be potentially obtained depending on different split patterns. The amount of data of partitioning information can be reduced by constraining the occurrence of such redundant split patterns. This is described with reference to the following drawing.

FIG. 7 is an embodiment to which the disclosure may be applied, and is a diagram illustrating redundant split patterns which may occur in a binary tree split and a ternary-tree split.

As illustrated in FIG. 7, two levels of consecutive binary splits in one direction has the same coding block structure as a binary split for a center partition after a ternary split. In such a case, a binary tree split (in a given direction) for the center partition of the ternary-tree split may be restricted. Such a constraint may be applied to the CUs of all pictures. If such a specific split is constrained, the signaling of corresponding syntax elements may be modified by incorporating such a constraint case. Accordingly, the number of bits signaled for partitioning can be reduced. For example, as in an example illustrated in FIG. 7, if a binary tree split for the center partition of a CU is constrained, a mtt_split_cu_binary_flag syntax element indicating whether a split is a binary split or a ternary split is not signaled, and a corresponding value may be reasoned as 0 by a decoder.

Prediction

In order to reconstruct a current processing unit in which decoding is performed, a decoded portion of a current picture or other pictures including the current processing unit may be used.

A picture (slice) using only a current picture for reconstruction, that is, on which only an intra-frame prediction is performed may be called an intra picture or I picture (slice). A picture (slice) using a maximum of one motion vector and reference index in order to predict each unit may be called a predictive picture or a P picture (slice). A picture (slice) using a maximum of two motion vectors and reference indices may be called a Bi-predictive picture or a B picture (slice).

An intra prediction means a prediction method of deriving a current processing block from a data element (e.g., sample value) of the same decoded picture (or slice). That is, the method means a method of predicting a pixel value of a current processing block with reference to reconstructed areas within a current picture.

Hereinafter, inter prediction is described more specifically.

Inter Prediction (or Inter-Frame Prediction)

An inter prediction means a prediction method of deriving a current processing block based on a data element (e.g., sample value or motion vector) of a picture other than a current picture. That is, the method means a method of predicting a pixel value of a current processing block with reference to reconstructed areas within another reconstructed picture other than a current picture.

An inter prediction (or inter-picture prediction) is a technology for removing redundancy present between pictures, and is chiefly performed through motion estimation and a motion compensation.

An embodiment of the disclosure describes a detailed technology of the inter prediction method described in FIGS. 1 and 2. In the case of a decoder, the embodiment may be described by an inter prediction-based video/image decoding method of FIG. 10 and an inter predictor within a decoding apparatus of FIG. 11. Furthermore, in the case of an encoder, the embodiment may be described by an inter prediction-based video/image encoding method of FIG. 8 and an inter predictor within an encoding apparatus of FIG. 9. In addition, data encoded by FIGS. 8 and 9 may be stored in the form of a bitstream.

The predictor of the encoding apparatus/decoding apparatus may derive a prediction sample by performing inter prediction in a block unit. The inter prediction may indicate a prediction derived using a method dependent on data elements (e.g., sample values or motion information) of a picture(s) other than a current picture. If inter prediction is applied to a current block, a predicted block (prediction sample array) for the current block may be derived based on a reference block (reference sample array) specified by a motion vector on a reference picture indicated by a reference picture index.

In this case, in order to reduce the amount of motion information transmitted in an inter prediction mode, motion information of a current block may be predicted in a block, sub-block or sample unit based on a correlation between motion information of a neighboring block and the motion information of the current block. The motion information may include a motion vector and a reference picture index. The motion information may further include inter prediction type (L0 prediction, L1 prediction, Bi prediction) information.

If inter prediction is applied, a neighboring block may include a spatial neighboring block present within a current picture and a temporal neighboring block present within a reference picture. The reference picture including a reference block and a reference picture including the temporal neighboring block may be the same or different. The temporal neighboring block may be referred to as a name called a co-located reference block or a co-located CU (colCU). The reference picture including the temporal neighboring block may be referred to as a co-located picture (colPic). For example, a motion information candidate list may be configured based on neighboring blocks of a current block. A flag or index information indicating which candidate is selected (used) in order to derive a motion vector and/or reference picture index of a current block may be signaled.

Inter prediction may be performed based on various prediction modes. For example, in the case of a skip mode and a merge mode, motion information of a current block may be the same as that of a selected neighboring block. In the case of the skip mode, unlike the merge mode, a residual signal may not be transmitted. In the case of a motion information prediction (motion vector prediction, MVP) mode, a motion vector of a selected neighboring block may be used as a motion vector predictor, and a motion vector difference may be signaled. In this case, the motion vector of a current block may be derived using the sum of the motion vector predictor and the motion vector difference.

FIGS. 8 and 9 are diagrams illustrating an inter prediction-based video/image encoding method according to an embodiment of the disclosure and an inter predictor within an encoding apparatus according to an embodiment of the disclosure.

Referring to FIGS. 8 and 9, S801 may be performed by the inter predictor 180 of the encoding apparatus. S802 may be performed by the residual processor of the encoding apparatus. Specifically, S802 may be performed by the subtractor 115 of the encoding apparatus. In S803, prediction information may be derived by the inter predictor 180 and may be encoded by the entropy encoder 190. In S803, residual information may be derived by the residual processor and may be encoded by the entropy encoder 190. The residual information is information on residual samples. The residual information may include information on quantized transform coefficients for the residual samples.

As described above, the residual samples may be derived as transform coefficients through the transformer 120 of the encoding apparatus. The transform coefficients may be derived as quantized transform coefficients through the quantizer 130. The information on quantized transform coefficients may be encoded in the entropy encoder 190 through a residual coding procedure.

The encoding apparatus performs inter prediction on a current block (S801). The encoding apparatus may derive an inter prediction mode and motion information of the current block, and may generate the prediction samples of the current block. In this case, the inter prediction mode determination, motion information derivation and prediction sample generation procedure may be performed at the same time, and any one procedure may be performed prior to another procedure. For example, the inter predictor 180 of the encoding apparatus may include a prediction mode determination unit 181, a motion information derivation unit 182, and a prediction sample derivation unit 183. The prediction mode determination unit 181 may determine a prediction mode for a current block. The motion information derivation unit 182 may derive motion information of the current block. The prediction sample derivation unit 183 may derive motion samples of the current block.

For example, the inter predictor 180 of the encoding apparatus may search a given area (search area) of reference pictures for a block similar to a current block through motion estimation, and may derive a reference block having a minimum difference or a difference of a given reference or less with respect to the current block. The inter predictor 180 may derive a reference picture index indicating a reference picture in which a reference block is located based on the reference block, and may derive a motion vector based on a location difference between the reference block and the current block. The encoding apparatus may determine a mode applied to the current block among various prediction modes. The encoding apparatus may compare RD costs for the various prediction modes, and may determine an optimal prediction mode for the current block.

For example, if a skip mode or merge mode is applied to the current block, the encoding apparatus may configure a merge candidate list to be described later, and may derive a reference block having a minimum difference or a difference of a given reference or less with respect to the current block among reference blocks indicated by merge candidates included in a merge candidate list. In this case, a merge candidate associated with the derived reference block may be selected. Merge index information indicating the selected merge candidate may be generated and signaled to the decoding apparatus. Motion information of the current block may be derived using motion information of the selected merge candidate.

For another example, if an (A)MVP mode is applied to the current block, the encoding apparatus may configure an (A)MVP candidate list to be described later, and may use a motion vector of a motion vector predictor (mvp) candidate, selected among mvp candidates included in the (A)MVP candidate list, as the mvp of the current block. In this case, for example, a motion vector indicating the reference block derived by the motion estimation may be used as the motion vector of the current block. An mvp candidate including a motion vector having the smallest difference with respect to the motion vector of the current block, among the mvp candidates, may become the selected mvp candidate. A motion vector difference (MVD), that is, a difference obtained by subtracting the mvp from the motion vector of the current block, may be derived. In this case, information on the MVD may be signaled to the decoding apparatus. Furthermore, if an (A)MVP mode is applied, a value of the reference picture index may be configured as reference picture index information and may be separately signaled to the decoding apparatus.

The encoding apparatus may derive residual samples based on the prediction samples (S802). The encoding apparatus may derive the residual samples through a comparison between the original samples of the current block and the prediction samples.

The encoding apparatus encodes image information including prediction information and residual information (S803). The encoding apparatus may output the encoded image information in a bitstream form. The prediction information may include information on prediction mode information (e.g., skip flag, merge flag or mode index) and motion information as information related to the prediction procedure. The information related to motion information may include candidate selection information (e.g., merge index, mvp flag or mvp index), that is, information for deriving a motion vector. Furthermore, the information related to motion information may include information on the MVD and/or reference picture index information.

Furthermore, the information related to motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus over a network.

Meanwhile, as described above, the encoding apparatus may generate a reconstructed picture (including reconstructed samples and reconstructed block) based on the reference samples and the residual samples. This is for deriving, in the encoding apparatus, the same prediction results as those performed in the decoding apparatus. Accordingly, coding efficiency can be improved. Accordingly, the encoding apparatus may store the reconstructed picture (or reconstructed samples and reconstructed block) in the memory, and may use the reconstructed picture as a reference picture for inter prediction. As described above, an in-loop filtering procedure may be further applied to the reconstructed picture.

FIGS. 10 and 11 are diagrams illustrating an inter prediction-based video/image decoding method according to an embodiment of the disclosure and an inter predictor within a decoding apparatus according to an embodiment of the disclosure.

Referring to FIGS. 10 and 11, the decoding apparatus may perform an operation corresponding to an operation performed in the encoding apparatus. The decoding apparatus may perform prediction on a current block based on received prediction information, and may derive prediction samples.

S1001 to S1003 may be performed by the inter predictor 260 of the decoding apparatus. Residual information in S1004 may be obtained from a bitstream by the entropy decoder 210 of the decoding apparatus. The residual processor of the decoding apparatus may derive residual samples for a current block based on the residual information. Specifically, the dequantizer 220 of the residual processor may derive transform coefficients by performing de-quantization based on quantized transform coefficients derived based on the residual information. The inverse transformer 230 of the residual processor may derive residual samples for the current block by performing an inverse transform on the transform coefficients. S1005 may be performed by the adder 235 or reconstructor of the decoding apparatus.

Specifically, the decoding apparatus may determine a prediction mode for the current block based on received prediction information (S1001). The decoding apparatus may determine which inter prediction mode is applied to the current block based on prediction mode information within the prediction information.

For example, the decoding apparatus may determine whether the merge mode or (A)MVP mode is applied to the current block based on the merge flag. Alternatively, the decoding apparatus may select one of various inter prediction mode candidates based on the mode index. The inter prediction mode candidates may include a skip mode, a merge mode and/or an (A)MVP mode or may include various inter prediction modes to be described later.

The decoding apparatus derives motion information of the current block based on the determined inter prediction mode (S1002). For example, if a skip mode or merge mode is applied to the current block, the decoding apparatus may configure a merge candidate list to be described later and select one of merge candidates included in the merge candidate list. The selection may be performed based on the selection information (merge index). Motion information of the current block may be derived based on the motion information of the selected merge candidate. The motion information of the selected merge candidate may be used the motion information of the current block.

For another example, if an (A)MVP mode is applied to the current block, the decoding apparatus may configure an (A)MVP candidate list to be described later, and may use a motion vector of a motion vector predictor (mvp) candidate, selected among mvp candidates included in the (A)MVP candidate list, as the mvp of the current block. The selection may be performed based on the selection information (mvp flag or mvp index). In this case, the decoding apparatus may derive the MVD of the current block based on information on the MVD. The decoding apparatus may derive the motion vector of the current block based on the mvp of the current block and the MVD. Furthermore, the decoding apparatus may derive the reference picture index of the current block based on the reference picture index information. A picture indicated by the reference picture index within a reference picture list regarding the current block may be derived as a reference picture referred for the inter prediction of the current block.

Meanwhile, as will be described later, motion information of the current block may be derived without a candidate list configuration. In this case, motion information of the current block may be derived according to a procedure disclosed in a prediction mode to be described later. In this case, a candidate list configuration, such as that described above, may be omitted.

The decoding apparatus may generate prediction samples for the current block based on the motion information of the current block (S1003). In this case, the decoding apparatus may derive a reference picture based on the reference picture index of the current block, and may derive the prediction samples of the current block indicated on the reference picture by the motion vector of the current block. In this case, as will be described later, a prediction sample filtering procedure may be further performed on some of or all the prediction samples of the current block according to circumstances.

For example, the inter predictor 260 of the decoding apparatus may include a prediction mode determination unit 261, a motion information derivation unit 262, and a prediction sample derivation unit 263. The decoding apparatus may determine a prediction mode of the current block based on prediction mode information received from the prediction mode determination unit 261, may derive motion information (motion vector and/or the reference picture index) of the current block based on information related to motion information received from the motion information derivation unit 262. The prediction sample derivation unit 263 may derive the prediction samples of the current block.

The decoding apparatus generates residual samples for the current block based on the received residual information (S1004). The decoding apparatus may generate reconstructed samples for the current block based on the prediction samples and the residual samples, and may generate a reconstructed picture based on the reconstructed samples (S1005). Thereafter, as described above, an in-loop filtering procedure may be further applied to the reconstructed picture.

As described above, the inter prediction procedure may include an inter prediction mode determination step, a motion information derivation step according to a determined prediction mode, and a prediction execution (prediction sample generation) step based on derived motion information.

Determination of Inter Prediction Mode

Various inter prediction modes may be used for the prediction of a current block within a picture. For example, various modes, such as a merge mode, a skip mode, an MVP mode, and an affine mode, may be used. A decoder side motion vector refinement (DMVR) mode, an adaptive motion vector resolution (AMVR) mode, etc. may be further used as additional modes. The affine mode may be referred to as an affine motion prediction mode. The MVP mode may be referred to as an advanced motion vector prediction (AMVP) mode.

Prediction mode information indicating an inter prediction mode of a current block may be signaled from an encoding apparatus to a decoding apparatus. The prediction mode information may be included in a bitstream and received by the decoding apparatus. The prediction mode information may include index information indicating one of multiple candidate modes. Alternatively, an inter prediction mode may be indicated through the hierarchical signaling of flag information. In this case, the prediction mode information may include one or more flags.

For example, a flag may be further signaled in order to indicate whether a skip mode is applied by signaling a skip flag, to indicate whether a merge mode is applied by signaling a merge flag if a skip mode is not applied, and to indicate that an MVP mode is applied if a merge mode is not applied or for an additional identification. The affine mode may be signaled as an independent mode or may be signaled as a mode dependent on a merge mode or MVP mode. For example, the affine mode may be configured as one of a merge candidate list or MVP candidate list, as will be described later.

Derivation of Motion Information According to Inter Prediction Mode

Inter prediction may be performed using motion information of a current block. The encoding apparatus may derive optimal motion information for a current block according to a motion estimation procedure. For example, the encoding apparatus may search a reference block having a similar correlation using the original block within the original picture for a current block in a fraction pixel unit within a determined search range within a reference picture. Accordingly, the encoding apparatus may derive motion information. The similarity of a block may be derived based on a difference between phase-based sample values. For example, the similarity of a block may be calculated based on a SAD between a current block (or the template of the current block) and a reference block (or the template of the reference block). In this case, motion information may be derived based on a reference block having the smallest SAD within a search area. The derived motion information may be signaled to the decoding apparatus using several methods based on an inter prediction mode.

Merge Mode and Skip Mode

FIG. 12 is an embodiment to which the disclosure is applied, and is a diagram for describing neighboring blocks used in a merge mode or skip mode.

If a merge mode is applied, motion information of a current prediction block is not directly transmitted, and motion information of the current prediction block is derived using motion information of a neighboring prediction block. Accordingly, the motion information of the current prediction block may be indicated by transmitting flag information to notify that a merge mode has been used and a merge index to notify which neighboring prediction block has been used.

In an embodiment of the disclosure,

In an embodiment of the disclosure, an encoder may search a merge candidate block used to derive motion information of a current prediction block in order to perform a merge mode. For example, a maximum of up to 5 merge candidate blocks may be used, but the disclosure is not limited thereto. Furthermore, a maximum number of merge candidate blocks may be transmitted in a slice header (or tile group header), and the disclosure is not limited thereto. After merge candidate blocks are searched, the encoder may generate a merge candidate list, and may select a merge candidate block having the smallest cost, among the merge candidate blocks, as the final merge candidate block.

An embodiment of the disclosure provides various embodiments of merge candidate blocks constructing a merge candidate list.

The merge candidate list may use 5 merge candidate blocks, for example. For example, 4 spatial merge candidates and 1 temporal merge candidate may be used. For detailed example, in the case of a spatial merge candidate, blocks illustrated in FIG. 12 may be used as spatial merge candidates.

FIG. 13 is a flowchart illustrating a method of constructing a merge candidate list according to an embodiment to which the disclosure is applied.

Referring to FIG. 13, a coding apparatus (encoder/decoder) searches spatial neighboring blocks of a current block and inserts derived spatial merge candidates into a merge candidate list (S1301). For example, the spatial neighboring blocks may include the bottom left corner neighboring block, left neighboring block, top right corner neighboring block, top neighboring block, and top left corner neighboring block of the current block. In this case, this is an example, and additional neighboring blocks, such as a right neighboring block, a bottom neighboring block, and a bottom right neighboring block, in addition to the spatial neighboring blocks may be further used as the spatial neighboring blocks. The coding apparatus may detect available blocks by searching the spatial neighboring blocks based on priority, and may derive motion information of the detected blocks as the spatial merge candidates. For example, the encoder and the decoder may search the 5 blocks illustrated in FIG. 12 in the sequence of A1, B1, B0, A0, and B2, and may configure a merge candidate list by sequentially indexing available candidates.

The coding apparatus searches a temporal neighboring block of the current block and inserts a derived temporal merge candidate into the merge candidate list (S1302). The temporal neighboring block may be located on a reference picture, that is, a picture different from a current picture in which the current block is located. A reference picture in which the temporal neighboring block is located may be called a co-located picture or a col picture. The temporal neighboring block may be searched in the sequence of the bottom right corner neighboring block and bottom right center block of a co-located block for the current block on the col picture.

Meanwhile, if motion data compression is applied, specific motion information may be stored in the col picture as representative motion information for each given storage unit. In this case, it is not necessary to store motion information for all blocks within the given storage unit, and thus a motion data compression effect can be obtained. In this case, the given storage unit may be predetermined as a 16×16 sample unit or an 8×8 sample unit, for example, or size information for the given storage unit may be signaled from the encoder to the decoder. If the motion data compression is applied, motion information of the temporal neighboring block may be substituted with representative motion information of the given storage unit in which the temporal neighboring block is located.

That is, in this case, in an implementation aspect, after an arithmetic right shift is performed by a given value based on the coordinates (top left sample position) of the temporal neighboring block not a prediction block in which the coordinates of the temporal neighboring block are located, the temporal merge candidate may be derived based on motion information of a prediction block that covers the arithmetic left-shifted location. For example, if the given storage unit is a 2n×2n sample unit, assuming that the coordinates of the temporal neighboring block are (xTnb, yTnb), motion information of a prediction block located in ((xTnb>>n)<<n), (yTnb>>n)<<n)), that is, a modified location, may be used for the temporal merge candidate.

Specifically, for example, if the given storage unit is a 16×16 sample unit, assuming that the coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that the coordinates of the temporal neighboring block are (xTnb, yTnb), motion information of a prediction block located in ((xTnb>>3)<<3), (yTnb>>3)<<3)), that is, a modified location, may be used for the temporal merge candidate.

The coding apparatus may check whether the current number of merge candidates is smaller than a maximum number of merge candidates (S1303). The maximum number of merge candidates may be pre-defined or may be signaled from the encoder to the decoder. For example, the encoder may generate information on the maximum number of merge candidates, may encode the information, and may transmit the information to the decoder in a bitstream form. If the maximum number of merge candidates is filled, a candidate addition process may not be performed.

If, as a result of the check, the current number of merge candidates is smaller than the maximum number of merge candidates, the coding apparatus inserts an added merge candidate into the merge candidate list (S1304). The added merge candidate may include an ATMVP, a combined bi-predictive merge candidate (if the slice type of a current slice is a B type) and/or a zero vector merge candidate, for example.

If, as a result of the check, the current number of merge candidates is not smaller than the maximum number of merge candidates, the coding apparatus may terminated the configuration of the merge candidate list. In this case, the encoder may select an optimal merge candidate, among merge candidates constructing the merge candidate list, based on a rate-distortion (RD) cost, and may signal, to the decoder, selection information (e.g., merge index) indicating the selected merge candidate. The decoder may select the optimal merge candidate based on the merge candidate list and the selection information.

Motion information of the selected merge candidate may be used as motion information of the current block. As described above, prediction samples of the current block may be derived based on the motion information of the current block. The encoder may derive residual samples of the current block based on the prediction samples, and may signal, to the decoder, residual information related to the residual samples. The decoder may generate reconstructed samples based on the residual samples derived based on the residual information and the prediction samples. As described above, the decoder may generate a reconstructed picture based on the reconstructed samples.

If a skip mode is applied, motion information of the current block may be derived using the same method as that the merge mode is applied. In this case, if the skip mode is applied, a residual signal for a corresponding block is omitted. Accordingly, prediction samples can be directly used as reconstructed samples.

MVP Mode

FIG. 14 is a flowchart illustrating a method of constructing a merge candidate list according to an embodiment to which the disclosure is applied.

If a motion vector prediction (MVP) mode is applied, a motion vector predictor (mvp) candidate list may be generated based on a motion vector of a reconstructed spatial neighboring block (e.g., the neighboring block described in FIG. 12) and/or a motion vector corresponding to a temporal neighboring block (or Col block). That is, the motion vector of the reconstructed spatial neighboring block and/or the motion vector of the temporal neighboring block may be used as a motion vector predictor candidate.

The information on prediction may include selection information (e.g., MVP flag or MVP index) indicating an optimal motion vector predictor candidate selected among motion vector predictor candidates included in the list. In this case, the predictor may select the motion vector predictor of a current block, among motion vector predictor candidates included in a motion vector candidate list, using the selection information. The predictor of the encoding apparatus may calculate a motion vector difference (MVD) between the motion vector of the current block and the motion vector predictor, may encode the MVD, and may output the encoded MVD in a bitstream form. That is, the MVD may be calculated as a value obtained by subtracting the motion vector predictor from the motion vector of the current block. In this case, the predictor of the decoding apparatus may obtain a motion vector difference included in the information on prediction, and may derive the motion vector of the current block through the addition of the motion vector difference and the motion vector predictor. The predictor of the decoding apparatus may obtain or derive a reference picture index indicating a reference picture from the information on prediction. For example, a motion vector predictor candidate list may be configured as illustrated in FIG. 14.

Affine Motion Prediction

FIG. 15 illustrates an example of motion models according to an embodiment of the disclosure.

In a conventional image compression technology (e.g., high efficiency video coding (HEVC)), one motion vector is used to represent a motion of an encoding block. Although an optimal motion of a block unit may be represented using a method using one motion vector for each block, it may not be an actual optimal motion of each picture element. Accordingly, if an optimal motion vector is determined in a picture element unit, encoding efficiency may be increased. Accordingly, an embodiment of the disclosure describes a motion prediction method of encoding or decoding a video signal using a multi-motion model. In particular, a motion vector may be represented in each picture element unit of a block or a sub-block unit using the motion vector at 2 to 4 control points. A prediction scheme using the motion vector of a plurality of control points may be referred to as affine motion prediction or affine prediction.

An affine motion model according to an embodiment of the disclosure may represent 4 motion models, such as those illustrated in FIG. 15. An affine motion model to represent three motions (translation, scale, and rotate) among motions which may be represented by the affine motion model is called a similarity (or simplified) affine motion model. In describing embodiments of the disclosure, the similarity (or simplified) affine motion model is basically described for convenience of description, but the disclosure is not limited thereto.

FIG. 16 illustrates an example of a control point motion vector for an affine motion prediction according to an embodiment of the disclosure.

As in FIG. 16, in affine motion prediction, the motion vector of a picture element location (or sub-block) included in a block may be determined using a two-control point motion vector (CPMV) pair v_0 and v_1. In this case, a set of the motion vectors may be referred to as an affine motion vector field (MVF). In this case, the affine motion vector field may be determined using Equation 1.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases}$$ [Equation 1]

In Equation 1, v_0 (v_0={v_0x,v_0y}) indicates a motion vector CPMV0 at the first control point of the top left location of a current block 1300. v_1 (v_1={v_1 x,v_1 y}) indicates a motion vector CPMV1 at the second control point of the top right location of the current block 1300. Furthermore, w indicates the width of the current block 1300. v(v={v_x,v_y}) indicates a motion vector at a {x,y} location. A motion vector of a sub-block (or picture element) unit may be derived using Equation 1. In one embodiment, motion vector accuracy may be rounded as 1/16 accuracy.

FIG. 17 illustrates an example of a motion vector for each sub-block of a block to which an affine motion prediction according to an embodiment of the disclosure has been applied.

Referring to FIG. 17, in an encoding or decoding process, an affine motion vector field (MVF) may be determined in a picture element unit or block unit. That is, in affine motion prediction, the motion vector of a current block may be derived in a picture element unit or a sub-block unit.

If an affine motion vector field is determined in a picture element unit, a motion vector may be obtained based on each picture element value. In the case of a block unit, the motion vector of a corresponding block may be obtained based on a center picture element value of the block. In this document, it is assumed that an affine motion vector field (MVF) is determined in a 4*4 block unit as in FIG. 17. In this case, this is for convenience of description, and an embodiment of the disclosure is not limited thereto. FIG. 17 illustrates an example of a case where an encoding block is configured with 16*16 samples and an affine motion vector field (MVF) is determined in a block unit of a 4*4 size.

Affine motion prediction may include an affine merge mode (or AF_MERGE) and an affine inter mode (or AF_INTER). The AF_INTER mode may include an AF_4_INTER mode using a 4 parameter-based motion model and an AF_6_INTER mode using a 6 parameter-based motion model.

Affine Merge Mode

AF_MERGE determines a control point motion vector (CPMV) based on the affine motion model of a neighboring block coded as affine motion prediction. A neighboring block affine-coded in a search sequence may be used for AF_MERGE. When one or more neighboring blocks are coded as affine motion prediction, a current block may be coded as AF_MERGE.

That is, if an affine merge mode is applied, the CPMVs of a current block may be derived using the CPMVs of a neighboring block. In this case, the CPMVs of the neighboring block may be used as the CPMVs of the current block without any change, and the CPMVs of the neighboring block may be modified based on the size of the neighboring block and the size of the current block and may be used as the CPMVs of the current block.

FIG. 18 illustrates an example of neighboring blocks used for an affine motion prediction in an affine merge mode according to an embodiment of the disclosure.

In the affine merge (AF_MERGE) mode, the encoder may perform encoding as in the following process.

Step-1: Scan the neighboring blocks A to E 1810, 1820, 1830, 1840, and 1850 of a current encoding block 1800 in sequence of the alphabet, and determine a block, first encoded according to an affine prediction mode based on the scanning sequence, as the candidate block of affine merge (AF_MERGE)

Step-2: Determine an affine motion model using the control point motion vector (CPMV) of the determined candidate block Step-3: Determine the control point motion vector (CPMV) of the current block 1800 based on the affine motion model of the candidate block and determine the MVF of the current block 1800

FIG. 19 illustrates an example of a block on which an affine motion prediction is performed using neighboring blocks to which an affine motion prediction according to an embodiment of the disclosure has been applied.

For example, as in FIG. 19, if a block A 1920 has been encoded according to an affine mode, after the block A 1920 is determined as a candidate block, an affine motion model may be derived using the control point motion vectors (CPMVs) (e.g., v2 and v3) of the block A 1920, and the control point motion vectors (CPMVs) v0 and v1 of the current block 1900 may be determined. The affine motion vector field (MVF) of the current block 1900 may be determined based on the control point motion vectors (CPMVs) of the current block 1900, and encoding may be performed.

FIG. 20 is a diagram for describing a method of generating a merge candidate list using a neighbor affine coding block according to an embodiment of the disclosure.

Referring to FIG. 20, if a CPMV pair is determined using an affine merge candidate, candidates, such as those illustrated in FIG. 20, may be used. In FIG. 20, it is assumed that the scan sequence of a candidate list has been set as A, B, C, D, and E. In this case, the disclosure is not limited thereto, and various sequences may be preset.

In an embodiment, if the number of candidates (hereinafter referred to as affine candidates) encoded according to an affine mode (or an affine prediction) available in the neighboring blocks (i.e., A, B, C, D, E) is 0, the affine merge mode of a current block may be skipped. If the number of available affine candidates is one (e.g., A), the motion model of the corresponding candidate may be used to derive the control point motion vectors (CPMV_0 and CPMV_1) of a current block. In this case, an index indicating the corresponding candidate may not be required (or coded). If the number of available affine candidates is two or more, two candidates on the scanning sequence may be configured as a candidate list for AF_MERGE. In this case, candidate selection information, such as an index indicating a candidate selected within the candidate list, may be signaled. The selection information may be a flag or index information, and may be referred to as AF_MERGE flag or AF_merge_idx.

In an embodiment of the disclosure, a motion compensation for a current block may be performed based on the size of a sub-block. In this case, the sub-block size of an affine block (i.e., current block) is derived. If each of the width and height of a sub-block are larger than 4 luma samples, a motion vector for each sub-block may be derived, and a DCT-IF-based motion compensation (1/16 pel for luma and 1/32 for chroma) may be performed on the sub-block. If not, an enhanced bi-linear interpolation filter based motion compensation may be performed on all affine blocks.

In an embodiment of the disclosure, if a merge/skip flag is true and both the width and height of a CU is greater than or equal to 8, in a CU level, an affine flag is signaled through a bitstream indicating whether an affine merge mode is used. When a CU is coded as AF_MERGE, a merge candidate index having a maximum value of '5' is signaled to designate that a motion information candidate is used for the CU in an affine merge candidate list.

FIGS. 21 and 22 are diagrams for describing a method of constructing an affine merge candidate list using a neighboring block coded by an affine prediction according to an embodiment of the disclosure.

Referring to FIG. 21, an affine merge candidate list is configured by the following steps.

1) Insertion of model-based affine candidate

A model-based affine candidate means that a candidate is derived from a valid neighboring reconstructed block coded according to an affine mode. As illustrated in FIG. 21, a scan sequence for a candidate block from the left A, the top B, the top right C and the bottom left D to the top left E.

If the neighboring bottom left block A is coded in a 6-parameter affine mode, the motion vectors (v_4, v_5, v_6) of the top left corner, top right corner, and bottom left corner of a CU including the block A are obtained. The motion vectors (v_0, v_1, v_2) of the top left corner of the current block are calculated based on the motion vectors (v_4, v_5, and v_6) according to the 6-parameter affine model.

If the neighboring bottom left block A is coded in a 4-parameter affine mode, a motion vectors (v_4, v_5) of the top left corner and top right corner of the CU including the block A are obtained. The motion vectors (v_0, v_1) of the top left corner on the current block are calculated based on the motion vectors (v_4, v_5) according to the 4-parameter affine model.

2) Insertion of Control Point-Based Affine Candidates

Referring to FIG. 21, a control point-based candidate means that a candidate is configured by combining neighboring motion information of control points.

Motion information of control points are first derived from designated spatial neighboring blocks and temporal neighboring block illustrated in FIG. 21. CP_k (k=1, 2, 3, 4) indicates a k-th control point. Furthermore, A, B, C, D, E, F and G are spatial location for predicting CP_k (k=1, 2, 3), and H is a temporal location for predicting CP4.

The coordinates of CP_1, CP_2, CP_3 and CP_4 are (0, 0), (W, 0), (H, 0) and (W, H), respectively. In this case, W and H are the width and height of the current block.

Motion information of each control point is obtained based on the following priority.

With respect to CP_1, checking priority is A→B→C, and A is used if A is available. If not and if B is available, B is used. If both A and B are not available, C is used. If all the three candidates are not available, motion information of CP_1 cannot be obtained.

With respect to CP_2, checking priority is E→D.
With respect to CP_3, checking priority is G→F.
With respect to CP_4, H is used.

Second, combinations of control points are used to configure a motion model.

Motion vectors of two control points are necessary to calculate transform parameters in a 4-parameter affine model. The two control points may be selected from one of the following 6 combinations {CP_1, CP_4}, {CP_2, CP_3}, {CP_1, CP_2}, {CP_2, CP_4}, {CP_1, CP_3}, and {CP_3, CP_4}. For example, to use the CP_1 and CP_2 control points in constructing the 4-parameter affine motion model is marked as "affine (CP_1, CP_2)."

Motion vectors of three control points are necessary to calculate transform parameters in a 6-parameter affine model. The three control points may be selected from one of the following 4 combinations {CP_1, CP_2, CP_4}, {CP_1, CP_2, CP_3}, {CP_2, CP_3, CP_4}, and {CP_1, CP_3, CP_4}. For example, to use the CP_1, CP_2 and CPv3 control points in constructing the 6-parameter affine motion model is marked as "affine (CP_1, CP_2, CP_3)."

Furthermore, in an embodiment of the disclosure, if an affine merge candidate is present in an affine merge mode, this may be always considered as a 6-parameter affine mode.

Affine Inter Mode

FIG. 23 illustrates an example of neighboring blocks used for an affine motion prediction in an affine inter mode according to an embodiment of the disclosure.

Referring to FIG. 23, affine motion prediction may include an affine merge mode (or AF_MERGE) and an affine inter mode (or AF_INTER). In the affine inter mode (AF_INTER), after 2-control point motion vector prediction (CPMVP) and CPMV are determined, a control point motion vector difference (CPMVD) corresponding to a difference may be transmitted from an encoder to a decoder. A detailed encoding process of the affine inter mode (AF_INTER) may be the same as that described below.

Step-1: Determine a two-CPMVP pair candidate
Step-1.1: Determine a maximum of 12 CPMVP candidate combinations (refer to Equation 2)

$$\{(v_0, v_1, v_2) | v_0 = \{v_A, v_B, v_c\}, v_1 = \{v_D, v_E\}, v_2 = \{v_F, v_G\}\} \quad \text{[Equation 2]}$$

In Equation 2, v_0 indicates a motion vector CPMV0 at the top left control point 2310 of a current block 2300. v_1 indicates a motion vector CPMV1 at the top right control point 2311 of the current block 2300. v_2 indicates a motion vector CPMV2 at a control point 2312 on the bottom left side of the current block 2300. v_A indicates the motion vector of a neighboring block A 2320 neighboring the top left of the top left control point 2310 of the current block 2300. v_B indicates the motion vector of a neighboring block B 2322 neighboring the top of the top left control point 2310 of the current block 2300. v_C indicates the motion vector of a neighboring block C 2324 neighboring the left of the top left control point 2310 of the current block 2300. v_D is the motion vector of a neighboring block D 2326 neighboring the top of the top right control point 2311 of the current block 2300. v_E indicates the motion vector of a neighboring block E 2328 neighboring the top right of the top right control point 2311 of the current block 2300. v_F indicates the motion vector of a neighboring block F 2330 neighboring the left of the bottom left control point 2312 of the current block 2300. v_G indicates the motion vector of a neighboring block G 2332 neighboring the left of the bottom left control point 2312 of the current block 2300.

Step-1.2: Sort CPMVP candidate combinations based on a value having a small difference value (DV) and use top two candidates (refer to Equation 3 below)

$$DV=|(v_{1x}-v_{0x})*-(v_{2y}-v_{0y})*w|+|(v_{1y}-v_{0y})*+(v_{2x}-v_{0x})*w| \quad \text{[Equation 3]}$$

v_0x indicates the x-axis element of the motion vector (V0 or CPMV0) at the top left control point 2310 of the current block 2300. v_1x indicates the x-axis element of the motion vector (V1 or CPMV1) at the top right control point 2311 of the current block 2300. v_2x indicates the x-axis element of the motion vector (V_2 or CPMV_2) at the bottom left control point 2312 of the current block 2300. v_0y indicates the y-axis element of the motion vector (V_0 or CPMV_0) at the top left control point 2310 of the current block 2300. v_1 y indicates the y-axis element of the motion vector (V_1 or CPMV_1) at the top right control point 2311 of the current block 2300. v_2 y indicates the y-axis element of the motion vector (V_2 or CPMV_2) at the bottom left control point 2312 of the current block 2300. w indicates the width of the current block 2300. h indicates the height of the current block 2300.

Step-2: Use an AMVP candidate list when a control point motion vector predictor (CPMVP) pair candidate is smaller than 2

Step-3: Determine the control point motion vector predictor (CPMVP) of each of two candidates and optimally selects a candidate having a smaller value by comparing RD costs and a CPMV Step-4: Transmit an index corresponding to the optimal candidate and a control point motion vector difference (CPMVD)

In an embodiment of the disclosure, a process of constructing a CPMVP candidate in AF_INTER is provided. Identically with the AMVP, the number of candidates is 2, and an index indicating the location of a candidate list is signaled.

A process of constructing a CPMVP candidate list is as follows.

1) Whether neighboring blocks are coded as affine motion prediction is checked by scanning the neighboring blocks. If the scanned blocks are coded as affine prediction, the motion vector pair of a current block is derived from the affine motion model of the scanned neighboring block until the number of candidates becomes 2.

2) If the number of candidates is smaller than 2, a candidate configuration process is performed. Furthermore, in an embodiment of the disclosure, a 4-parameter (2-control point) affine inter mode is used to predict the motion model of zoom-in/out and rotate and content. As illustrated in FIG. 1, the affine motion field of a block is described by two control point motion vectors.

The motion vector field (MVF) of a block is described by Equation 1 described above.

In a conventional technology, an advanced motion vector prediction (AMVP) mode is necessary to scan a motion vector prediction (MVP) index and motion vector differences (MVDs). When the AMVP mode is applied to the disclosure, an affine flag (affine_flag) is signaled to indicate whether affine prediction is used. If the affine prediction is applied, the syntaxes of inter_dir, ref_idx, mvp_index, and two MVDs (mvd_x and mvd_y) are signaled. An affine MVP pair candidate list including two affine MVP pairs is generated. The signaled mvp_index is used to select one of the two affine MVP pairs. The affine MVP pair is generated by two types of affine MVP candidates. One is a spatial inherited affine candidate, and the other is a corner-derived affine candidate. If neighboring CUs are coded in an affine mode, spatial inherited affine candidates may be generated. The affine motion model of a neighboring affine-coded block is used to generate the motion vectors of a 2-control point MVP pair. The MVs of the 2-control point MVP pair of a spatial inherited affine candidate are derived using the following equations.

$$V_{0x}=V_{B0x}+(VB_{2\_x}-V_{B0x})*(\text{posCurCU\_Y}-\text{posRefCU\_Y})/\text{RefCU\_height}+(V_{B1x}-V_{B0x})*(\text{posCurCU\_X}-\text{posRefCU\_X})/\text{RefCU\_width} \quad \text{[Equation 4]}$$

$$V_{0y}=V_{B0y}+(V_{B2\_y}-V_{B0y})*(\text{posCurCU\_Y}-\text{posRefCU\_Y})/\text{RefCU\_height}+(V_{B1y}-V_{B0y})*(\text{posCurCU\_X}-\text{posRefCU\_X})/\text{RefCU\_width} \quad \text{[Equation 5]}$$

If V_B0, V_B1, and V_B2 may be substituted with the top left MV, top right MV, and bottom left MV of a given reference/neighboring CU, (posCurCU_X, posCurCU_Y) are the location of the top left sample of a current CU for the top left sample of a frame. (posRefCU_X, posRefCU_Y) is the location of the top left sample of a reference/neighboring CU for the top left sample of a frame.

$$V_{1x}=V_{B0x}+(V_{B1x}-V_{B0x})*CU\_\text{width}/\text{RefCU\_width} \quad \text{[Equation 6]}$$

$$V_{1y}=VB_{0y}+(V_{B1y}-V_{B0y})*CU\_\text{width}/\text{RefCU\_width} \quad \text{[Equation 7]}$$

FIG. 24 illustrates an example of neighboring blocks used for an affine motion prediction in an affine inter mode according to an embodiment of the disclosure.

Referring to FIG. 24, when the number of MVP pairs is smaller than 2, a corner-derived affine candidate is used. As illustrated in FIG. 24, neighboring motion vectors are used to derive an affine MVP pair. With respect to a first corner-derived affine candidate, a first available MV in a set A (A0, A1 and A2) and a first available MV in a set B (B0 and B1) are used to configure a first MVP pair. With respect to a second corner-derived affine candidate, the first available MV in the set A and a first available MV in a set C (C0 and C1) are used to calculate the MV of a top right control point. The first available MV in the set A and a calculated top right control point MV are a second MVP pair.

In an embodiment of the disclosure, two candidate sets, including two (three) candidates {mv_0, mv_1} ({mv_0, mv_1, mv_2) are used to predict two (three) control points of an affine motion model. Given motion vector differences (mvd_0, mvd_1, mvd_2) and control points are calculated using the following equations.

$$mv_0 = \overline{mv}_0 + mvd_0$$
$$mv_1 = \overline{mv}_1 + mvd_1 + mvd_0$$
$$mv_2 = \overline{mv}_2 + mvd_2 + mvd_0 \quad \text{[Equation 8]}$$

FIGS. 25 and 26 are diagrams illustrating a method of deriving a motion vector candidate using motion information of a neighboring block in an affine inter mode according to an embodiment of the disclosure.

In the affine candidate list, an affine motion is extended from spatial neighboring blocks (extrapolated affine candidates), and the affine candidate list is appended by a combination of motion vectors from the spatial neighboring blocks (virtual affine candidates). Candidate sets are set as follows:

1. A maximum of two different affine MV predictor sets are derived from an affine motion of neighboring blocks. Neighboring blocks A0, A1, B0, B1, and B2 are checked as illustrated in FIG. 25. If a neighboring block is encoded by an affine motion model and a corresponding reference frame is the same as the reference frame of a current block, two control points (for a 4-parameter affine model) of the current block or three control points (for a 6-parameter affine model) of the current block are derived from the affine model of neighboring blocks.

2. FIG. 29 illustrates neighboring blocks used to generate a virtual affine candidate set. Neighboring MVs are divided into three groups: S_0={mv_A, mv_B, mv_C}, S_1={mv_D, mv_E}, and S_2={mv_F, mv_G}. mv_0 is the first MV that refers to the same reference picture as that of a current block in S0. mv_2 is the first MV that refers to the same reference picture as that of a current block in S1.

If mv_0 and mv_1 are given, mv_2 may be derived by Equation 9 below.

$$\overline{mv}_2^x = \overline{mv}_0^x - \frac{(\overline{mv}_1^y - \overline{mv}_0^y)}{w}, \quad \text{[Equation 9]}$$
$$\overline{mv}_2^y = \overline{mv}_0^y + \frac{(\overline{mv}_1^x - \overline{mv}_0^x)}{w},$$

In Equation 9, a current block size is W×H.

If only mv_0 and mv_2 are given, mv_1 may be derived by Equation 10 below.

$$\overline{mv}_1^x = \overline{mv}_0^x + \frac{(\overline{mv}_2^y - \overline{mv}_0^y)}{w}, \quad \text{[Equation 10]}$$
$$\overline{mv}_1^y = \overline{mv}_0^y - \frac{(\overline{mv}_2^x - \overline{mv}_0^x)}{w}.$$

In an embodiment of the disclosure, affine inter prediction may be performed according to the following sequence.

Input: affine motion parameters, reference picture samples
Output: the prediction block of a CU
Process
Derive the sub-block size of an affine block
If both the width and height of a sub-block are larger than 4 luma samples,
With respect to each sub-block,
Derive the motion vector of a sub-block
Perform a motion compensation (1/16 pel for luma and 1/32 pel for chroma) based on DCT-IF on sub-blocks (invoked)

If not, a compensation based on an enhanced bi-linear interpolation filter is performed (invoked) on all affine blocks Furthermore, in an embodiment of the disclosure, if a merge/skip flag is false and the width and height of a CU are larger than or equal to 8, an affine flag is signaled in order to indicate whether an affine inter mode will be used in a CU level. If a CU is coded in an affine inter mode, a model flag is signaled in order to indicate whether a 4-parameter or 6-parameter affine model is applied to the CU. If the model flag is true, an AF_6_INTER mode (6-parameter affine model) is applied and MVDs are parsed. If not, an AF_4_INTER mode (4-parameter affine model) is applied, and two MVDs are parsed.

In the AF_4_INTER mode, similarly to the affine merge mode, motion vector pairs extrapolated from neighboring blocks coded by the affine mode are generated and preferentially inserted into a candidate list.

Thereafter, if the size of the candidate list is smaller than 4, candidates having a motion vector pair {(v_0, v_1)|v0={v_A,v_B,v_c},v_1={v_D, v_E}} are generated using neighboring blocks. As illustrated in FIG. 22, v_0 is selected from the motion vectors of the blocks A, B, and C. A motion vector from a neighboring block is scaled based on the relation between a reference list, a POC for reference to the neighboring block, a POC for reference to a current CU, and the current CU. Furthermore, an approach method of selecting v_1 from neighboring blocks D and E is similar. When the candidate list is larger than 4, candidates are first sorted based on the consistency of neighboring motion vectors (similar to two motion vectors in a candidate pair), and the first 4 candidates are preserved.

If the number of candidate lists is smaller than 4, the list is padded by a motion vector pair by duplicating AMVP candidates.

In the AF_6_INTER mode, similar to the affine merge mode, motion vector triples (affine motion vector triples) extrapolated from neighboring blocks coded in the affine merge mode are generated and preferentially inserted into a candidate list.

Thereafter, when the size of the candidate list is smaller than 4, candidates including motion vector triples {(v_0, v_1, v_2)|v0={v_A, v_B, v_c}, v1={v_D, v_E}, v2={v_G, v_H}} are generated using neighboring blocks. As illustrated in FIG. 22, v_0 is selected from the motion vectors of the block A, B, or C. A motion vector from a neighboring block is scaled based on the relation between a reference list, a POC for reference to the neighboring block, a POC for reference to a current CU, and the current CU. Furthermore, an approach for selecting v_1 from the neighboring blocks D and E is similar to the selection of v_2 from F and G. When the candidate list is larger than 4, candidates are sorted based on the consistency of neighboring motion vectors (similar to two motion vectors in three candidates), and the first 4 candidates are preserved.

When the number of candidate lists is smaller than 4, a list may be padded by motion vector triples configured by duplicating respective AMVP candidates.

After the CPMV of a current CU is derived, the MVF of the current CU is generated according to Equation 11 for a 4-parameter affine model and is generated according to Equation 12 for a 6-parameter affine model, based on the number of affine parameters.

$$\begin{cases} v_x = \dfrac{v_{1x} - v_{0x}}{W}x - \dfrac{v_{1y} - v_{0y}}{W}y + v_{0x} \\ v_y = \dfrac{v_{1y} - v_{0y}}{W}x + \dfrac{v_{1x} - v_{0x}}{W}y + v_{0y} \end{cases} \quad \text{[Equation 11]}$$

-continued $$\begin{cases} v_x = \frac{v_{1x} - v_{0x}}{W}x + \frac{v_{2x} - v_{0x}}{H}y + v_{0x} \\ v_y = \frac{v_{1y} - v_{0y}}{W}x + \frac{v_{2y} - v_{0y}}{H}y + v_{0y} \end{cases}$$ [Equation 12]

In this case, a sub-block size M×N is derived in Equation 13, and MvPre is motion vector portion accuracy (1/16).

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{1x} - v_{0x}), \text{abs}(v_{1y} - v_{0y}))}\right) \end{cases}$$ [Equation 13]

After derived by Equation 12, M and N need to be down adjusted, if necessary, in order to make them the divisor of w and h. When M or N is smaller than 8, a WIF is applied. If not, an affine motion compensation based on a sub-block is applied.

FIG. 27 illustrates an example of an affine motion vector field of a sub-block unit according to an embodiment of the disclosure.

Referring to FIG. 27, in order to derive the motion vector of each M×N sub-block, the motion vector of the center sample of each sub-block, such as that illustrated in FIG. 27, is calculated according to Equation 11 or Equation 12, and is rounded with 1/16 portion accuracy. SHVC up-sampling interpolation filters are used to generate the prediction of each sub-block using a derived motion vector.

The SHVC up-sampling interpolation filters having the same filter length and normalization factor as HEVC motion compensation interpolation filters may be used as motion compensation interpolation filters for additional fractional pel positions. Chroma component motion vector accuracy is a 1/32 sample. The additional interpolation filters of 1/32 pel portion locations are derived using averages of the filters of two neighboring 1/16 pel portion locations.

The AF_MERGE mode may be selected on the encoder side using the same method of selecting a common merge mode. A candidate list is preferentially generated, and a minimum RD-cost is selected in the candidates for a comparison with the RD-costs of other inter modes. A result of the comparison is a determination of whether AF_MERGE is applied or not.

For the AF_4_INTER mode, the check of an RD cost is used to determine whether a motion vector pair candidate is selected as the control point motion vector prediction (CPMVP) of a current CU. After the CPMVP of a current affine CU is determined, affine motion estimation is applied, and a control point motion vector (CPMV) is obtained. Accordingly, a difference between the CPMV and the CPMVP is determined.

On the encoder side, the AF_6_INTER mode is identified only when the AF_MERGE or AF_4_INTER mode is determined as an optimal mode in a previous mode selection stage.

In an embodiment of the disclosure, the affine inter (affine AMVP) mode may be performed as follows:

1) AFFINE_MERGE_IMPROVE: instead of searching the first neighboring block in an affine mode, an improvement is to search a neighboring block having a maximum coding unit size as an affine merge candidate.

2) AFFINE_AMVL_IMPROVE: neighboring blocks in the affine mode is added to an affine AMVP candidate list similarly to a common AMVP procedure.

A detailed process of generating the affine AMVP candidate list is as follows.

First, whether a neighboring block at the bottom left uses an affine motion model and has the same reference index as a current reference index is identified. If the neighboring block is not present, a left neighboring block is identified using the same method. If the neighboring block is not present, whether a neighboring block at the bottom left uses an affine motion model and has a different reference index is identified. If the neighboring block is present, a scaled affine motion vector is added to a reference picture list. If the neighboring block is not present, a left neighboring block is identified using the same method.

Second, a top right neighboring block, a top neighboring block, and a top left neighboring block are identified using the same method.

After the processes, if two candidates are retrieved, the process of generating an affine AMVP candidate list is terminated. If two candidates are not retrieved, an original operation within JEM software is performed to generate affine AMVP candidate lists.

3) AFFINE_SIX_PARAM: in addition to the 4-parameter affine motion model, a 6-parameter affine motion model is added as an additional model.

The 6-parameter affine motion model is derived through Equation 14.

$$\begin{cases} MV_x = ax + by + c \\ MV_y = dx + ey + f \end{cases}$$ [Equation 14]

Three motion vectors at the top left location MV_0, the top right location MV_1, and the bottom left location MV_2 are necessary to determine a model because 6-parameters are present in the motion model. Three motion vectors may be determined using a method similar to the method of two motion vectors in the 4-parameter affine motion model. The affine model merge is always set as a 6-parameter affine motion model.

4) AFFINE_CLIP_REMOVE: motion vector constraints for all affine motion vectors are removed. Motion compensation processes are made to control the motion vector constraints themselves.

Affine Motion Model

As described above, various affine motion models may be used or considered in affine inter prediction. For example, an affine motion model may represent four motions as in FIG. 15. An affine motion model capable of representing three motions (translation, scale, and rotate), among motions capable of being represented by the affine motion model, may be called a similarity (or simplified) affine motion model. The number of CPMVs and/or a method of deriving the sample/sub-block unit MV of a current block may be different depending on which one of the affine motion models is used.

In an embodiment of the disclosure, adaptive four and six parameter motion models are used. In AF_INTER, a 6-parameter motion model is proposed in addition to the 4-parameter motion model present in JEM. The 6-parameter affine motion model is described like Equation 15.

$x' = a^*x + b^*y + c$ $y' = d^*x + e^*y + f$ [Equation 15]

In this case, coefficients a, b, c, d e, and f are affine motion parameters. (x,y) and (x',y') are coordinates at pixel locations before and after the transform of an affine motion model. In video coding, in order to use the affine motion model, if CPMV0, CPMV1, and CPMV2 are MVs for CP0 (top left), CP1 (top right), and CP2 (bottom left), Equation 16 may be described as follows.

$$\begin{cases} v_x = \frac{(v_{1x} - v_{0x})}{w} * x + \frac{(v_{2x} - v_{0x})}{w} * y + v_{0x} \\ v_y = \frac{(v_{1y} - v_{0y})}{w} * x - \frac{(v_{2y} - v_{0y})}{w} * y + v_{0y} \end{cases}$$ [Equation 16]

In this case, CPMV_0={v_0x,v_0y}, CPMV_1={v_1 x,v_1 y}, CPMV_2={v_2 x,v_2 y}, and w and h are the width and height of each coding block. Equation 16 is the motion vector field (MVF) of the block.

A flag is parsed in a CU level in order to indicate whether a 4-parameter or 6-parameter affine motion model is used when neighboring blocks are coded as affine prediction. If a neighboring block coded as affine prediction is not present, the flag is omitted and the 4-parameter model is used for affine prediction. In other words, the 6-parameter model is considered in the condition in which one or more neighboring blocks are coded in an affine motion model. In relation to the number of CPMVDs, each of two or three CPMVDs is signaled with respect to the 4-parameter and 6-parameter affine motion models.

Furthermore, in an embodiment of the disclosure, pattern-matched motion vector refinement may be used. In the pattern-matched motion vector derivation (PMMVD, hereinafter abbreviated as a PMVD in the JEM encoder description) of JEM, the decoder needs to evaluate some motion vectors (MVs) in order to determine a start MV candidate for CU-level search. In sub-CU-level search, some MV candidates are added in addition to an optimal CU-level MV. The decoder needs to evaluate such MV candidates in order to search for an optimal MV. This requires a great memory band. In the proposed pattern-matched motion vector refinement (PMVR), the concepts of template matching and bilateral matching in PMVD are adopted in JEM. When a skip mode or merge mode is selected to indicate whether the PMVR is available, one PMVR flag is signaled. In order to meaningfully reduce the memory bandwidth requirement compared to the PMVD, an MV candidate list is generated. If the PMVR is applied, a start MV candidate index is explicitly signaled.

A candidate list is generated using the merge candidate list generation process, but sub-CU merge candidates, for example, affine candidates and ATMVP candidates are excluded. For bilateral matching, only a uni-prediction MV candidate is included. A bi-prediction MV candidate is divided into two unit-prediction MV candidates. Furthermore, similar MV candidates (having MV differences smaller than a predefined threshold) are also removed. For CU-level search, diamond search MV refinement is performed starting from a signaled MV candidate.

Sub-CU-level search is available only in the bilateral matching merge mode. A search window for the sub-CU-level search for all sub-CUs is the same as a search window for CU-level search. Accordingly, an additional bandwidth is not necessary in the sub-CU-level search.

In order to refine an MVP in a mode, template matching is also used. In the AMVP mode, two MVPs are generated using an HEVC MVP generation process, and one MVP index is signaled to select one of the two MVPs. The selected MVP is further refined using template matching in PMVR. If adaptive motion vector resolution (AMVR) is applied, the MVP is rounded with corresponding accuracy prior to the template matching refinement. Such a refinement process is named pattern-matched motion vector predictor refinement (PMVPR). In the remainder of this document, PMVR includes template matching PMVR, bi-direction matching PMVR, and PMVPR unless specially defined otherwise.

In order to reduce a memory bandwidth requirement, PMVR is unavailable for 4×4, 4×8, and 8×4 CUs. In order to reduce the amount of a required additional memory bandwidth, the search range of {template matching, bi-direction matching} for a CU area equal to 64 may be reduced to {±2, ±4}. The search range of {template matching, bi-direction matching} for a CU area larger than 64 may be reduced to {±6, ±8}. Compared to the worst case in HEVC, a required memory bandwidth was reduced from 45.9× in PMVD of JEM-7.0 to 3.1× in PMVR using all the methods described in the PMVR section of this document.

Applied Technology when Affine is Used in Non-QT Block

FIG. 28 illustrates a method of generating a prediction block and a motion vector in an inter prediction to which an affine motion model has been applied according to an embodiment of the disclosure.

From FIG. 28, an equation for deriving a motion vector if an affine motion model is applied may be seen. The motion vector may be derived based on Equation 17 below.

$$(V_x, V_y) = (x - x', y - y')$$

$$V_x = (1-a)x - by - e$$

$$V_y = -cx + (1-d)y - f$$ [Equation 17]

In this case, v_x indicates the x component of the sample unit motion vector of an x, y) coordinate sample within a current block. v_y indicates the y component of the sample unit motion vector of the (x, y) coordinate sample within the current block. That is, (v_x, v_y) is the sample unit motion vector for the (x, y) coordinate sample. In this case, a, b, c, d, e, f indicate parameters of an equation for deriving the sample unit motion vector (motion information) of the (x, y) coordinates from the control points (CPs) of the current block. The CP may be represented as a control picture element. The parameters may derive from motion information of CPs of each PU transmitted in a PU unit. An equation for deriving the sample unit motion vector derived from the motion information of the CPs may be applied to each sample of a block, and may be derived as the location of a sample within a reference image depending on a relative location between the x axis and y axis of each sample. The sample unit motion vector may be differently derived depending on the size of a block according to a QTBT(TT) block splitting structure, an asymmetrical type or a symmetrical type, or a block location. Detailed embodiments thereof are illustrated through FIG. 29 to FIG. 38 to be described later.

FIG. 29 is a diagram illustrating a method of performing a motion compensation based on a motion vector of a control point according to an embodiment of the disclosure.

Referring to FIG. 29, it is assumed that a current block is a 2N×2N block. For example, the motion vector of a top left sample within the current block may be said to be v_0. Furthermore, the motion vectors of CPs may be v_1 and v_2 using the samples of neighboring blocks neighboring the current block as the CPs. That is, if the width and height of the current block are S and the coordinates at the top left sample position of the current block are (xp, yp), the coordinates of the CP0 of the CPs may be (xp, yp), the coordinates of the CP1 of the CPs may be (xp+S, yp), the coordinates of the CP2 of the CPs may be (xp, yp+S). The motion vector of the CP0 may be v_0, the motion vector of the CP1 may be v_1, and the motion vector of the CP2 may be v_2. A sample unit motion vector may be derived using the motion vector of the CPs. The sample unit motion vector may be derived based on Equation 18 below.

$$V_x = \frac{V_{x_1} - V_{x_0}}{S}x + \frac{V_{x_2} - V_{x_0}}{S}y + V_{x_0}$$
$$V_y = \frac{V_{y_1} - V_{y_0}}{S}x + \frac{V_{y_2} - V_{y_0}}{S}y + V_{y_0}$$
[Equation 18]

In this case, v_x, v_y indicate the x component, y component of a motion vector for a sample having (x, y) coordinates within each current block. v_x0, v_y0 indicate the x component, y component of a motion vector v_0 for the CP0, respectively. v_x1, v_y1 indicate the x component, y component of a motion vector v_1 for the CP1, respectively. v_x2, v_y2 indicate the x component, y component of a motion vector v_2 for the CP2, respectively. The motion vector of each sample within a current block may be derived based on a relative location within the current block using an equation for deriving a sample unit motion vector, such as Equation 18.

FIG. 30 is a diagram illustrating a method of performing a motion compensation based on a motion vector of a control point in a non-square block according to an embodiment of the disclosure.

FIG. 30 illustrates the CPs of a block partitioned into N×2N. An equation for deriving a sample unit motion vector within a current block may be derived using the same method as the case of the partitioning type 2N×2N. In the process of deriving the equation, a width value suitable for a shape of a current block may be used. In order to derive the sample unit motion vector, three CPs may be derived, and the locations of the CPs may be adjusted like FIG. 30. That is, if the width and height of a current block are S/2 and S, respectively, and coordinates at the top left sample position of the current block are (xp, yp), the coordinates of the CP0 of the CPs may be (xp, yp), the coordinates of the CP1 of the CPs may be (xp+S/2, yp), and the coordinates of the CP2 of the CPs may be (xp, yp+S). The sample unit motion vector may be derived based on Equation 19 below.

$$V_x = \frac{2(V_{x_1} - V_{x_0})}{S}x + \frac{V_{x_2} - V_{x_0}}{S}y + V_{x_0}$$
$$V_y = \frac{2(V_{y_1} - V_{y_0})}{S}x + \frac{V_{y_2} - V_{y_0}}{S}y + V_{y_0}$$
[Equation 19]

In this case, vx, vy indicate the x component, y component of a motion vector for a sample at (x, y) coordinates within the current block, respectively. v_x0, v_y0 indicate the x component, y component of a motion vector v_0 for the CP0, respectively. v_x1, v_y1 indicate the x component, y component of a motion vector v_1 for the CP1, respectively. v_x2, v_y2 indicate the x component, y component of a motion vector v_2 for the CP2, respectively. Equation 3 illustrates an equation for deriving a sample unit motion vector by considering that the width of a current block is S/2. Each sample within a current block partitioned from a CU based on a partitioning type N×2N using an equation for deriving the sample unit motion vector, such as Equation 19, may be derived based on a relative location within the current block.

FIG. 31 is a diagram illustrating a method of performing a motion compensation based on a motion vector of a control point in a non-square block according to an embodiment of the disclosure.

FIG. 31 illustrates blocks partitioned based on a partitioning type 2N×N. In order to derive the sample unit motion vector, three CPs may be derived. The location of the CPs may be adjusted like FIG. 31, and the height may be adjusted to S/2 based on a shape of a current block illustrated in FIG. 31. That is, if the width and height of the current block are S and S/2, respectively, and coordinates at the top-left sample position of the current block are (xp, yp), the coordinates of the CP0 of the CPs may be (xp, yp), the coordinates of the CP1 of the CPs may be (xp+S, yp), and the coordinates of the CP2 of the CPs may be (xp, yp+S/2). The sample unit motion vector may be derived like Equation 20 below.

$$V_x = \frac{V_{x_1} - V_{x_0}}{S}x + \frac{2(V_{x_2} - V_{x_0})}{S}y + V_{x_0}$$
$$V_y = \frac{V_{y_1} - V_{y_0}}{S}x + \frac{2(V_{y_2} - V_{y_0})}{S}y + V_{y_0}$$
[Equation 20]

In this case, v_x, v_y indicate the x component, y component of a motion vector for a sample at (x, y) coordinates within the current block, respectively. v_x0, v_y0 indicate the x component, y component of a motion vector v_0 for the CP0, respectively. v_x1, v_y1 indicate the x component, y component of a motion vector v_1 for the CP1, respectively. v_x2, v_y2 indicate the x component, y component of a motion vector v_2 for the CP2, respectively. Equation 4 illustrates an equation for deriving a sample unit motion vector by considering that the height of the current block is S/2. Each sample within a current block partitioned from a CU based on a partitioning type N×2N using an equation for deriving the sample unit motion vector, such as Equation 4.18, may be derived based on a relative location within the current block.

FIGS. 32 to 38 are diagrams illustrating a method of performing a motion compensation based on a motion vector of a control point in a non-square block according to an embodiment of the disclosure.

FIG. 32 illustrates the CPs of asymmetrical type current blocks. As illustrated in FIG. 32, the width and height of the asymmetrical type current blocks may be said to be W and H, respectively. In order to derive the sample unit motion vector, three CPs for each current block may be derived, and the coordinates of the CPs may be adjusted based on a width and height according to a shape of the current block as in FIG. 32. That is, if the width and height of the current block are W and H and coordinates at the top-left sample position of each current block are (xp, yp), the coordinates of the CP0 of the CPs may be set as (xp, yp), the coordinates of the CP1 of the CPs may be set as (xp+W, yp), and the coordinates of the CP2 of the CPs may be set as (xp, yp+H). In this case, the sample unit motion vector within the current block may be derived based on Equation 21 below.

$$V_x = \frac{V_{x_1} - V_{x_0}}{W}x + \frac{V_{x_2} - V_{x_0}}{H}y + V_{x_0}$$ [Equation 21]
$$V_y = \frac{V_{y_1} - V_{y_0}}{W}x + \frac{V_{y_2} - V_{y_0}}{H}y + V_{y_0}$$

In this case, v_x, v_y indicate the x component, y component of a motion vector for a sample at (x, y) coordinates within the current block, respectively. v_x0, v_y0 indicate the x component, y component of a motion vector v_0 for the CP0, respectively. v_x1, v_y1 indicate the x component, y component of a motion vector v_1 for the CP1, respectively. v_x2, v_y2 indicate the x component, y component of a motion vector v_2 for the CP2, respectively. Equation 21 illustrates an equation for deriving a sample unit motion vector by considering the width and height of asymmetrical type current blocks.

Meanwhile, according to the disclosure, in order to reduce the amount of data of motion information of CPs indicated in a block unit, a motion information prediction candidate for at least one CP may be selected based on motion information of a neighboring block or neighboring sample of a current block. The motion information prediction candidate may be called an affine motion information candidate or an affine motion vector candidate. The affine motion information candidates may include contents disclosed in FIGS. 33 to 38, for example.

ATMVP Simplification

Advanced temporal motion vector prediction (ATMVP) is inter prediction using a temporal motion information candidate, but may indicate inter prediction using a motion information candidate proposed to improve the existing TMVP. In an embodiment of the disclosure, the ATMVP is not limited to its name, and the ATMVP may be referred to as a sub-block temporal merge candidate, a sub-block-based temporal merge candidate, a sub-block temporal motion vector predictor or a sub-block-based temporal motion vector predictor.

Specifically, an intra-frame motion may not be incorporated into the TMVP using the motion vector of a colPB at the right-bottom block of a current block or at the center location of the current block as a temporal motion information candidate. In contrast, if the ATMVP is applied, the motion vector of a colPB at a location indicated by the motion vector of a neighboring block may be used as an ATMVP candidate.

In an example in which the ATMVP is applied, after the motion vector of an available spatial neighboring block is first searched while sequentially checking merge candidate configurations, a location indicated by a temporal vector in a reference picture may be derived as col-PB (ATMVP candidate). Furthermore, the motion vector of a corresponding block may be used in each sub-block unit using the temporal vector. In this case, if an MV is not present in a specific sub-block, the MV of a block located at the center of a corresponding block is used as an MV for an unavailable sub-block and stored as a representative MV.

Furthermore, there may be proposed various ATMVP simplification schemes for using the ATMVP, but capable of reducing the amount of memory used.

In one embodiment, the use of a memory can be reduced because a reference picture (designated as a slice segment header) for searching a reference block is limited to a co-located picture. For example, a maximum of 4 reference pictures may be used. In order to search a reference block, a temporal vector may be derived in a scanning sequence from one of spatial candidates. If a current candidate has the same reference picture as a co-located picture, a search process may be terminated.

In one embodiment, a modification for ATMVP and/or STMVP sub-block merge modes may be applied.

1. Signaling is added in a picture/slice-level, and thus various sub-block sizes may be used to derive ATMVP/STMVP-based motion information.

2. The derivation of simplified ATMVP-based motion information may be used because one co-located picture is used.

In one embodiment, there is proposed the support of the picture/slice-level adaptation of the granularity of a motion field derived by the ATMVP and STMVP modes. Specifically, in a slice that denotes a sequence parameter set (SPS), a default value of a sub-block size used to derive a motion parameter for ATMVP and STMVP may be signaled in SPS. Additionally, one flag is signaled in a slice segment header. If the flag is 0, this indicates that a default sub-block size, such as that specified in the SPS, is used to derive an ATMVP/STMVP-based motion in a current slice. If not (i.e., if the flag is set to 1), another syntax element is signaled in a slice segment header and may specify an ATMVP/STMVP sub-block size used for a slice.

In one embodiment, a simple encoder method is used to determine an ATMVP/STMVP sub-block size for a current picture. One of two ATMVP/STMVP sub-block sizes 4 and 8 is selected from a picture finally coded in the same temporal layer based on an average size of ATMVP/STMVP blocks. It is assumed that a just coded picture is an i-th picture in a k-th temporal layer and includes an N CUs coded by the ATMVP and STMVP modes. Furthermore, it is assumed that the size of the CUs are S_0, S_1, S_(N−1). An average size of the ATMVP/STMVP CUs is calculated as $\sigma^k = \Sigma_{i=0}^{N-1} S_i / N$. Accordingly, when an (i+1)-th picture is coded in the same k-th temporal layer, the corresponding ATMVP/STMVP sub-block size $g_{i+1}^k$ may be determined according to Equation 22 below.

$$g_{i+1}^k = \begin{cases} 4, & \sigma^k < 27 \\ 8, & \sigma^k \geq 27 \end{cases}$$ [Equation 22]

In one embodiment, the ATMVP/STMVP sub-block size may be always set to 4 with respect to a first picture in each temporal layer.

In one embodiment, ATMVP may be derived using the following two steps.

(1) If a neighboring CU is available and the MV of the CU is different from MVs in the existing candidate list, the encoder/decoder may add the motion vector to the sequence of A1, B1, B0, and A0 from spatial neighboring CUs, as illustrated in FIG. 12. The number of available spatial candidates may be represented as NO.

(2) A first MV candidate from the NO spatial candidates may be used to determine a location from which motions for a co-located picture and each sub-block will be fetched (by adding displacement according to an MV). If NO is 0, the co-location having a co-located picture and zero motion signaled in a slice header may be used to fetch a motion for each sub-block.

The co-located picture of different CUs for ATMVP may not be always the same if multiple reference pictures are used. If co-located pictures for ATMVP derivation are different for different CUs in a current picture, this means that the motion fields of multiple reference pictures need to be fetched. This is not preferred due to an increase in the memory bandwidth. Accordingly, one embodiment proposes a simplified design using the same co-located picture as a co-located picture for ATMVP derivation as in HEVC signaled in a slice header. In a block level, if the reference picture of a neighboring block A is different from a co-located picture, the MV of the block A is scaled using a HEVC temporal MV scaling method, and the scaled MV of the block A may be used for ATMVP.

A motion vector used to fetch a motion field in a co-located picture Rcol is marked as MVcol. In order to minimize an impact attributable to MV scaling, an MV in a spatial candidate list used to derive MVcol is selected using the following method in this answer. If the reference picture of a candidate MV is a co-located picture, the MV is selected and used as MVcol without any scaling. If not, an MV having a reference picture most closest to a co-located picture is used to derive MVcol having scaling.

General History-Based Motion Vector Prediction (HMVP)

In general, an image compression technology uses exploiting for spatial and temporal redundancy as two major schemes. For example, both high efficiency video coding (HEVC) and VVC use two motion compression schemes based on inter coding. One is a merge motion, and the other is advanced motion vector prediction (AMVP). In order to improve the two prediction modes, various modifications are being discussed. The various modifications includes increasing the number of candidates to search for more spatially extended candidates and the check of temporal candidates at non-traditional locations. The two schemes include primarily constructing a list using available candidates, minimizing a rate distortion (RD) cost, and signaling a selected candidate in a bitstream.

In particular, in a recent image compression technology, HMVP in which motion information of a previously coded block is stored and the stored motion information is used for the motion prediction of a subsequently coded block is discussed. Such HMVP may be added to a merge list (or merge candidate list) or an AMVP list (or AMVP candidate list).

The decoder maintains a look-up table (LUT) operating in a first in first out (FIFO)) system (or method) for HMVP. In the disclosure, the LUT is not limited to its name, and may be referred to as a table, an HMVP table, an HMVP candidate table, a buffer, an HMVP buffer, an HMVP candidate buffer, an HMVP list or an HMVP candidate list. Specifically, when a non-affine prediction unit (PU) (or coding unit (CU)) is decoded, corresponding motion information is stored in an LUT. The decoder performs decoding on a next PU. In this case, the stored motion information may include motion vectors, reference index information and mode information in x (horizontal) and y (vertical) directions.

The decoder maintains an LUT in which motion information of a progressively decoded non-affine candidate is stored. The size of the LUT may be limited to predefined S candidates. In one embodiment, the LUT may be reset at the start of a slice, the start of a CTU row or the start of a CTU.

HMVP may be applied both the merge mode and the AMVP mode. A merge list may have B candidates, and an AMVP list may have two candidates. In a conventional image compression technology, a merge list is configured with the following candidates: i) a spatial candidate, ii) a temporal candidate, iii) a bi-direction prediction (Bi-Pred) candidate, iv) a zero motion candidate. A method of additionally considering advanced motion vector prediction (ATMVP) as a candidate is recently discussed. For example, an ATMVP candidate may be inserted into a merge list prior to a temporal candidate. Candidates of the merge list are added to the merge list until they reach a maximum merge list size. A duplicate candidate may not be added to the merge list. Two candidates may be inserted into an AMVP list. For example, the first candidate of the two candidates may be selected from available spatial candidates, and the second candidate may be selected from temporal candidates. If the list is not filled, a zero motion vector candidate may be added.

HMVP is applied based on an FIFO order in which candidates exit from an LUT identically with their input order.

In one embodiment, when HMVP is applied to a merge list configuration, an HMVP candidate may be inserted (or added) to the third location of a list as follows:
1. Spatial Candidates
2. Temporal Candidate
3. Up to S HMVP Candidates for an LUT
4. Combined Bi-Pred Candidate
5. Zero Motion Vector Candidate In one embodiment, when HMVP is applied to an AMVP list configuration, the HMVP may be inserted into the third location after a temporal candidate as follows:
1. Spatial Candidate
2. Temporal Candidate
3. Up to K HMVP Candidates
4. Zero Motion Vector Candidate FIG. 39 is a flowchart for describing a method of storing an HMVP according to an embodiment of the disclosure.

Referring to FIG. 39, the decoder decodes a current PU (or CU) (S3901).

The decoder checks whether the current PU is a block coded in a non-affine mode (S3902). In order to facilitate the use of HMVP candidates, if the current PU is a block coded in the affine mode, the decoder does not store motion information of the current PU in a table.

If the current PU is a block coded in the non-affine mode, the decoder stores (or updates) motion information of the current PU in a table (S3903).

In an embodiment of the disclosure, an HMVP table may be updated using two methods, that is, i) unconstrained FIFO ii) constraint FIFO methods. In the former, redundant information may be present, but a pruning process is not applied. This contributes to reducing the complexity of an overall process. This is described with reference to the following figure.

FIG. 40 is a diagram for describing an HMVP table operating in an unconstrained FIFO manner according to an embodiment of the disclosure.

Referring to FIG. 40, a candidate added to a table is added at the end (right) of the table. In contrast, a candidate discharged from the table according to the FIFO method is located at the front end (left side, the oldest candidate) of the table.

If the table is not fully filled with a maximum number of pre-defined candidates at an index L−1 (i.e., end), new candidates are added without a removed candidate. In contrast, if the table has already been fully filled, that is, if a maximum number of the table is satisfied, a candidate located at the front end, that is, the oldest in the table, is removed and a new candidate is added.

FIG. 41 is a diagram for describing an HMVP table operating in a constraint FIFO manner according to an embodiment of the disclosure.

Referring to FIG. 41, if the constraint FIFO is used, pruning is performed if adding a new candidate causes any redundancy. In an embodiment, if a candidate having redundant motion information is present in a table, a redundant candidate within the table is removed, and motion information of a current candidate may be added.

Embodiment 1

With respect to HMVP candidates, in many cases, the latest history MVs may overlap motion information of a spatial candidate (or spatial neighboring candidate). Accordingly, the present embodiment proposes a method of setting the addition order of candidates differently from an HMVP LUT index order when an HMVP candidate is added to an AMVP or merge list.

According to an embodiment of the disclosure, a candidate list can be efficiently configured by adaptively adjusting an HMVP candidate. Accordingly, the number of signaling bins used for binarization can be reduced, and coding efficiency can be improved.

That is, an HMVP candidate added to a merge list or AMVP list may not be constrained by an index within the HMVP list. In one embodiment, Table 2 below illustrates a method of changing the order in which an HMVP candidate is added to an AMVP or merge list.

TABLE 2

| HMVP LUT index (0 denotes the latest history MV) | Order to add to AMVP or Merge list |
| --- | --- |
| 0 | 2 |
| 1 | 0 |
| 2 | 1 |
| 3 | 3 |
| ... | ... |

Referring to Table 2, as described above, there is a good possibility that the most recently inserted HMVP candidate may have the same motion information as a spatial candidate. Accordingly, the addition order of an HMVP candidate may be pre-defined regardless of an HMVP index by considering the possibility.

Furthermore, in one embodiment, an HMVP candidate may be added to a merge list or AMVP list from an HMVP candidate starting from an n-th candidate in the list. Table 3 below illustrates a changed order to add a candidate to an AMVP or merge list.

TABLE 3

| HMVP LUT index (0 denotes the latest history MV) | Order to add to AMVP or merge list |
| --- | --- |
| 0 | |
| 1 | 0 |
| 2 | 1 |
| 3 | 2 |
| ... | ... |

Referring to Table 3, an HMVP candidate may be added to a merge list or AMVP list from the second index.

In one embodiment, information on the addition order of an HMVP candidate within a table (LUT) may be signaled from the encoder to the decoder. For example, such order information may be transmitted through a high level syntax (HLS). The high level syntax may be a sequence parameter set, a picture parameter set, a slice header, a coding tree unit, a coding unit and/or another proper syntax data header, for example.

Table 4 illustrates a high level syntax structure to which a method proposed in the disclosure may be applied.

TABLE 4

| high_level_parameter_set( ) { | Description |
| --- | --- |
| ... | |
| set_HMVP_order_flag | u(1) |
| ... | |

Referring to Table 4, set_HMVP_order_flag equal to 1 indicates that set_HMVP_order_flag is present in a slice header within non-IDR pictures in CVS. set_HMVP_order_flag equal to 0 indicates that set_HMVP_order_flag is not present in slice headers and adaptive HMVP is not used in VCS.

Table 5 illustrates a slice segment header syntax structure to which a method proposed in the disclosure may be applied.

TABLE 5

| slice_segment_header( ) { | Description |
| --- | --- |
| ... | |
| if(set_HMVP_order_flag) | |
| slice_HMVP_idx | u(1) |
| ... | |
| } | |
| ... | |

Referring to Table 5, slice_HMVP_idx means an index for the sequence of used candidates. For example, slice_HMVP_idx equal to 0 may represent a basic HMVP sequence, such as 0, 1, 2, 3. Likewise, an index value of 1 may be used to represent an HMVP sequence of 3, 2, 1, 0.

Embodiment 2

In an embodiment of the disclosure, in addition to the HMVP LUT, a method of using a long term list for motion prediction is proposed. Accordingly, the number of maintained HMVP candidates can be increased. In an embodiment, 2-HMVP tables may be considered. In this case, one may be used to store common HMVP candidates, and the other may be used as a long term list in which candidates that need to be further maintained is stored.

The following illustrates methods of resetting and constructing a long term list (or long-term HMVP list).

After the first CTU of a CTU row is decoded, one or more history MVs of a subsequent CTU may be added to a long-term HMVP LUT. Such a long-term HMVP LUT may not be used or updated up to a next CTU row.

At the start of a next CTU row, a long-term HMVP LUT may be used to reset a common HMVP LUT. The reason for this is that the HMVP candidates of a CTU at the start of a CTU row may be more co-related compared to a history MV at the end of a previous CTU row.

The above process may be repeated.

FIG. 42 is a diagram illustrating an HMVP LUT and long-term HMVP LUT according to an embodiment of the disclosure.

Referring to FIG. 42, two LUTs are present. One is an HMVP LUT (or common HMVP LUT or short-term HMVP LUT), and the other is a long-term HMVP LUT. When an HMVP candidate is added to both merge and AMVP lists, it may be added from an HMVP LUT or long-term LUT as illustrated in FIG. 42.

The use of the long-term LUT may be indicated through a high level syntax by introducing a new syntax element. For example, the syntax element may be present in a sequence parameter set, a picture parameter set, a slice header, a coding tree unit, a coding unit and/or another proper syntax data header.

Embodiment 3

In an embodiment of the disclosure, there is proposed a method in which flexibility for decoding is considered in adding an HMVP candidate to an HMVP LUT. The encoder/decoder may consider a decision for one or more characteristics of a PU (or CU).

In an embodiment, the encoder/decoder may consider the following contents in adding an HMVP candidate to a table. The encoder/decoder may add a candidate to a table by considering characteristics, such as a mode (e.g., merge mode, affine mode or AMVP mode) of a PU and/or the size of a block, separately or in combination. In one embodiment, in addition to the characteristics, other characteristics may be considered. For example, a merge type (e.g., spatial candidate or temporal candidate) in which an HMVP LUT update is considered, whether it is a sub-PU, etc. may be considered as a criterion for selecting a candidate. The selection criterion may be determined to reduce redundancy with a previous history (or previous HMVP). For example, if a PU is coded in a merge mode and a merge type is a spatial merge, the decoder may not update an HMVP LUT with motion information of the corresponding PU.

FIG. 43 is a diagram illustrating an example of a method of updating an HMVP LUT according to an embodiment of the disclosure.

Referring to FIG. 43, the encoder/decoder obtains motion information of a coded candidate (S4301).

The encoder/decoder evaluates whether to update an LUT with the motion information of the candidate based on a pre-defined decision criterion (S4302). The decision criterion may include characteristics related to one or more of a mode (e.g., merge mode, affine mode or AMVP mode) of the candidate, the block size of the candidate and/or the merge type of the candidate.

The encoder/decoder updates the LUT based on the decision criterion (S4303). That is, if the candidate satisfies the pre-defined decision criterion, the encoder/decoder may add the motion information of the candidate to the LUT.

Embodiment 4

In an embodiment of the disclosure, there are proposed constraints on a redundancy check for adding an HMVP candidate to a merge list (or AMVP list). The constraints on a redundancy check may be implemented in various manners.

In one embodiment, the encoder/decoder may limit the number of pruning checks for a first specific number of candidates in a merge list. The encoder/decoder may limit the number of pruning checks for candidates from the first candidate of a merge list to a specific candidate. For example, the encoder/decoder may perform a pruning process on candidates from the first candidate of a merge list to a specific candidate. In this case, an HMVP candidate, that is, a target of a pruning check may be limited to a pre-defined number.

Furthermore, in one embodiment, the encoder/decoder may limit a pruning check by performing the pruning check on a specific type of a merge candidate within a merge list. For example, the encoder/decoder may perform a pruning check on only a spatial candidate of a merge list in adding an HMVP candidate. Alternatively, for example, the encoder/decoder may perform a pruning check on only some of the spatial candidates of a merge list in adding an HMVP candidate. Some of the spatial candidates may be pre-defined. For example, the pre-defined spatial candidates may be at least one of a left neighboring spatial candidate and/or a top neighboring spatial candidate. An embodiment of the disclosure is not limited thereto, and other types may be combined and limited as a target of a pruning check.

FIG. 44 is a diagram illustrating method of limiting the number of HMVP candidates, that is, a target of a pruning check, according to an embodiment of the disclosure.

Referring to FIG. 44, in an embodiment of the disclosure, the number of HMVP candidates, that is, a target of a pruning check, may be limited to four times.

The encoder/decoder may check the redundancy of motion information between the first M candidates within an HMVP LUT and the merge candidates of a merge list in constructing the merge list using HMVP candidates.

Alternatively, the encoder/decoder may check the redundancy of motion information between the first M candidates within an HMVP LUT and a currently decoded PU in adding the motion information of the decoded PU to the HMVP LUT.

FIG. 45 is a diagram illustrating an example of a method of performing a pruning check according to an embodiment of the disclosure.

Referring to FIG. 45, the encoder/decoder obtains motion information of a decoded candidate and determines (or decodes) the number of pruning checks (S4501, S4502).

The encoder/decoder performs a pruning check based on the determined number of pruning checks (S4503).

In one embodiment, as in Table 4 and Table 5, information related to a pruning check may be signaled through a high level syntax. In this case, a syntax element transmitted from the encoder to the decoder may be included in any header for indicating the number of pruning checks that need to be performed. The high level syntax may be a sequence parameter set, a picture parameter set, a slice header, a coding tree unit, a coding unit and/or other proper syntax data header, for example.

Embodiment 5

In an embodiment of the disclosure, there is proposed an efficient method of selecting an HMVP candidate. When a history motion vector candidate (i.e., HMVP candidate) is inserted into a merge list (or AMVP list), a pruning check may be performed so that the HMVP candidate does not overlap the existing merge list.

If total redundancy checks between a merge list of an M size and a history LUT of an N size is to be performed, checks of (M−1)×N times are necessary. Accordingly, in an embodiment of the disclosure, the number of HMVP candidates may be dependent on the existing merge candidate. For example, the number of HMVP candidates may be dependent on the number of spatial candidates present in a merge list. Alternatively, for example, the number of HMVP candidates may be dependent on the number of spatial candidates and temporal candidates present in a merge list.

If there is another merge candidate present in a merge list, the number of HMVP candidates on which a pruning check will be performed based on a specific criterion (or rule) based on the number of merge candidates and/or the number of HVMP of a merge list can be reduced. Accordingly, the number of redundancy checks in the worst case can be reduced.

For example, in the case of a merge list having a size (or length) of 6, if the merge list is fully filled, the merge list may include a maximum of 5 spatial or other merge candidates. In order to insert an HMVP candidate into 6 HMVP lists, 30 redundancy checks may be necessary in the worst case.

In one embodiment, an example related to constraints on the number of HMVPs to be checked is illustrated in Equation 23 and Table 6.

if (existing_candidates>=3)

number_hist_to_check=7-existing_candidates; [Equation 23]

TABLE 6

| # of existing candidate | # of existing candidate to check | # of history MV to check | # of checks |
|---|---|---|---|
| 1 | 1 | 6 | 6 |
| 2 | 2 | 6 | 12 |
| 3 | 3 | 4 | 12 |
| 4 | 4 | 3 | 12 |
| 5 | 5 | 2 | 10 |

Referring to Table 6, the number of redundancy checks for an HMVP addition in the worst case can be reduced 12 times not 30 times by limiting the number of HMVPs, that is, a target of a pruning check, to 2.

Embodiment 6

In an embodiment of the disclosure, there is proposed a method of constructing a merge list using history-based spatial temporal motion vector prediction (H-STMVP). H-STMVP indicates a candidate derived as an average of two history-based spatial MVP and TMVP. The two spatial HMVPs may be obtained from an HMVP buffer. The TMVP may be obtained from a current merge list. In this case, the spatial candidate may be a candidate obtained from the last 2-coded MVs in a decoding sequence prior to a current block.

For example, the last coded MV (referred to as MV_L in the disclosure), an MV, that is, the last to the second (referred to as MV_(L-1) in the disclosure), and MV_TMVP may be used to generate an H-STMVP candidate to be inserted into a merge list.

If all the three candidates can be used, MVs added to the merge list may be calculated by Equation 24 below.

$$\{MV_L + MV_{L-1} + MV_{TMVP}\} * 43/128 \quad \text{[Equation 24]}$$

In one embodiment, if only two of the three candidates are available, only two the candidates may be averaged to generate H-STMVP. Likewise, if only one candidate is available, the one candidate may be used. If an available candidate is not present, H-STMVP is not used for a merge list configuration.

In an embodiment of the disclosure, there is proposed a method of obtaining the motion vector of an H-STMVP candidate using another method other than Equation 24.

For example, instead of averaging three or more candidates at once, to first average spatial candidates and then average two candidates again using a result of the average may be computatively simpler. An example thereof is illustrated in the following equations.

$$\langle [MV_L + MV_{L-1}) >> 1 + MV_{TMVP}] >> 1 \rangle \quad \text{[Equation 25]}$$

Alternatively, an average value may be obtained as follows.

$$\langle [(MV_L + MV_{TMVP}) >> 1 + MV_{L-1}] >> 1 \rangle \quad \text{[Equation 26]}$$

$$\langle [(MV_{L-1} + MV_{TMVP}) >> 1 + MV_L] >> 1 \rangle \quad \text{[Equation 27]}$$

$$\langle [2MV_L + MV_{L-1} + MV_{TMVP}] >> 2 \rangle \quad \text{[Equation 28]}$$

The encoder/decoder may first average two candidates as in Equations 25 to 27, and then may average result values using the third candidate. Alternatively, the encoder/decoder may assign higher importance/weight to a candidate, that is, MV_L, by applying a twice shift operation as in Equation 28. An average value can be derived without a division operation by only a shift operation using Equations 25 to 28.

Embodiment 7

In an embodiment of the disclosure, there is proposed a method using a given number (n) of spatial candidates instead of two history-based spatial candidates in deriving H-STMVP. The n candidates do not need to be an essentially consecutive decoding sequence. The n candidates may be selected randomly or according to some rule.

Accordingly, Equation 24 may be represented using a more general method like Equation 29 below.

$$\{MV_1 + MV_2 + + MV_n + MV_{TMVP}\} * 1/(n+1) \quad \text{[Equation 29]}$$

In another embodiment, assuming that 5 spatial candidates are used, the influence of spatial candidates increase to generate an H-STMVP candidate can be minimized and a spatial candidate and temporal candidate can be properly incorporated by improving weight applied to a temporal candidate.

Accordingly, to this end, after spatial candidates are averaged together using Equation 30, the above object can be achieved by averaging MV_TMVP using a result of the average.

$$[\{MV_1 + MV_2 + \ldots + MV_n\} * 1/n + MV_{TMVP}] * \frac{1}{2} \quad \text{[Equation 30]}$$

Embodiment 8

In an embodiment of the disclosure, there is proposed a method of adding weight (or weighting factor) to a motion vector candidate used to derive H-STMVP. In this case, the weight may be empirically determined or may be determined by considering a temporal distance up to a fixed reference frame or may be determined by considering a location in a history table. For example, a new candidate may have heavier weight than a previous candidate.

That is, in the present embodiment, Equation 24 may be represent like Equation 31 below.

$$\{MV = w_1 \cdot MV_L + w_2 \cdot MV_{L-1} + w_3 \cdot MV_{TMVP}\}$$

$$\Sigma_{i=1}^{3} w_i = 1 \quad \text{[Equation 31]}$$

In this case, weight may have the same value or an unequally distributed value.

Embodiment 9

In an embodiment of the disclosure, there is proposed a method of scaling a motion vector used to derive an H-STMVP candidate as a single reference picture.

FIG. 46 is a diagram for describing a method of deriving an H-STMVP candidate using motion vectors that refer to different reference pictures according to an embodiment of the disclosure.

Referring to FIG. 46, it is assumed that MV_L, MV_L-1 and MV_TMVP candidates refer to (or indicate) respective different reference pictures. That is, FIG. 46 illustrates that candidates used to generate H-STMVP candidates may have different reference indices and resultantly have different reference frames.

The average of Equations 24 to 31 may be made an unequal result value because a frame having a close reference frame may essentially have a greater influence on the motion vector of H-STMVP. Accordingly, there is proposed a method of scaling all motion vectors into a single reference frame for an equal comparison and incorporation.

In this case, the encoder may determine which single frame performed as part of RD optimization is most suitable for being used as a reference frame. In an embodiment, a selected reference frame may be signaled in a slice header similar to a TMVP array index present in a slice header. For example, a reference frame to be used may be generated using a fixed rule. Alternatively, for example, a list may be scaled as the first available reference frame from L0 or a list may be scaled based on a current picture sequence count.

In one embodiment, in order to achieve the above object, the encoder may transmit, to the decoder, information for a single fixed picture using a high level syntax (HLS) that may be part of a sequence parameter set, a picture parameter set, a slice header, a coding tree unit and/or another data header. For example, a high level syntax structure, such as Table 7 and/or Table 8 below, may be defined.

TABLE 7

| high_level_parameter_set( ) { | Description |
|---|---|
| set_ HSTMVP_ref_pic_flag | u(1) |

Referring to Table 7, set_HSTMVP_ref_pic_flag equal to 1 indicates that set_HSTMVP_idx is present in the slice header of a non-IDR picture in CVS. set_HSTMVP_ref_pic_flag equal to 0 indicates that set_HSTMVP_idx is not present in a slice header.

TABLE 8

| slice_segment_header( ) { | Description |
|---|---|
| if(set_HSTMVP_ref_pic_flag) | |
| slice_HSTMVP_idx | u(1) |
| } | |

Referring to Table 8, slice_HMVP_idx designates a reference index. In one embodiment, a reference index may be selected with respect to a list L0.

The aforementioned embodiments of the disclosure may be divided and described, for convenience of description, but the disclosure is not limited thereto. That is, the embodiments described in the embodiments 1 to 9 may be independently performed or one or more several embodiments may be combined and performed.

FIG. 47 is a flowchart illustrating a method of processing a video signal based on an inter prediction according to an embodiment to which the disclosure is applied.

Referring to FIG. 47, a decoder is basically described for convenience of description, but the disclosure is not limited thereto. A method of processing a video signal based on inter prediction according to an embodiment of the disclosure may be identically performed in an encoder and a decoder.

The decoder configures the first merge candidate list of a current block using a spatial merge candidate and temporal merge candidate of the current block (S4701).

The decoder configures a second merge candidate list by adding, to the first merge candidate list, a history-based merge candidate indicating motion information of a block coded prior to the current block (S4702).

The decoder obtains a merge index indicating a merge candidate applied to the current block within the second merge candidate list (S4703).

The decoder generates a prediction block of the current block using motion information of a merge candidate indicated by the merge index (S4704).

As described above, the history-based merge candidate may be added to the first merge candidate list if the history-based merge candidate has motion information not overlapping that of a pre-defined merge candidate, among merge candidates included in the first merge candidate list.

As described above, the history-based merge candidate may be added to the first merge candidate list if the history-based merge candidate has motion information not overlapping that of a pre-defined specific number of merge candidates, among merge candidates included in the first merge candidate list.

As described above, the history-based merge candidate may be added to the first merge candidate list if the history-based merge candidate has motion information not overlapping that of a specific spatial merge candidate included in the first merge candidate list.

As described above, the history-based merge candidate may be derived from a pre-defined number of candidates within a history-based buffer in which history-based merge candidates are stored. For example, the per-defined number may be 2.

As described above, the step of constructing the second merge candidate list further includes the step of adding a history-based spatial temporal merge candidate. The history-based spatial temporal candidate may be derived using two history-based merge candidate and temporal merge candidate.

As described above, the motion vector of the history-based spatial temporal candidate may be derived as an average value of the motion vectors of the two history-based merge candidates and an average value of the motion vectors of the temporal merge candidates.

FIG. 48 illustrates an example of a block diagram of an apparatus for processing an image signal according to an embodiment of the disclosure. The image signal processor of FIG. 48 may correspond to the encoding apparatus of FIG. 1 100 or the decoding apparatus 200 of FIG. 2.

An image processor 4800 for processing an image signal includes a memory 4820 for storing an image signal and a processor 4810 coupled to the memory to process an image signal.

The processor 4810 according to an embodiment of the disclosure may be configured with at least one processing circuit for the processing of an image signal, and may process an image signal by executing instructions for encoding or decoding the image signal. That is, the processor 4810 may encode the original image data or decode an encoded image signal by executing the aforementioned encoding or decoding methods.

FIG. 49 illustrates a video coding system to which the disclosure is applied.

The video coding system may include a source device and a receive device. The source device may transmit, to the receive device, encoded video/image information or data through a digital storage medium or over a network in a file or streaming form.

The source device may include a video source, an encoding apparatus, and a transmitter. The receive device may include a receiver, a decoding apparatus and a renderer. The encoding apparatus may be called a video/image encoding apparatus. The decoding apparatus may be called a video/image decoding apparatus. The transmitter may be included in the encoding apparatus. The receiver may be included in the decoding apparatus. The renderer may include a display. The display may be configured for each device or external component.

The video source may obtain a video/image through the capture, synthesis or generation process of a video/image. The video source may include a video/image capture device and/or a video/image generation device. The video/image capture device may include one or more cameras, a video/image archive including a previously captured video/image, etc., for example. The video/image generation device may include a computer, a tablet and a smartphone, for example, and may (electronically) generate a video/image. For example, a virtual video/image may be generated through a computer. In this case, a process of generating related data may be substituted with a video/image capture process.

The encoding apparatus may encode an input video/image. The encoding apparatus may perform a series of procedures, such as prediction, a transform, and quantization, for compression and coding efficiency. Encoded data (encoded video/image information) may be output in a bitstream form.

The transmitter may transmit, to the receiver of the receive device, encoded video/image information or data output in a bitstream form through a digital storage medium or over a network in a file or streaming form. The digital storage medium may include various storage media, such as a USB, an SD, a CD, a DVD, Blueray, an HDD, and an SSD. The transmitter may include an element for generating a media file through a predefined file format, and may include an element for transmission over a broadcast/communication network. The receiver may extract the bitstream and transmit it to the decoding apparatus.

The decoding apparatus may decode a video/image by performing a series of procedures, such as de-quantization, an inverse transform, and prediction corresponding to operations of the encoding apparatus.

The renderer may render a decoded video/image. The rendered video/image may be displayed through a display.

FIG. 50 is an embodiment to which the disclosure is applied, and illustrates the structure of a content streaming system.

Referring to FIG. 50, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of processing a video signal by an apparatus based on an inter prediction, the method comprising:
constructing a first merge candidate list of a current block based on a plurality of merge candidates including spatial merge candidates and a temporal merge candidate of the current block, the spatial merge candidates preceding the temporal merge candidate in the first merge candidate list;
constructing a second merge candidate list by adding a history-based merge candidate indicating motion information of a block coded prior to the current block to the first merge candidate list, the constructing of the second merge candidate list includes
checking motion information of the history-based merge candidate with motion information of partial of the plurality of the merge candidates that is a first number of merge candidates of the first merge candidate list in which only a partial of the plurality of the spatial merge candidates in the first merge candidate list is checked, and
adding the history-based merge candidate only when the checking indicates that the history-based merge candidate has motion information that does not overlap with the motion information of only the partial of the plurality of spatial merge candidates in the first merge candidate list;
obtaining a merge index indicating a merge candidate applied to the current block within the second merge candidate list; and
generating a prediction block of the current block based on motion information of a merge candidate indicated by the merge index.

2. The method of claim 1, wherein the history-based merge candidate is derived from a pre-defined number of candidates within a history-based buffer storing the history-based merge candidates.

3. The method of claim 1, wherein the constructing of the second merge candidate list further comprises adding a history-based spatial temporal merge candidate, and wherein the history-based spatial temporal candidate is derived using the two history-based merge candidates and the temporal merge candidate.

4. The method of claim 3, wherein a motion vector of the history-based spatial temporal candidate is derived as an average value of motion vectors of the two history-based merge candidates and an average value of motion vectors of temporal merge candidates.

5. The method of claim 1, wherein the constructing of the second merge candidate list further comprises: determining whether to add the history-based merge candidate to the first merge candidate list, starting from a last history-based merge candidate added last to a history-based merge candidate list among history-based merge candidates included in the history-based merge candidate list.

6. A method of encoding a video signal by an apparatus based on an inter prediction, the method comprising:
constructing a first merge candidate list of a current block based on a plurality of merge candidates including spatial merge candidates and a temporal merge candidate of the current block, the spatial merge candidates preceding the temporal merge candidate in the first merge candidate list;
constructing a second merge candidate list by adding a history-based merge candidate indicating motion information of a block coded prior to the current block to the first merge candidate list, the constructing of the second merge candidate list includes checking motion information of the history-based merge candidate with motion information of partial of the plurality of the merge candidates that is a first number of merge candidates of the first merge candidate list in which only a partial of the plurality of the spatial merge candidates in the first merge candidate list is checked, and adding the history-based merge candidate only when the checking indicates that the history-based merge candidate has motion information that does not overlap with the motion information of only the partial of the plurality of the spatial merge candidates in the first merge candidate list;

signaling in a bitstream a merge index indicating a merge candidate applied to the current block within the second merge candidate list;

generating a prediction block of the current block based on motion information of a merge candidate indicated by the merge index; and generating a residual block based on the current block and the prediction block.

7. A non-transitory decoder-readable medium storing a bitstream generated by steps of:

constructing a first merge candidate list of a current block based on a plurality of merge candidates including spatial merge candidates and a temporal merge candidate of the current block, the spatial merge candidates preceding the temporal merge candidate in the first merge candidate list;

constructing a second merge candidate list by adding a history-based merge candidate indicating motion information of a block coded prior to the current block to the first merge candidate list, the constructing of the second merge candidate list includes checking motion information of the history-based merge candidate with motion information of partial of the plurality of the merge candidates that is a first number of merge candidates of the first merge candidate list in which only a partial of the plurality of the spatial merge candidates in the first merge candidate list is checked, and adding the history-based merge candidate only when the checking indicates that the history-based merge candidate has motion information that does not overlap with the motion information of only the partial of the plurality of the spatial merge candidates in the first merge candidate list;

signaling in a bitstream a merge index indicating a merge candidate applied to the current block within the second merge candidate list;

generating a prediction block of the current block based on motion information of a merge candidate indicated by the merge index; and generating a residual block based on the current block and the prediction block.

* * * * *